(12) United States Patent
Amitani et al.

(10) Patent No.: US 8,536,535 B2
(45) Date of Patent: Sep. 17, 2013

(54) RADIATION IMAGE CAPTURING SYSTEM

(75) Inventors: Kouji Amitani, Tachikawa (JP); Tatsuya Takagi, Musashino (JP); Ryohei Ito, Hachioji (JP)

(73) Assignee: Konica Minolta Medical & Graphic, Inc. (JP)

( * ) Notice: Subject to any disclaimer, the term of this patent is extended or adjusted under 35 U.S.C. 154(b) by 0 days.

(21) Appl. No.: 13/370,539

(22) Filed: Feb. 10, 2012

(65) Prior Publication Data

US 2012/0211666 A1 Aug. 23, 2012

(30) Foreign Application Priority Data

Feb. 23, 2011 (JP) ................. 2011-036544
Oct. 7, 2011 (JP) ................. 2011-222644

(51) Int. Cl.
*H01L 27/146* (2006.01)

(52) U.S. Cl.
USPC .................................... 250/370.09

(58) Field of Classification Search
CPC ............. G01T 1/247; G06T 2207/10116; G06T 2207/30004
USPC ............. 250/370.09; 378/97, 207
See application file for complete search history.

(56) References Cited

U.S. PATENT DOCUMENTS

| 6,208,708 | B1 * | 3/2001 | Hoheisel et al. ........... 378/37 |
| 6,919,568 | B2 * | 7/2005 | Odogba et al. ........... 250/370.09 |
| 6,972,411 | B2 * | 12/2005 | Schick et al. ........... 250/370.11 |
| 7,078,693 | B2 * | 7/2006 | Nonaka ........... 250/336.1 |
| 7,211,803 | B1 | 5/2007 | Dhurjaty et al. |
| 2012/0217410 | A1 * | 8/2012 | Amitani ........... 250/370.09 |

FOREIGN PATENT DOCUMENTS

| JP | 06-342099 A | 12/1994 |
| JP | 09-073144 A | 3/1997 |
| JP | 2006-058124 A | 3/2006 |
| JP | 2009-219538 A | 10/2009 |

* cited by examiner

*Primary Examiner* — David Porta
*Assistant Examiner* — Edwin Gunberg
(74) *Attorney, Agent, or Firm* — Cantor Colburn LLP

(57) ABSTRACT

In a radiation image capturing system, prior to radiation image capturing operation, the radiation image capturing apparatus repeats on an alternate basis, a step of reading leak data and a step of resetting each of the radiation detection elements, wherein the step of reading leak data is performed by turning off all switch units, allowing a reading circuit to perform cyclic reading operations under this condition and converting electric charge leaking out of radiation detection elements through the switch units into the leak data, thereby detecting a start of irradiation based on the leak data having been read out. The image processing apparatus analyzes a profile of image data along the extension of signal lines of the radiation image capturing apparatus, and identifies a range of the image data where a defect has occurred, whereby the image data in the identified range is corrected.

13 Claims, 37 Drawing Sheets

FIG. 9
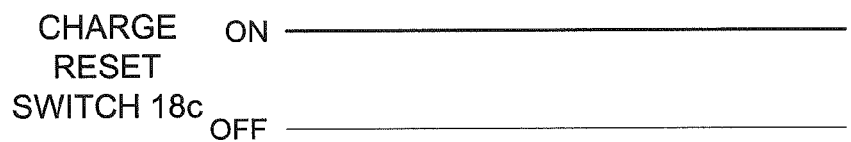
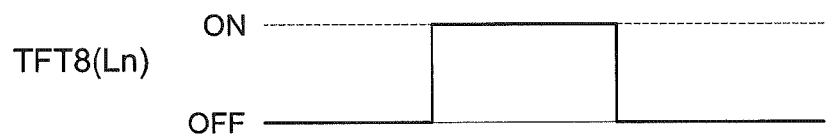
FIG. 10
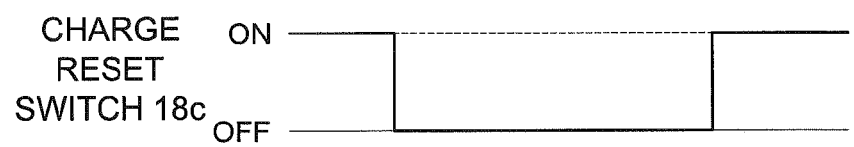
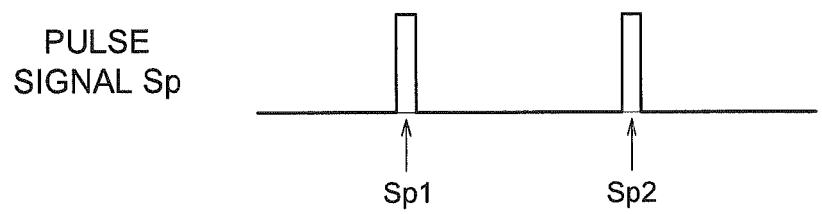
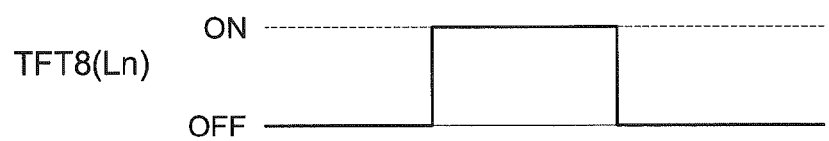

RADIATION IMAGE CAPTURING SYSTEM

This application is based on Japanese Patent Application Nos. 2011-036544 filed on Feb. 23, 2011 and 2011-222644 filed on Oct. 7, 2011 with Japanese Patent Office, the entire content of which is hereby incorporated by reference.

BACKGROUND OF THE INVENTION

The present invention relates to a radiation image capturing system, particularly to a radiation image capturing system wherein a radiation image capturing apparatus performs radiation image capturing operations by detecting irradiation by itself.

There has been development of various types of radiation image capturing apparatuses including a so-called direct type radiation image capturing apparatus that generates an electric charge through a detection element in response to the dosage of applied radiation such as X-rays and converts the electric charge into an electric signal, and a so-called indirect radiation image capturing apparatus that uses a scintillator etc. to convert the applied radiation into electromagnetic waves having other wavelengths such as visible light, then generates an electric charge through a photoelectric conversion element such as a photodiode in response to the energy of the electromagnetic wave having been converted and applied, and converts the electric change into an electric signal (i.e., image data). In the following description of the present invention, the detection element in the direct type radiation image capturing apparatus and the photoelectric conversion element in the indirect radiation image capturing apparatus will be collectively referred to as a radiation detection element.

This type of radiation image capturing apparatus is known under the name of FPD (Flat Panel Detector). In the conventional art, this radiation image capturing apparatus has been designed as a so-called exclusive device type formed integrally with the support base (or Bucky device) (refer to the Unexamined Japanese Patent Application Publication No. Hei 9 (1997)-73144, for example). In recent years, there has been development of portable radiation image capturing apparatuses wherein a radiation detection element and others are incorporated in a housing for easy transportation. These portable radiation image capturing apparatuses have been put into practical use (refer to Unexamined Japanese Patent Application Publication No. 2006-058124, and Unexamined Japanese Patent Application Publication No. Hei 6 (1994)-342099).

In the aforementioned radiation image capturing apparatus, a plurality of radiation detection elements 7 are normally arranged in a two-dimensional array (matrix) on a detecting section P, and each radiation detection element 7 is connected with the switch unit formed of a thin film transistor (hereinafter referred to as "TFT") 8, as shown in FIG. 7 to be described later.

Normally in the radiation image capturing operation, radiation is applied to a radiation image capturing apparatus from a radiation source 52 (FIGS. 11 and 12 to be described later) of a radiation generator 55, with a prescribed image capturing position (front of the chest or side of the lumbar spine) of the body of a subject placed in-between.

In this case, off-voltage is applied to the lines L1 through Lx of the scanning line 5 from the gate driver 15b of the scanning drive unit 15 of the radiation image capturing apparatus. When all the TFTs 8 have been set to the off-state, radiation is applied, whereby an electric charge generated within each radiation detection element 7 by application of radiation is stored appropriately inside each radiation detection element 7.

After radiation image capturing operation, on-voltage is applied sequentially to each of the lines L1 through Lx of the scanning line 5 from the gate driver 15b so that TFTs 8 are sequentially turned on. The electric charge accumulated in each radiation detection element 7 by application of radiation is sequentially discharged to each of the signal lines 6. This electric charge is then read out as image data D by each reading circuit 17.

Incidentally, to ensure radiation image capturing, it is required that, when radiation is applied to the radiation image capturing apparatus, off-voltage should be properly applied to each of the lines L1 through Lx of the scanning line 5 from the gate driver 15b, and TFTs 8 as switch unit should be turned off, as described above.

In many of the conventional exclusive equipment type radiation image capturing apparatuses, for example, an interface is provided for connection with the radiation generator so that signals are exchanged. Then the radiation image capturing apparatus applies off-voltage to each of the lines L1 through Lx of the scanning line 5. When the charge accumulation state has been confirmed, the radiation image capturing apparatus allows radiation to be applied from the radiation source.

However, for example, when the radiation image capturing apparatus and radiation generator have been produced by different manufacturers, it is not always easy to provide interface between these devices. In some cases, an interface cannot be provided.

If an interface cannot be configured between the radiation image capturing apparatus and radiation generator, the radiation image capturing apparatus has no means of identifying the time when radiation was applied from the radiation source. This requires the radiation image capturing apparatus to detect by itself whether or not radiation has been applied from the radiation source.

To solve this problem, in recent years, it has been known that development of various radiation image capturing apparatuses capable of self-detection of the application of radiation, independently of the aforementioned interface configured between the radiation image capturing apparatus and radiation generator.

For example, according to the inventions proposed in the Specification of the U.S. Pat. No. 7,211,803 and the Unexamined Japanese Patent Application Publication No. 2009-219538, when exposure of the radiation image capturing apparatus to radiation has started, and electric charge has been generated inside each radiation detection element 7, electric charge flows from each radiation detection element 7 to the bias line 9 (refer to FIG. 7 to be described later) connected to each radiation detection element 7, with the result that there is an increase in the volume of current running through the bias line 9. It is proposed that to utilize this phenomenon effectively, the bias line 9 is provided with a current detection unit to detect the value of the current flowing through the bias line 9 and that thus, the start of irradiation is detected based on this current value.

According to the research made by the present inventors, however, it has been found out that since the aforementioned technique uses a bias line 9 connected to the electrode of each radiation detection element 7, noise generated by the current detection unit is transmitted to each radiation detection element 7 through the bias line 9, and is superimposed on the image data D read out of the radiation detection element 7 in some cases and that solution to the problem is not easy.

In the meantime, after extended research on an alternative method that enables the start of irradiation to be detected by the radiation image capturing apparatus, the present inventors have found out several techniques that enable the radiation image capturing apparatus to detect the start of irradiation appropriately by itself.

Incidentally, as will be described later, a new irradiation start detection method found out by the present inventors is designed in such a way that, prior to radiation image capturing operation, on-voltage is sequentially applied to each of the lines L1 through Lx of the scanning line 5 from the gate driver 15*b* of the scanning drive unit 15 so that image data "d" is read out. It should be noted that, in the following description, the image data for irradiation start detection to be read for detection of the start of irradiation prior to this radiation image capturing will be called image data "d", for distinction from the image data D which is a main image to be read immediately after image capturing.

When radiation is applied to the radiation image capturing apparatus, there is an increase in the value of the image data "d" to be read. This phenomenon is used in such a way that the start of irradiation to the radiation image capturing apparatus is detected based on the image data "d" having been read.

Further, in the another irradiation start detection method found out by the present inventors, off-voltage is applied to all the scanning lines 5 from the gate driver 15*b* of the scanning drive unit 15 prior to radiation image capturing so that each of the TFTs 8 is turned off. Under this condition, the reading circuit 17 is made to perform the step of reading. Then the step of reading leak data "d leak" is performed in such a way that the electric charge "q" (refer to FIG. 13 to be described later) having leaked from the radiation detection element 7 through the TFTs 8 is converted into the leak data "d leak".

In this case as well, when radiation has been applied to the radiation image capturing apparatus, there is an increase in the value of the leak data "d leak" to be read. This phenomenon is utilized so that the start of irradiation of the radiation image capturing apparatus is detected based on the value of the leak data "d leak" having been read.

In this case, as described above, in the step of reading the leak data "d leak", each of the TFTs 8 is turned off. If each of the TFTs 8 is kept turned off, so-called dark charges which are constantly generated by thermal excitation or the like due to the heat (temperature) of the radiation detection element 7 itself are stored in each of the radiation detection elements 7.

Thus, as will be described later, the step of resetting each radiation detection element 7 and the step of reading the leak data "d leak" are repeated on an alternate basis, wherein the step of resetting signifies a step of applying on-voltage sequentially to the scanning line 5 from the gate driver 15*b* so as to remove the dark charge from each radiation detection element 7.

However, as described above, when radiation is applied to the radiation image capturing apparatus, there is an increase in the value of the image data "d" to be read. This means that part of the useful electric charge generated in the radiation detection element 7 by irradiation escapes into the signal line 6 from the radiation detection element 7 due to image data "d" reading.

When the step of reading the leak data "d leak" is performed prior to the radiation image capturing operation, there is an increase in the amount of electric charge "q" leaking from the radiation detection element 7 through the TFT 8 due to irradiation. However, when compared with the total amount of the useful electric charge generated inside the radiation detection element 7 due to irradiation, this amount is very small and does not cause any adverse effects.

However, part of the useful electric charge generated inside the radiation detection element 7 due to irradiation may escape into the signal line 6 from the radiation detection element 7 by the step of resetting the radiation detection element 7 performed alternately with the step of reading the leak data "d leak".

As described above, part of the useful electric charge generated by irradiation flows into the signal line 6 from the radiation detection element 7 connected to the scanning line 5 to which on-voltage is applied from the gate driver 15*b* by the step of reading the image data "d" or the step of resetting each radiation detection element 7.

Consequently, as illustrated in FIG. 26 (to be described later), the line of the image data D devoid of part of the useful electric charge, i.e., a line defect appears on the portion corresponding to the scanning line 5 in the image data D read out as the main image (or radiation image generated based thereon). Occurrence of this line defect necessarily occurs as long as the aforementioned irradiation start detection method found out by the present inventors is adopted.

Further, when the detection sensitivity is low, time is needed from the actual start of irradiation to the radiation image capturing apparatus from the radiation source until the detection of the irradiation start by the radiation image capturing apparatus. During this time, many line defects may occur. In this case, line defects appear continuously in the image data D read out as a main image (or on the radiation image generated based thereon), as shown in FIG. 28 (to be described later).

When line defects occur, if a radiation image is generated based on the image data D containing such line defects, the linear pattern (or belt-shaped pattern if many line defects have occurred in a continuous form) will be gotten onto the radiation image, with the result that the radiation image will be difficult to see.

Further, for example, when the radiation image captured by the radiation image capturing apparatus is used for diagnosis in medical treatment and a lesion is contained in the portion of a line defect, it will be difficult to determine if it is a lesion or a line defect. This may lead a doctor to make a diagnostic error if such a radiation image is used.

The radiation image capturing system using the aforementioned radiation image capturing apparatus is required to properly correct the aforementioned line defect produced inevitably by the radiation image capturing apparatus even if it is produced and to generate an appropriate radiation image completely free from line defects.

SUMMARY

In view of the problems described above, it is an object of the present invention to provide a radiation image capturing system wherein a radiation image capturing apparatus itself is capable of self-detecting irradiation and generating a radiation image by properly correcting the line defect having occurred on the image data D obtained by radiation image capturing operation using such a radiation image capturing apparatus.

To solve the aforementioned problems, a radiation image capturing system reflecting one aspect of the present invention includes:

a radiation image capturing apparatus further equipped with:

a detecting section including:

a plurality of scanning lines and a plurality of signal lines provided to cross each other; and a plurality of radiation detection elements arranged in a two-dimensional array in small regions partitioned by the plurality of scanning lines and the plurality of signal lines;

a scanning drive unit which sequentially applies on-voltage to each of the scanning lines by switching the scanning lines to which the on-voltage is applied;

switch units each connected to each of the scanning lines so as to discharge electric charge accumulated in the radiation detection elements to the signal lines when the on-voltage is applied;

a reading circuit for converting the electric charge discharged from the radiation detection elements, into image data to read the image data;

a control device for controlling at least the scanning drive unit and the reading circuit to perform processing of reading the image data from the radiation detection elements; and a communication unit for exchanging signals with an external device; and an image processing apparatus for generating a radiation image based on the image data sent from the radiation image capturing apparatus, wherein, prior to radiation image capturing operation, the control device is configured to alternately repeat processing of reading out leak data and processing of resetting each of the radiation detection elements, and configured to detect a start of irradiation when the read leak data exceeds a threshold value, wherein the control device performs the processing of reading out leak data by allowing the reading circuit to perform cyclic reading operations, after allowing the scanning drive unit to apply off-voltage to all the scanning lines so that each of the switch units is turned off, and by converting the electric charge having leaked from the radiation detection elements through the switch units into the leak data, and wherein the image processing apparatus analyzes a profile of the image data in a direction of extension of each of the signal lines, identifies a scope of the image data containing a defect, and repairs the image data in the identified scope.

A radiation image capturing system reflecting one aspect of the present invention includes:

a radiation image capturing apparatus further equipped with:

a detecting section including:

a plurality of scanning lines and a plurality of signal lines provided to cross each other; and a plurality of radiation detection elements arranged in a two-dimensional array in small regions partitioned by the plurality of scanning lines and the plurality of signal lines;

a scanning drive unit which sequentially applies on-voltage to each of the scanning lines by switching the scanning lines to which the on-voltage is applied;

switch units each connected to each of the scanning lines so as to discharge electric charge accumulated in the radiation detection elements to the signal lines when the on-voltage is applied;

a reading circuit for converting the electric charge discharged from the radiation detection elements, into image data to read the image data;

a control device for controlling at least the scanning drive unit and the reading circuit to perform processing of reading the image data from the radiation detection elements; and a communication unit for exchanging signals with an external device; and an image processing apparatus for generating a radiation image based on the image data sent from the radiation image capturing apparatus, wherein, prior to radiation image capturing operation, the control device is configured to allow the scanning drive unit to sequentially apply the on-voltage to each of the scanning lines, and allow the reading circuit to repeat processing of reading out image data for detecting a start of irradiation, and configured to detect the start of irradiation when the read image data for detecting a start of irradiation exceeds a threshold value, and wherein the image processing apparatus analyzes a profile of the image data in a direction of extension of each of the signal lines, identifies a scope of the image data containing a defect, and repairs the image data in the identified scope.

BRIEF DESCRIPTION OF THE DRAWINGS

FIG. 9 is a timing chart showing the on-off timing for the charge reset switch and TFT in the step of resetting each radiation detection element.

FIG. 10 is a timing chart showing the on-off timing of the charge reset switch, pulse signal and TFT in the step of reading the image data.

DETAILED DESCRIPTION OF THE PREFERRED EMBODIMENT

The following describes the embodiments of the radiation image capturing system in the present invention with reference to the drawings.

The following describes a so-called indirect radiation image capturing apparatus that is provided with a scintillator or the like as a radiation image capturing apparatus used in the radiation image capturing system, wherein the applied radiation is converted into electromagnetic waves of other wavelengths such as visible light, whereby an electric signal is obtained. However, the present invention is also applicable to the so-called direct type radiation image capturing apparatus that detects radiation directly by a radiation detection element without using a scintillator or others.

[Radiation Image Capturing Apparatus]

Figure 1:
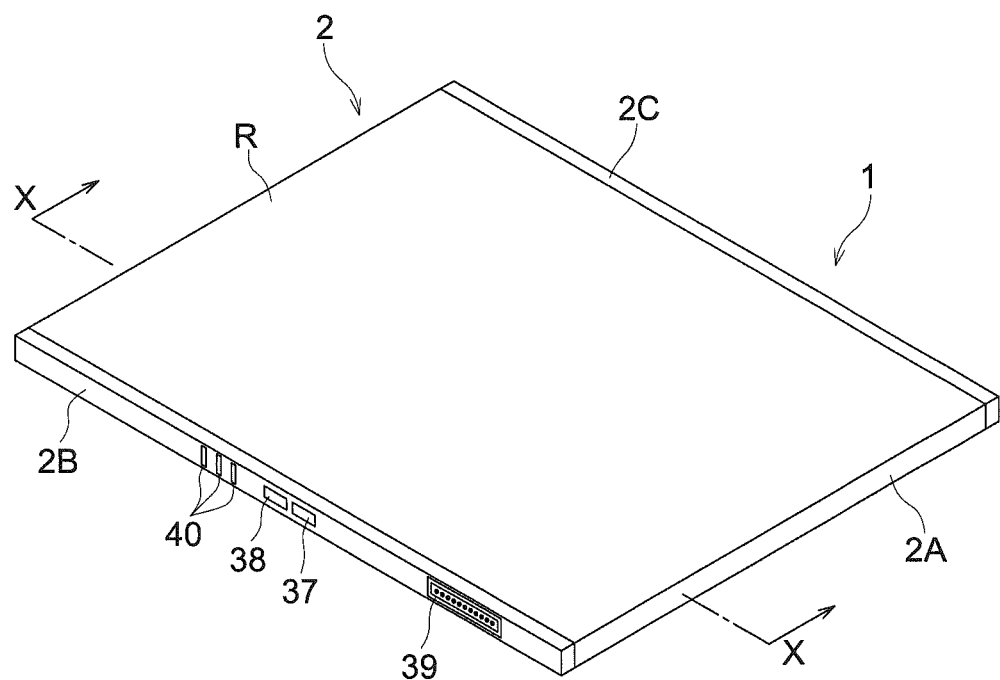
FIG. 1 is a perspective view representing the external appearance of a radiation image capturing apparatus of the present embodiment.
Figure 2:
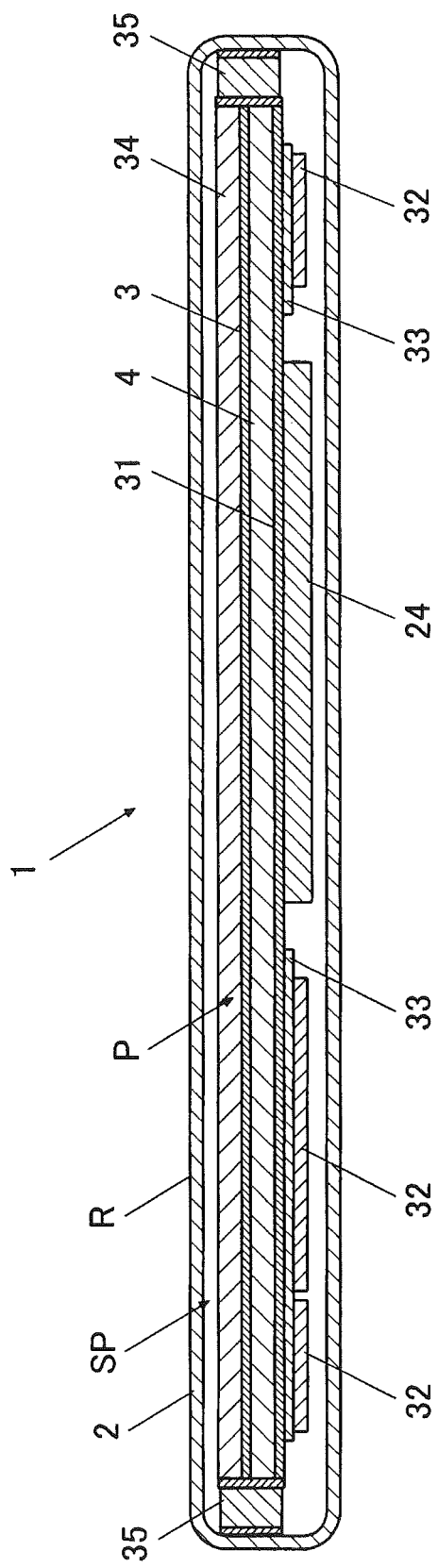
FIG. 2 is a cross section taken along arrow line X-X in FIG. 1.

In the first place, the following describes the radiation image capturing apparatus of the present embodiment. FIG. 1 is a perspective view representing the external appearance of a radiation image capturing apparatus of the present embodiment. FIG. 2 is a cross section taken along arrow line X-X in FIG. 1. In the radiation image capturing apparatus 1, as shown in FIGS. 1 and 2, a sensor panel SP composed of a scintillator 3 and substrate 4 are incorporated in a casing-shaped housing 2.

In the present embodiment, in the casing 2, a hollow rectangular sleeve-shaped housing main body 2A having a radiation incidence surface R is made of such a material as a carbon board and plastics that allows passage of radiation. The casing 2 is formed by blocking the openings on both sides of the housing main body 2A with cover members 2B and 2C.

Further, the cover member 2B on one side of the casing 2 is provided with a power switch 37, change-over switch 38, connector 39, and indicator 40 composed of a LED or the like for indicating the battery status and operating conditions of the radiation image capturing apparatus 1.

Figure 3:
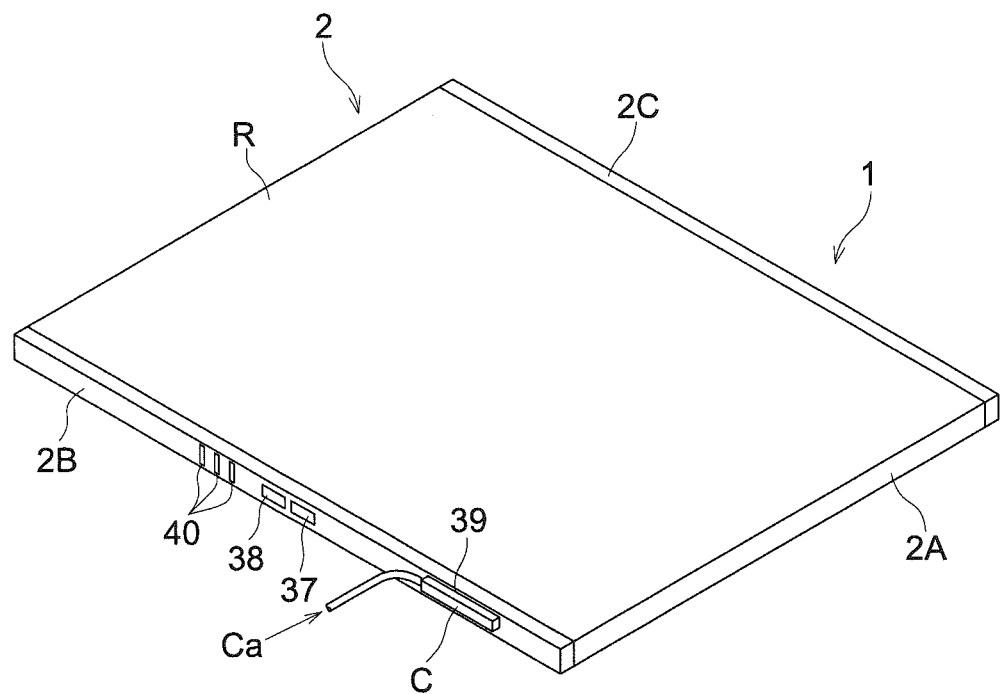
FIG. 3 is a perspective view representing the state where the cable connector is linked to the connector of the radiation image capturing apparatus.

In the present embodiment, as shown in FIG. 3, the connector 39 is connected with the connector C provided on the tip end of the cable Ca. This allows the connector 39 to serve as a wired type communication unit when exchanging signals with the console 58 (refer to FIG. 11 and FIG. 12, to be described later) and others through a cable Ca or sending the image data D and others to the console 58 which is an image processing apparatus. It should be noted that the installation position of the connector 39 is not restricted to the cover member 2B. The connector 39 can be installed at a proper position of the radiation image capturing apparatus 1.

Further, although not illustrated, an antenna device 41 refer to (FIG. 7, to be described later) is installed on the cover member 2C and others on the opposite side of the casing 2 so as to be embedded into the cover member 2C and others. In the present embodiment, this antenna device 41 serves as a communication unit for wireless exchange of signals and others, for example, between the radiation image capturing apparatus 1 and console 58.

It should be noted that the installation position of the antenna device 41 is not restricted to the cover member 2C. The antenna device 41 can be installed at any position of the radiation image capturing apparatus 1. Further, the number of the antenna devices 41 is not restricted to one. A plurality of antenna devices 41 can be ins ailed.

Inside the casing 2, as shown in FIG. 2, a base 31 is arranged below the substrate 4 through a thin lead plate (not illustrated) and others. The base 31 is provided with a PCB 33 equipped with electronic parts 32 and others, and a battery 24. Further, the radiation incidence surfaces R of the substrate 4 and scintillator 3 are provided with glass substrates 34 for protection. Further, in the present embodiment, a cushioning material 35 is provided between lateral sides of the sensor panel SP and casing 2 to prevent mutual collision.

The scintillator 3 is installed opposed to the detecting section P (to be described later) of the substrate 4. In the present embodiment, the scintillator 3 is mainly composed of a phospher, for example. Upon receipt of radiation, the scintillator 3 converts the radiation into an electromagnetic wave having a wavelength of 300 through 800 nm, i.e., an electromagnetic wave mainly consisting of visible light and outputs this electromagnetic wave.

Figure 4:
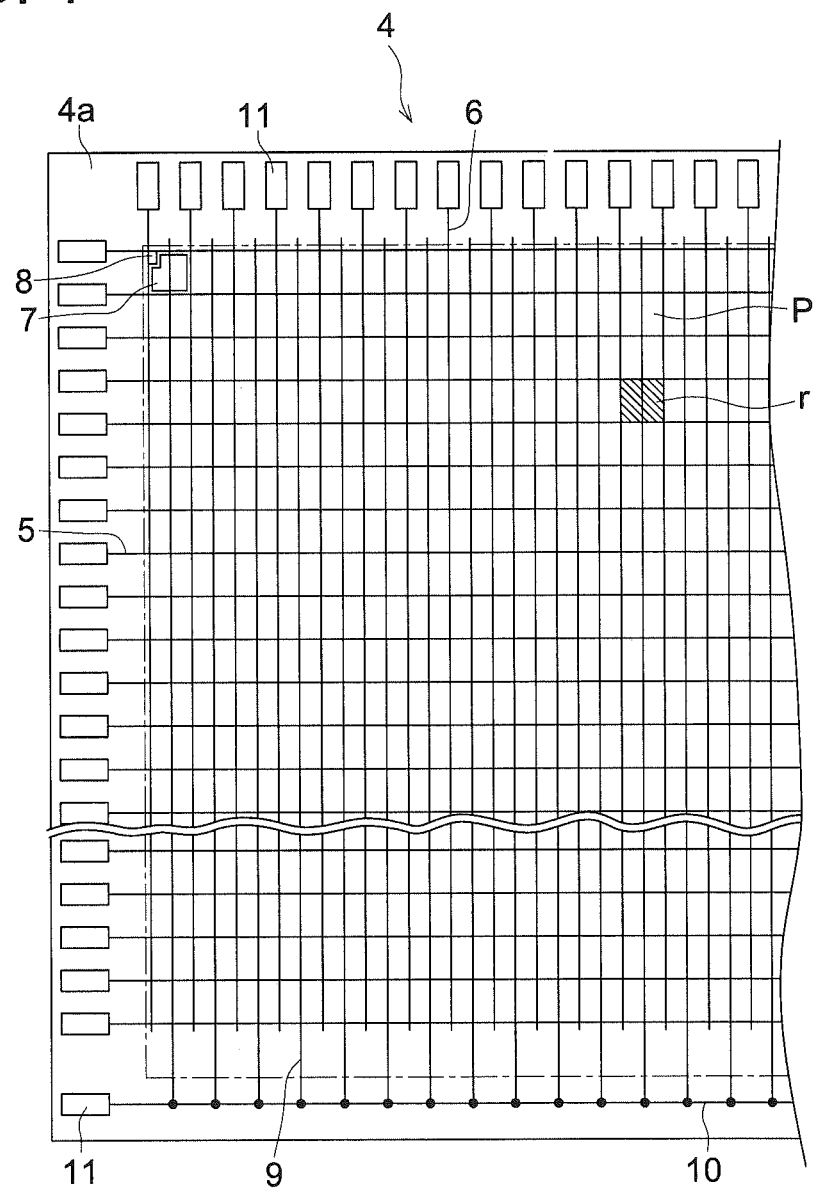
FIG. 4 is a plan view showing the structure of the substrate of the radiation image capturing apparatus.

In the present embodiment, the substrate 4 is formed of a glass substrate. As shown in FIG. 4, a plurality of scanning lines 5 and a plurality of signal lines 6 are arranged on the surface 4a of the substrate 4 on the side opposed to the scintillator 3 so as to cross each other. A radiation detection element 7 is provided in each of the small regions "r" partitioned by a plurality of scanning lines 5 and a plurality of signal lines 6 on the surface 4a of the substrate 4. As described above, the detecting section P is defined as all of the small regions "r", which are partitioned by scanning lines 5 and signal lines 6 and provided with a plurality of radiation detection elements 7 in a two-dimensional array i.e., the entire region indicated by the one-dot chain line in FIG. 4.

Figure 5:
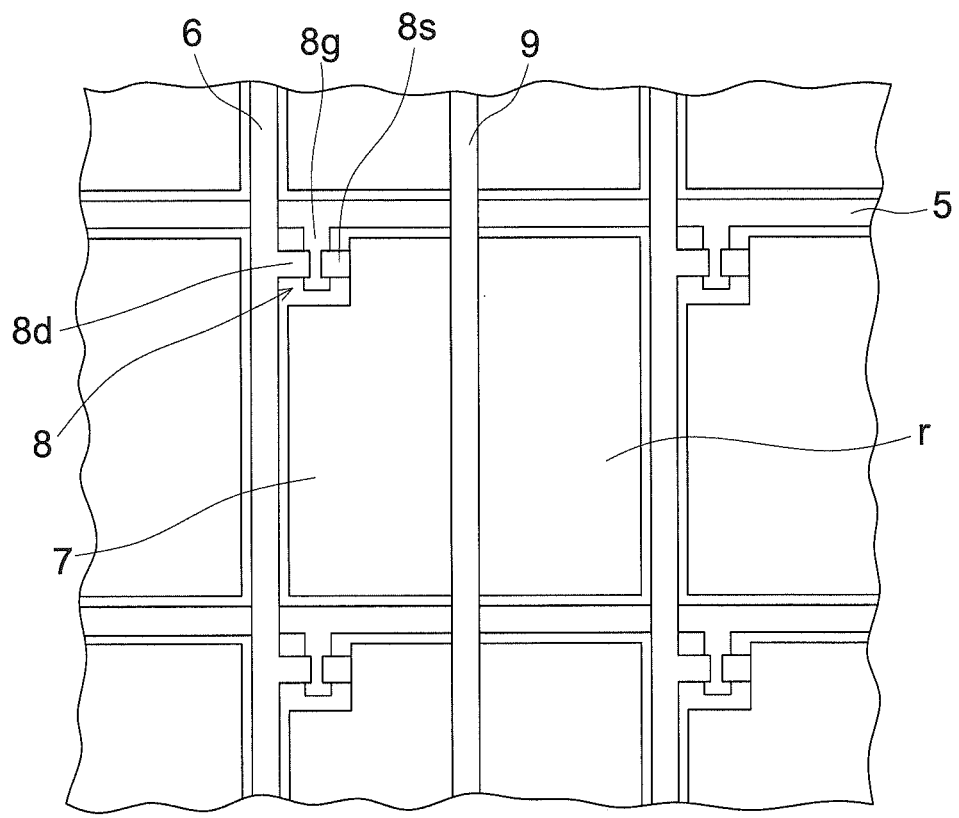
FIG. 5 is an enlarged view showing the structure of the radiation detection elements, TFTs and others formed on the small region on the substrate in FIG. 4.

In the present embodiment, a photodiode is used as the radiation detection element 7. It is also possible to use a phototransistor, for example. Each radiation detection element 7 is connected to the source electrode 8s of the TFT 8 which is a switch unit as shown in FIG. 5 as an enlarged view of FIG. 4. The drain electrode 8d of the TFT 8 is connected to the signal line 6.

Radiation enters the radiation detection element 7 from the radiation incidence surface R of the casing 2 of the radiation image capturing apparatus 1. An electron-hole pair is produced inside when exposed to the electromagnetic wave such as visible light obtained by conversion from the radiation by the scintillator 3. The radiation detection element 7 converts the applied radiation (electromagnetic wave obtained by conversion from radiation by the scintillator 3 in the present embodiment) into electric charges.

The TFT 8 is turned on when on-voltage is applied to the gate electrode 8g from the scanning drive unit 15 (to be described later) through the scanning line 5. Electric charges stored in the radiation detection element 7 are discharged to the signal line 6 through the source electrode 8s and drain electrode 8d. Further, the TFT 8 is turned off when off-voltage is applied to the gate electrode 8g through the connected scanning line 5. This suspends discharge of electric charges from the radiation detection element 7 to the signal line 6 so that electric charges are accumulated inside the radiation detection element 7.

In the present embodiment, one bias line 9 is connected to a plurality of radiation detection elements 7 arranged in rows, as shown in FIG. 5. As illustrated in FIG. 4, each bias line 9 is provided parallel to the signal line 6. Bias lines 9 are united by the wiring 10 outside the detecting section P of the substrate 4.

Figure 6:
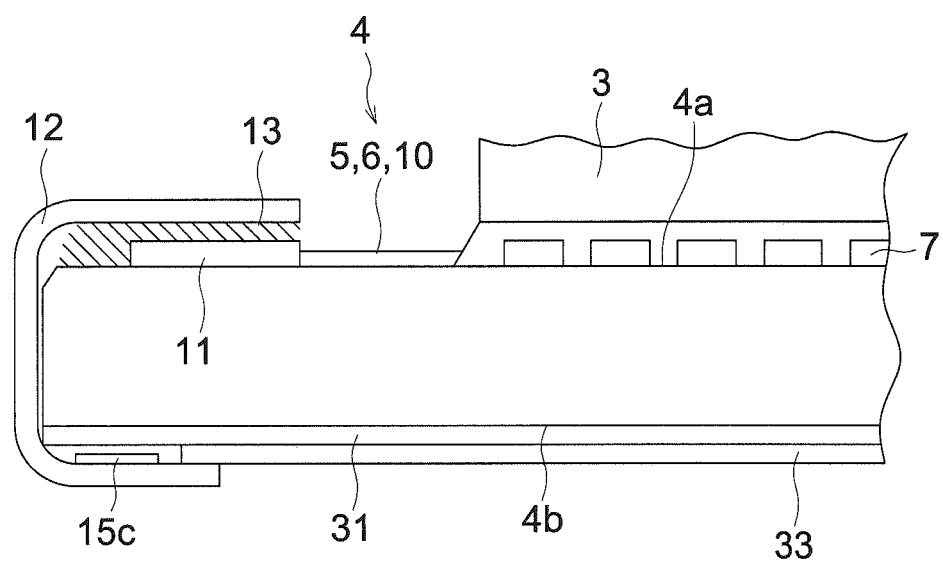
FIG. 6 is a side view showing the substrate on which a flexible circuit substrate and PCB are installed.

In the present embodiment, each scanning line 5, signal line 6 and the wiring 10 of bias line 9 is connected to the input/output terminal (also called a pad) 11 provided close to the edge of the substrate 4, as shown in FIG. 4. As shown in FIG. 6, each input/output terminal 11 is connected with a flexible circuit substrate (also-called a Chip On Film) 12, wherein the chip of the gate IC 15c and others constituting the gate driver 15b of the scanning drive unit 15 (to be described later) are built on the film, through such an anisotropic conductive adhesive agent 13 as an anisotropic conductive film and anisotropic conductive paste.

The flexible circuit substrate 12 is routed to the reverse side 4b of the substrate 4, and is connected with the aforementioned PCB 33 on the reverse side 4b. The sensor panel SP of the radiation image capturing apparatus 1 is formed in this manner. It should be noted that electronic parts 32 are not illustrated in FIG. 6.

Figure 7:
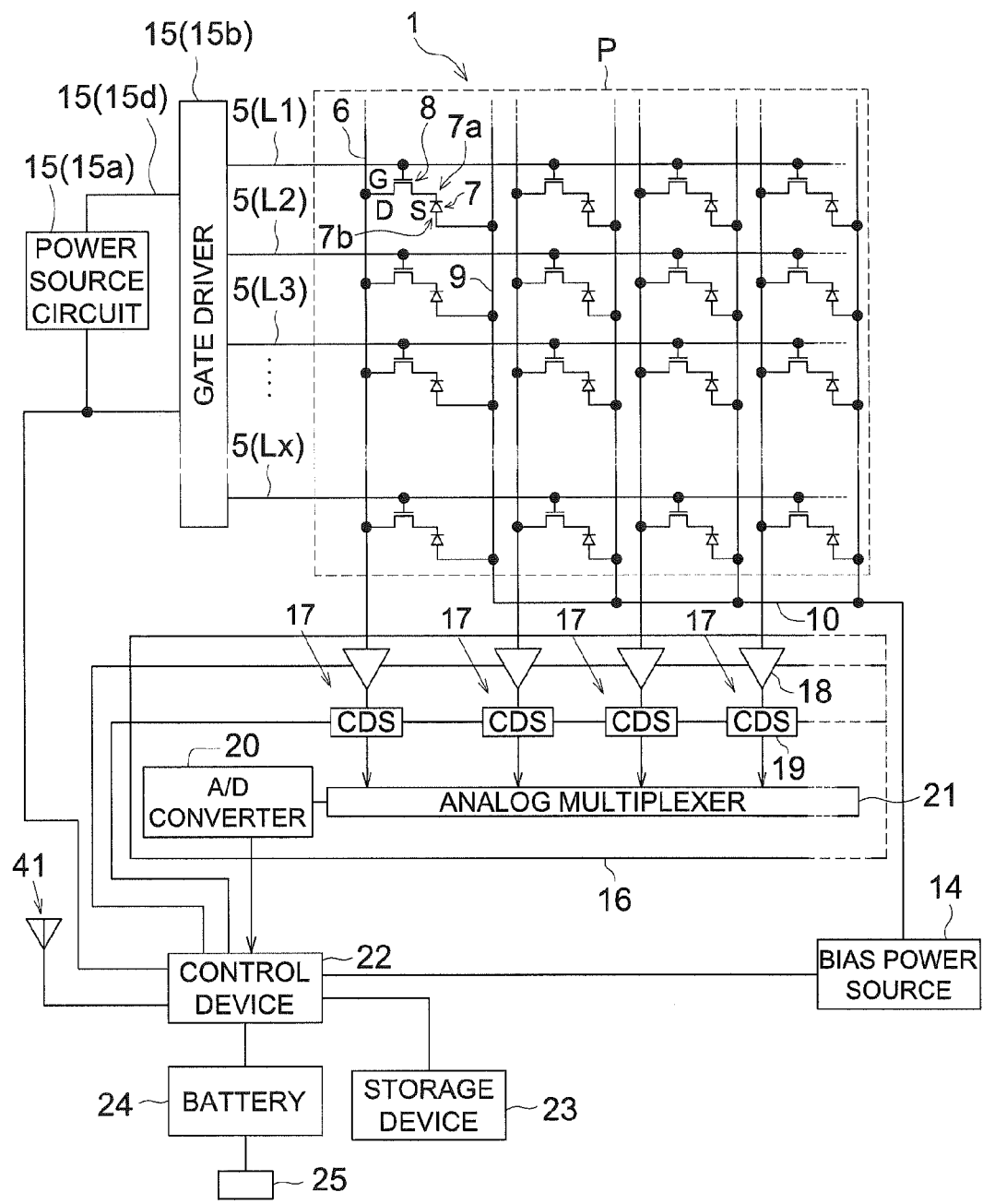
FIG. 7 is a block diagram showing the equivalent circuit of the radiation image capturing apparatus.
Figure 8:
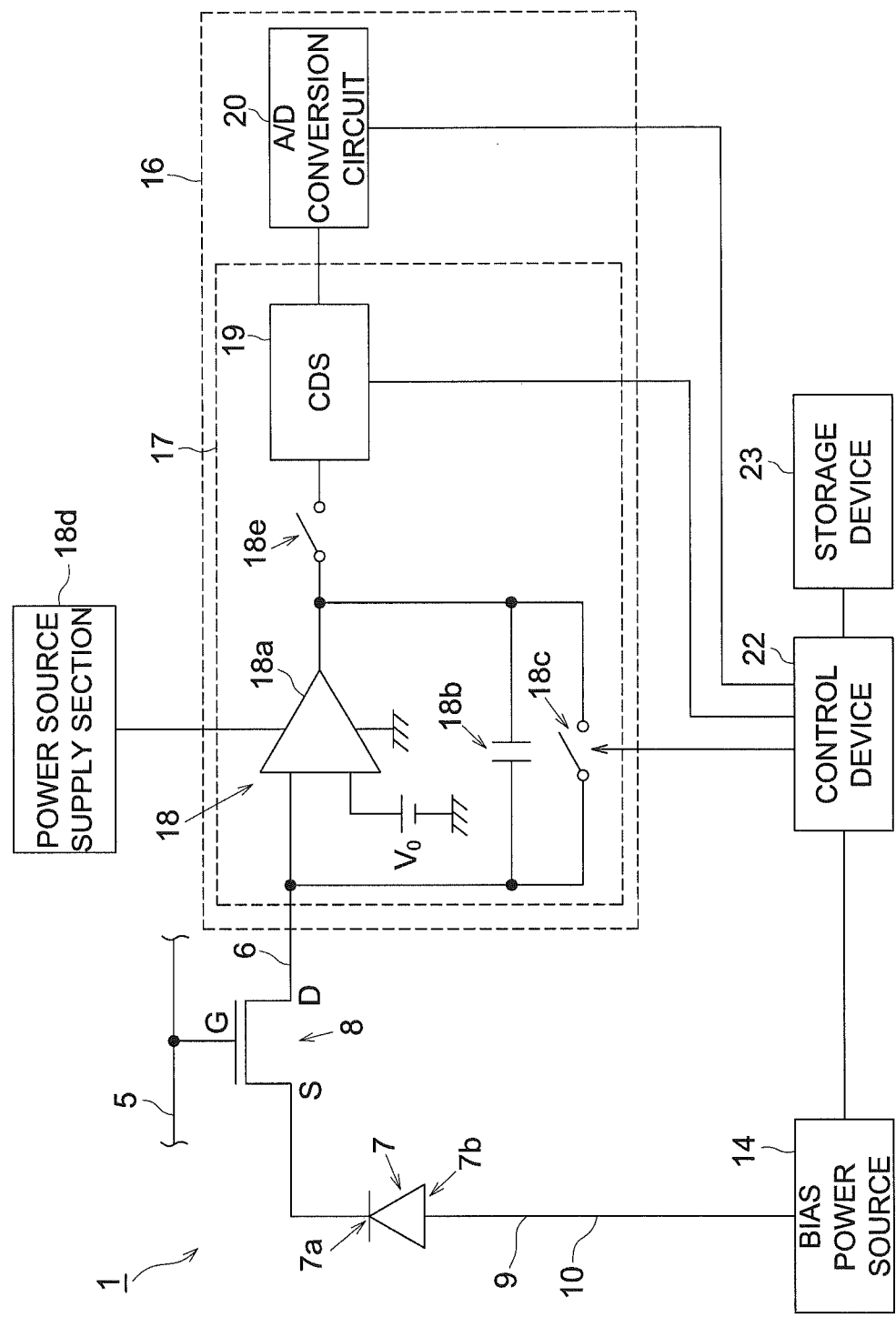
FIG. 8 is a block diagram showing the equivalent circuit for one pixel constituting the detecting section.

The following describes the structure of the circuit of the radiation image capturing apparatus 1. FIG. 7 is a block diagram showing the equivalent circuit of the radiation image capturing apparatus 1. FIG. 8 is a block diagram showing the equivalent circuit for one pixel constituting the detecting section P.

As described above, in each radiation detection element 7 of the detecting section P of the substrate 4, a bias line 9 is connected to each of the second electrodes 7b. Bias lines 9 are united by the wiring 10, and are connected to the bias power source 14. The bias power source 14 applies bias voltage to the second electrode 7b of each radiation detection element 7 through the wiring 10 and each of bias lines 9. Further, the bias power source 14 is connected to the control device 22 (to be described later) so as to control the bias voltage to be applied to each radiation detection element 7 from the bias power source 14 by the control device 22.

As shown in FIGS. 7 and 8, in the present embodiment, voltage (so-called inverse bias voltage) equal to or less than the voltage applied to the first electrode 7a of the radiation detection element 7 is applied from the bias power source 14 as bias voltage to the second electrode 7b of the radiation detection element 7 through the bias line 9.

The scanning drive unit 15 is provided with a power source circuit 15a for supplying on-voltage and off-voltage to the gate driver 15b through the wiring 15d, and a gate driver 15b for switching between on-voltage and off-voltage to be applied to each of the lines L1 through Lx of the scanning line 5 so that the on/off state of each of the TFTs 8 is switched. In the present embodiment, the gate driver 15b is constituted by a plurality of the aforementioned gates IC 15c (FIG. 6) installed in parallel.

As shown in FIGS. 7 and 8, the signal lines 6 are connected to the reading circuits 17 incorporated in the reading IC 16, respectively. The reading circuit 17 includes an amplification circuit 18 and correlated dual sampling circuit 19. The reading IC 16 further incorporates an analog multiplexer 21 and A/D conversion circuit 20. It should be noted that, in FIG. 7 and FIG. 8, the correlated dual sampling circuit 19 is represented as CDS. Further, in FIG. 8, the analog multiplexer 21 is not illustrated.

In the present embodiment, the amplification circuit 18 includes operation amplifier 18a, the capacitor 18b and charge reset switch 18c connected parallel to the operation amplifier 18a and a charge amplifier circuit equipped with a power source supply section 18d for supplying power to the operation amplifier 18a and others. A signal line 6 is connected to the reverse input terminal on the input side of the operation amplifier 18a of the amplification circuit 18. A base voltage $V_0$ is applied to the non-reverse input terminal on the input side of the amplification circuit 18. It should be noted that the base voltage $V_0$ is set to an appropriate value. In the present embodiment, a base voltage $V_0$ of 0 volt is applied, for example.

Further, the charge reset switch 18c of the amplification circuit 18 is connected to the control device 22, and is placed under the on/off control by the control device 22. Further, a switch 18e that switches synchronous with the charge reset switch 18c is installed between the operation amplifier 18a and correlated dual sampling circuit 19. The switch 18e is turned on or off synchronous with the on-off operation of the charge reset switch 18c.

When performing the step of resetting each radiation detection element 7 to remove electric charges remaining in each radiation detection element 7 in the radiation image capturing apparatus 1, each of the TFTs 8 is turned on while the charge reset switch 18c is kept turned on (and the switch 18e is turned off), as shown in FIG. 9.

Then electric charge is discharged to the signal line 6 from each radiation detection element 7 through each of the TFTs 8 having been turned on. Passing through the charge reset switch 18c of the amplification circuit 18, the electric charge flows through the operation amplifier 18a from the output terminal side of the operation amplifier 18a and comes out of the non-reverse input terminal to the ground, or flows out to the power source supply section 18d. In this manner, each radiation detection element 7 is subjected to resetting processing.

At the time of reading of image data D from each radiation detection element 7, the electric charge is discharged to the signal line 6 from each radiation detection element 7 through each of the TFTs 8 being turned on, while the charge reset switch 18c of the amplification circuit 18 is kept turned off (and switch 18e kept turned on), as shown in FIG. 10. Then the electric charge is accumulated in the capacitor 18b of the amplification circuit 18.

In the amplification circuit 18, the voltage value in conformity to the amount of the electric charge accumulated in the capacitor 18b is outputted from the output side of the operation amplifier 18a. The electric charge flowing out of each radiation detection element 7 is subjected to charge voltage conversion by the amplification circuit 18.

When the pulse signal Sp1 (FIG. 10) has been sent from the control device 22 before the electric charge flows out of each radiation detection element 7, the correlated dual sampling circuit (CDS) 19 arranged on the output side of the amplification circuit 18 retains the voltage value Vin outputted from the amplification circuit 18 at this moment. When a pulse signal Sp2 is sent from the control device 22 after the electric charge having flown out of the each radiation detection element 7 has been accumulated in the capacitor 18b of the amplification circuit 18, the correlated dual sampling circuit (CDS) 19 retains the voltage value Vfi outputted from the amplification circuit 18 at this moment.

When the voltage value Vfi is retained by means of the second pulse signal Sp2, the correlated dual sampling circuit 19 calculates the difference Vfi-Vin of the voltage value, and outputs the calculated difference Vfi-Vin downstream as image data D of the analog value. The image data D of each radiation detection element 7 outputted from the correlated dual sampling circuit 19 is sequentially sent to the A/D conversion circuit 20 through the analog multiplexer 21. After having been converted to the image data D of digital value sequentially by the A/D conversion circuit 20, the image data D is outputted to the storage device 23 and is stored sequentially.

Upon completion of reading of the first image data D, charge reset switch 18c of the amplification circuit 18 is turned on (FIG. 10), and the electric charge accumulated in the capacitor 18b is discharged. Similarly to the above, the discharged electric charge passes through the operation amplifier 18a from the output terminal side of the operation amplifier 18a and comes out of the non-reverse input terminal to enter the ground or flows out into the power source supply section 18d. Then the amplification circuit 18 is reset.

The control device 22 includes the unillustrated CPU (Central Processing Unit), ROM (Read Only Memory), RAM (Random Access Memory), computer connected with an input/output interface through a bus, and FPGA (Field Programmable Gate Array). The control device 22 can be formed of an exclusive control circuit.

The control device 22 controls the operation of each component members of the radiation image capturing apparatus 1. Further, as shown in FIG. 7, the control device 22 is connected with the storage device 23 including a SRAM (Static RAM), SDRAM (Synchronous DRAM) and others.

In the present embodiment, the control device 22 is connected with the aforementioned antenna device 41, and a battery 24 for supplying power to the components such as a detecting section P, scanning drive unit 15, reading circuit 17, storage device 23, and a bias power source 14. The battery 24 is provided with a connection terminal 25 for recharging the battery 24 by supplying the power to the battery 24 from a charging device (not illustrated).

As described above, the control device 22 controls the operation of the functioning components of the radiation image capturing apparatus 1, for example, by controlling the bias power source 14 to set or adjust the bias voltage applied to each radiation detection element 7 from the bias power source 14.

Detection of the start of irradiation in the radiation image capturing apparatus 1 will be described after describing the radiation image capturing system 50 of the present embodiment.

[Radiation Image Capturing System]

Figure 11:
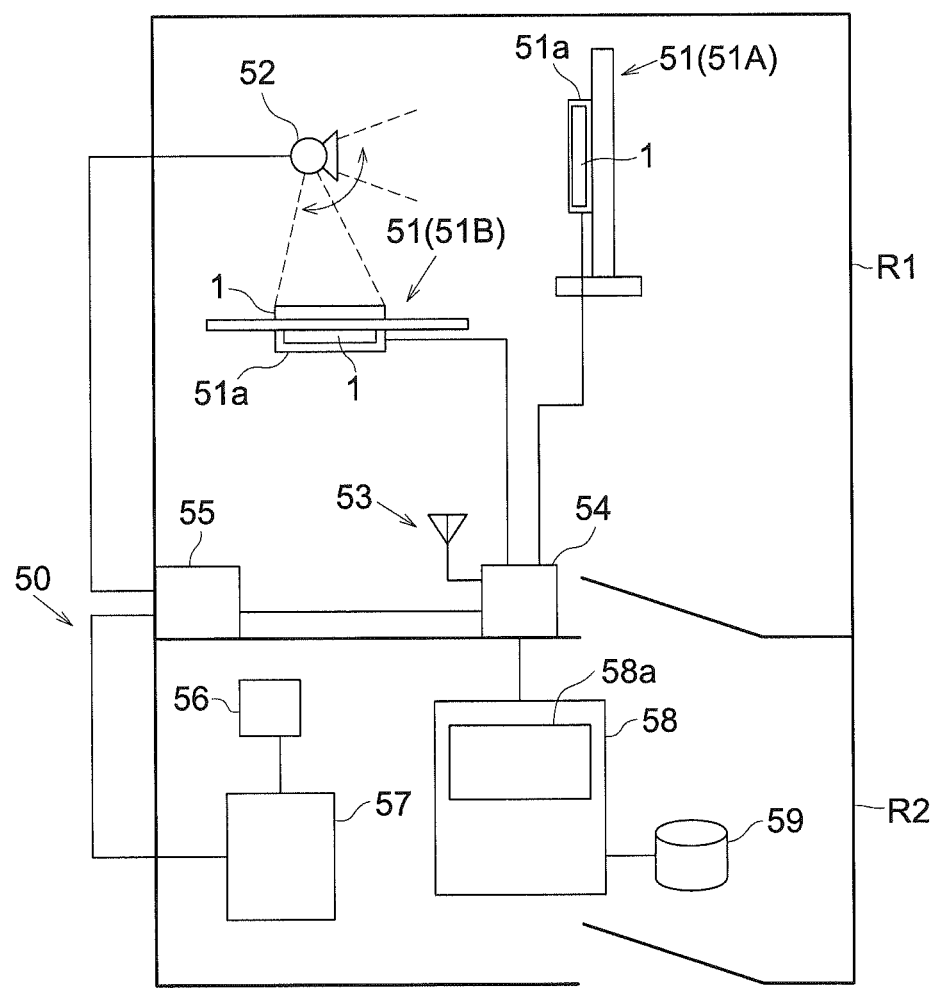
FIG. 11 is a diagram showing the structure of the radiation image capturing system configured in a radiographing room.
Figure 12:
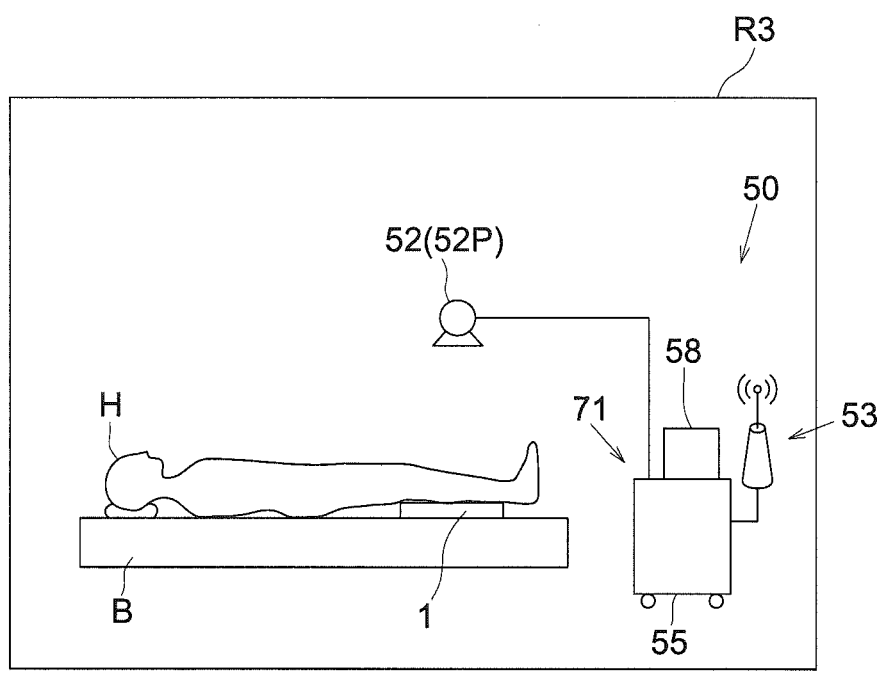
FIG. 12 is a diagram showing the structure of the radiation image capturing system configured on a round visiting car.

The following describes the radiation image capturing system of the present embodiment. FIG. 11 and FIG. 12 show the structure of the radiation image capturing system of the present embodiment.

FIG. 11 shows the radiation image capturing system 50 installed in the radiographing room R1 or anteroom (also-called an operation room) R2 of a hospital and others. FIG. 12 shows the radiation image capturing system 50 that is installed in the round visiting car 71 to be carried into a medical ward R3. In FIG. 12, "H" indicates an examinee as an subject, and "B" denotes a bed B on which the examinee lies down.

The following mainly describes the cases wherein the radiation image capturing system 50 is installed in a radiographing room R1 and the like, as shown in FIG. 11. The following description also applies to the case wherein the radiation image capturing system 50 is installed in the round visiting car 71 of FIG. 12.

As shown in FIG. 11, a bucky device 51 is installed in the radiographing room R1. The bucky device 51 can be used with the radiation image capturing apparatus 1 mounted on the cassette holder 51a thereof.

In FIG. 11, a bucky device 51A for standing position radiographing and bucky device 51B for recumbent position radiographing are installed as bucky devices 51. However, either one of bucky device 51A for standing position radiographing and bucky device 51B for recumbent position radiographing can be installed, for example.

It is also possible to adopt such a structure that the radiation image capturing apparatus 1 is mounted on the bucky device 51 with the connector C at the tip end of the cable Ca extended from the bucky device 51 being linked to the connector 39 of the radiation image capturing apparatus 1, as shown in FIG. 3.

In this case, as described above, the radiation image capturing apparatus 1 can exchange signals with the console 58 by wired means through the connector 39 or cable Ca, and can send image data D to the console 58 as an image processing apparatus.

Figure 18:
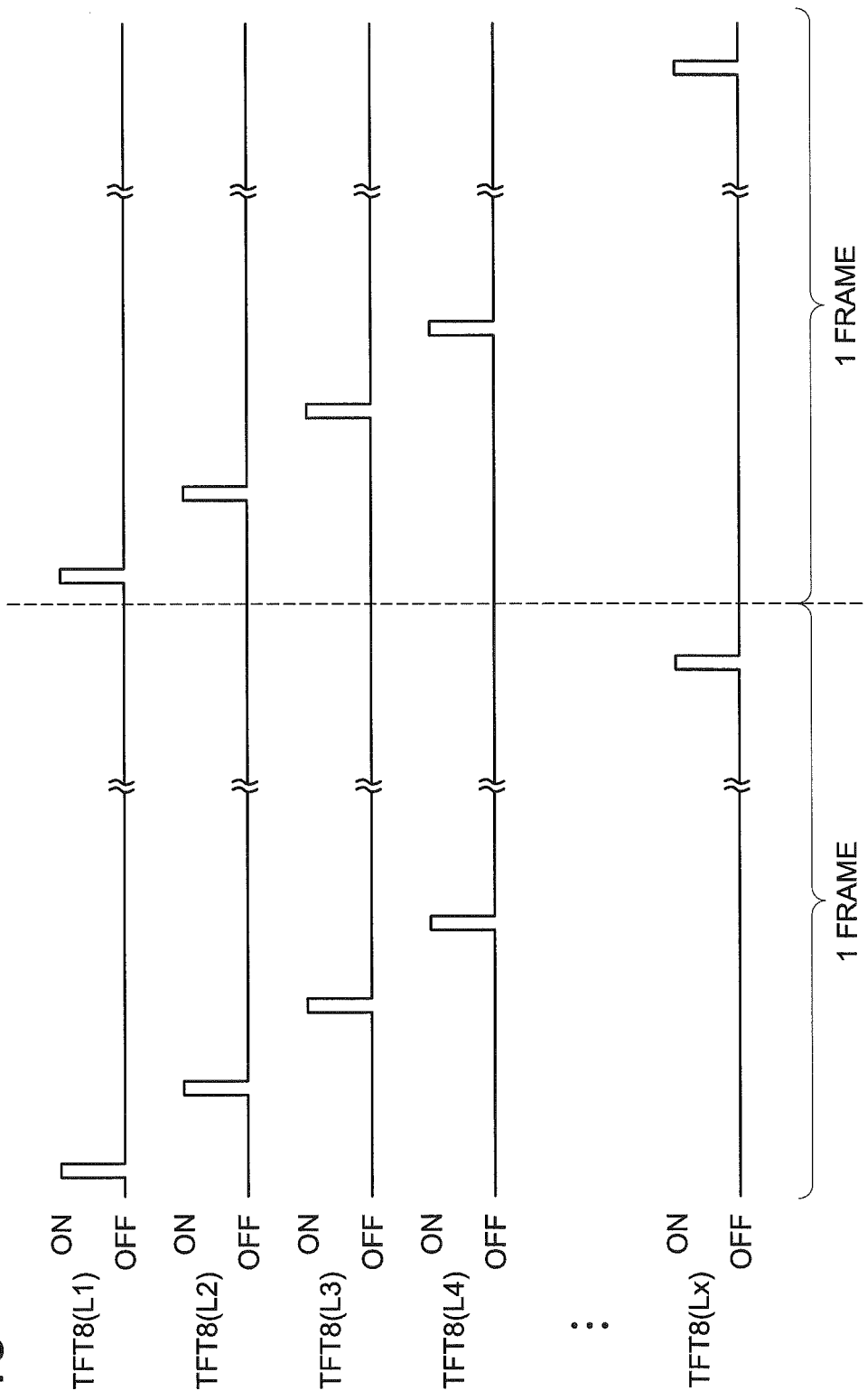
FIG. 18 is a timing chart showing the timing when on-voltage is sequentially applied to each scanning line, in the case where the step of reading the image data is repeated prior to radiation image capturing operation in the detection method 2.

As shown in FIG. 12, when the radiation image capturing system 50 is mounted in the round visiting car 71, the radiation image capturing system 50 can be mounted with the cable Ca connected to the radiation image capturing apparatus 1, as shown in FIG. 18. However, if the cable Ca disturbs the radiographing technician in radiographic imaging operation, imaging operation can be performed without a cable Ca connected to the radiation image capturing apparatus 1.

As shown in FIG. 11, the radiographing room R1 is provided with at least one radiation source 52 that applies radiation through the subject to the radiation image capturing apparatus 1 mounted on the bucky device 51. In the present embodiment, one radiation source 52 is capable of irradiating both the bucky device 51A for standing position radiographing and bucky device 51B for recumbent position radiographing by changing the position of the radiation source 52 or changing the direction of irradiation.

In the radiation image capturing system 50 installed in the round visiting car 71, the radiation image capturing apparatus 1 is used independently without being mounted on the bucky device 51, as shown in FIG. 12. For example, if a patient H is unable to rise from the bed B of the medical ward R3 to go into the radiographing room R1, the radiation image capturing apparatus 1 can be inserted between the bed B and patient's body or can be applied to the patient's body, as shown in FIG. 12.

When the radiation image capturing apparatus 1 is used in a medical ward R3, the radiation generator 55 or radiation source 52 installed in the aforementioned radiographing room R1 cannot be brought into the medical ward R3. In this case, the radiation generator 55 is mounted, for example, on the round visiting car 71, and is brought into the medical ward R3, as shown in FIG. 12.

In this case, the radiation source 52P is capable of applying radiation in a desired direction. Adjustment is made in such a way that radiation is applied from an appropriate distance and direction to the radiation image capturing apparatus 1 inserted between the bed B and patient's body or applied to the patient's body.

As shown in FIG. 11, in the radiographing room R1, the radiation image capturing apparatus 1 can be used, for example, by being inserted between the patient's body lying on a bucky device 51B for recumbent position radiographing and the bucky device 51B for recumbent position radiographing, or by being applied to the patient's body on the bucky device 51B for recumbent position radiographing. In this case, a portable radiation source can be used as the radiation source 52. Further, the radiation source 52 installed in the radiographing room R1 can also be used.

As shown in FIG. 11, the radiographing room R1 is provided with a relay (also-called a base station) 54 for relaying in communication between various devices in and out of the radiographing room R1. In the present embodiment, the relay 54 is provided with a wireless antenna (also-called an access point) 53 to ensure that the radiation image capturing apparatus 1 exchanges image data D and signals by wireless means.

The relay 54 is connected with the radiation generator 55 and console 58, and incorporates a converter (not illustrated) for ensuring that the LAN communication signals to be sent to the radiation generator 55 from the radiation image capturing apparatus 1 or console 58 are converted into the signals for the radiation generator 55, or the signals for the radiation generator 55 are converted into the LAN communication signals.

In the radiation image capturing system 50 installed in the round visiting car 71 of FIG. 12, the radiation generator 55 is provided with a built-in or externally attached converter (not illustrated) for ensuring that the LAN communication signals are converted into the signals for the radiation generator 55, or the signals for the radiation generator 55 are converted into the LAN communication signals. This converter is equipped with a wireless antenna 53.

The anteroom (also-called an operation room) R2 of the present embodiment is provided with the control console 57 of a radiation generator 55. The control console 57 has a radiation exposure switch 56 that is operated by the radiographing technician to send instructions for irradiation start and others to the radiation generator 55. In the present embodiment, radiation is emitted from the radiation source 5 by the operation of the radiation exposure switch 56 by the radiographing technician or others.

In the radiation image capturing system 50 installed in the round visiting car 71 of FIG. 12, the radiation generator 55 installed in the round visiting car 71 also serves as a control console 57, and the radiation generator 55 is provided with a radiation exposure switch 56 not illustrated in FIG. 12.

To ensure that an appropriate dosage of radiation will be applied from the radiation source 52, the radiation generator 55 controls the radiation source 52 by supplying a prescribed tube current or tube voltage to the radiation source 52 or adjusting the time of irradiation from the radiation source 52.

In the present embodiment, a console 58 formed of a computer and others is installed in the anteroom R2 in FIG. 11. In FIG. 12, the console 58 is installed in the round visiting car 71. In FIG. 11, the console 58 can be installed outside the radiographing room R1 or anteroom R2, or in a separate room. The installation site of the console 58 can be determined as desired.

In the present embodiment, the console 58 is provided with a display section 58a (not illustrated in FIG. 12) having a CRT (Cathode Ray Tube) and LCD (Liquid Crystal Display). Further, a storage device 59 (not illustrated in FIG. 12) formed of a HDD (Hard Disk Drive) and others is connected or incorporated.

When the image data D is sent from the radiation image capturing apparatus 1, the console 58 displays a preview image on the display section 58a based on the data. The radiographing technician observes the displayed preview image, and checks if the subject is captured in the image or not, or if the image capturing position in the image is appropriate or not, so that a decision will be made to determine if the radiographing operation should be repeated or not.

In the present embodiment, the console 58 serves as an image processing apparatus. If the radiographing technician has determined that there is no need of repeating the radiographic operation, the image data D is subjected to prescribed image processing such as offset correction, gain correction, defective image correction and gradation processing, and a radiation image is generated. Image processing in the console 58 as an image processing apparatus will be described later.

[Control Structure for Detecting the Start of Irradiation]

The following describes the control structure for detecting the start of irradiation in the radiation image capturing apparatus 1 of the present embodiment.

In the present embodiment, irradiation from the radiation source 52 is detected by the radiation image capturing apparatus 1 itself without using any interface between the radiation image capturing apparatus 1 and radiation generator 55. The following describes the method for detecting the start of irradiation in the radiation image capturing apparatus 1 of the present embodiment.

The detection method in the present embodiment has been newly found out in the research and development efforts made by the present inventors. This is different from the method described in the Specification of the aforementioned U.S. Pat. No. 7,211,803 or the Unexamined Japanese Patent Application Publication No. 2009-219538, wherein a current detection unit is provided in the system, and the start of irradiation is detected based on the output value from the current detection unit. Either one of the following two detection methods can be adopted as the new detection method found out in the research and development efforts made by the present inventors.

[Detection Method 1]

Figure 13:
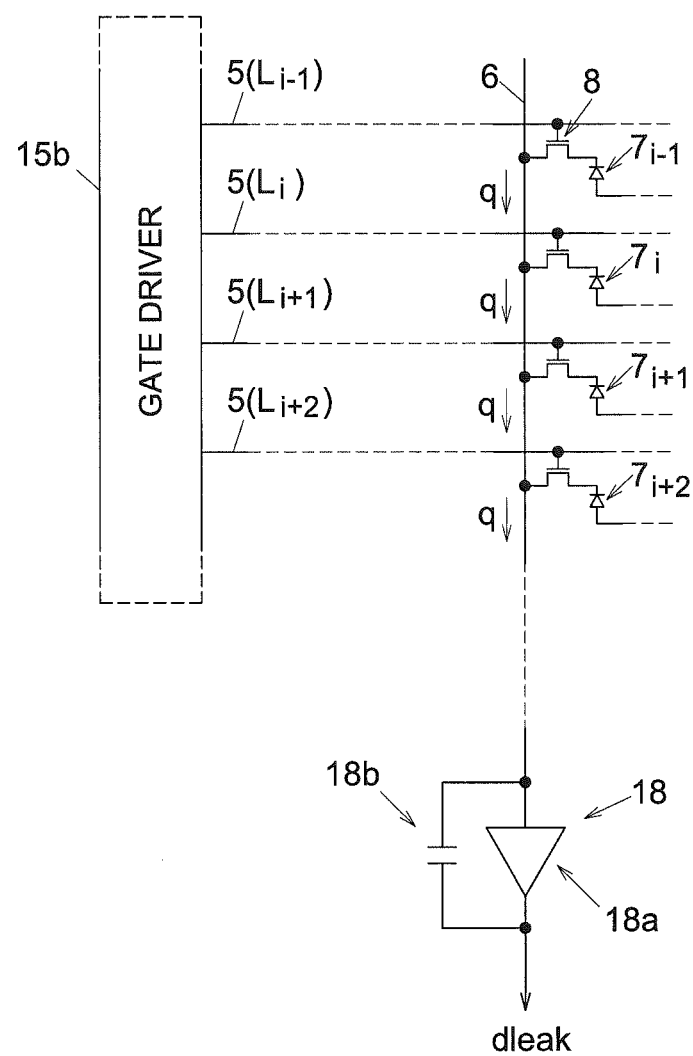
FIG. 13 is a diagram showing how the electric charge leaking from the radiation detection element through the TFT is read out as leak data.

For example, the radiation image capturing can be designed in such a way that the reading of leak data "d leak" is repeatedly performed before the radiation image capturing apparatus 1 is exposed to radiation. The leak data "d leak" is the data corresponding to the total value for each signal line 6 of the electric charge "q" leaking from each radiation detection element 7 through each of the TFTs 8 which is turned off with off-voltage applied to each scanning line 5, as shown in FIG. 13.

Figure 14:
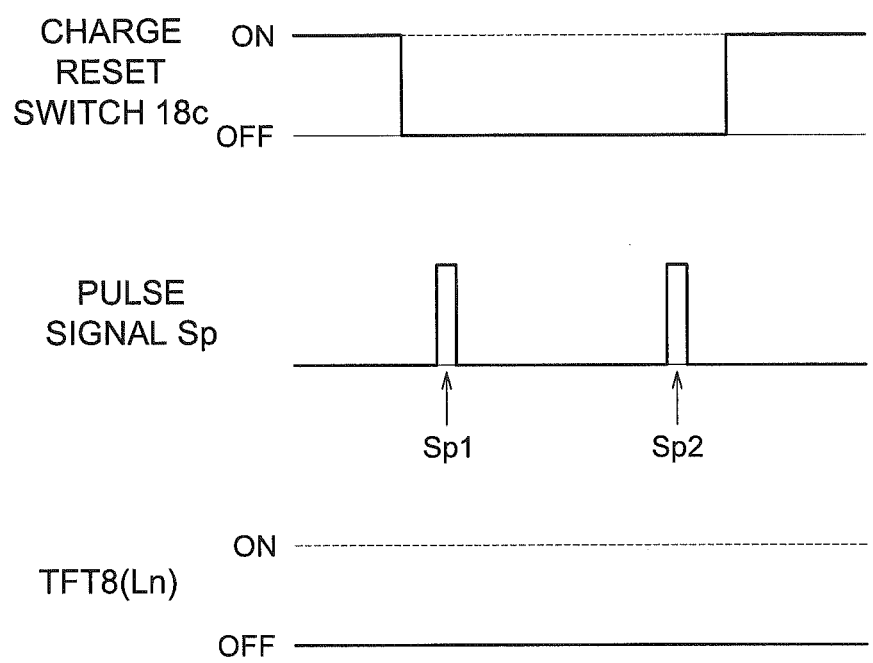
FIG. 14 is a timing chart showing the on-off timing of the charge reset switch and TFT in the step dreading the leak data.

In the step of reading the leak data "d leak", differently from the step of image data D reading in FIG. 10, off-voltage is applied to each of the lines L1 through Lx of the scanning line 5 so that each of the TFTs 8 is turned off, as shown in FIG. 14. Under this condition, pulse signals Sp1 and Sp2 are sent from the control device 22 to the correlated dual sampling circuit 19 (CDS of FIGS. 7 and 8) of each reading circuit 17.

When pulse signal Sp1 has been sent from the control device 22, the correlated dual sampling circuit 19 retains the voltage value Vin outputted from the amplification circuit 18 at this moment. The electric charge "q" leaking from each radiation detection element 7 is accumulated in the capacitor 18b of the amplification circuit 18 through each of the TFTs 8, and the voltage value outputted from the amplification circuit 18 is increased. When the pulse signal Sp2 has been sent from the control device 22, the correlated dual sampling circuit 19 retains the voltage value Vfi outputted from the amplification circuit 18 at this moment.

The value outputted by calculation of the difference Vfi-Vin of the voltage value by the correlated dual sampling circuit 19 is used as leak data "d leak". After that, the leak data "d leak" is converted into the digital value by the A/D conversion circuit 20, similarly to the step of the aforementioned reading of image data D.

However, if the configuration is so designed that only the step of reading the leak data "d leak" is repeated, each of the TFTs 8 remains turned off, and the dark charge occurred in each radiation detection element 7 continues to be accumulated in each radiation detection element 7.

Figure 15:
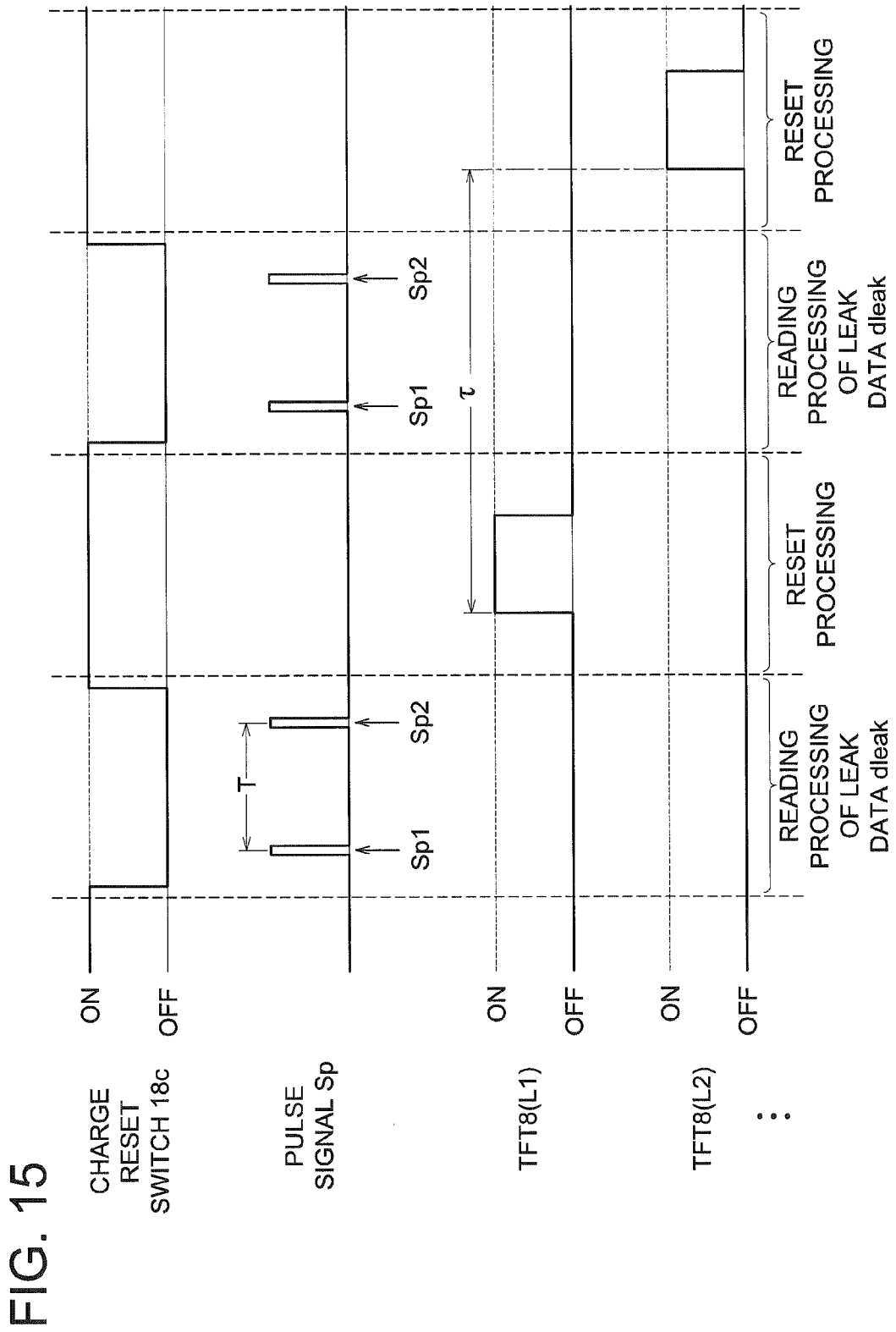
FIG. 15 is a timing chart showing the on-off timing of the charge reset switch, pulse signal and TFT when a step of reading the leak data and step of resetting each radiation detection element are performed on an alternate basis prior to radiation image capturing.

As described above, if the structure is so configured that the step of reading the leak data "d leak" is repeated prior to the radiation image capturing operation, there is preferably an alternate repetition of the step of reading the leak data "d leak" to be performed with the off-voltage applied to each scanning line 5, and the step of resetting the radiation detection element 7 to be performed with the on-voltage applied sequentially to each of the lines L1 through Lx of the scanning line 5, as shown in FIG. 15. T and τ in FIGS. 15 and 16 will be described later.

As described above, if the configuration is so designed that the step of reading the leak data "d leak" and the step of resetting each radiation detection element 7 are performed on an alternate basis prior to radiation image capturing operation, the electromagnetic wave created by conversion from radiation by the scintillator 3 (FIG. 2) is applied to each of the TFTs 8, when the irradiation of the radiation image capturing apparatus 1 is started. This results in an increase in the volume of electric charge "q" (FIG. 13) leaking from each radiation detection element 7 through each of the TFTs 8, which was revealed by the research and development efforts of the present inventors.

Figure 16:
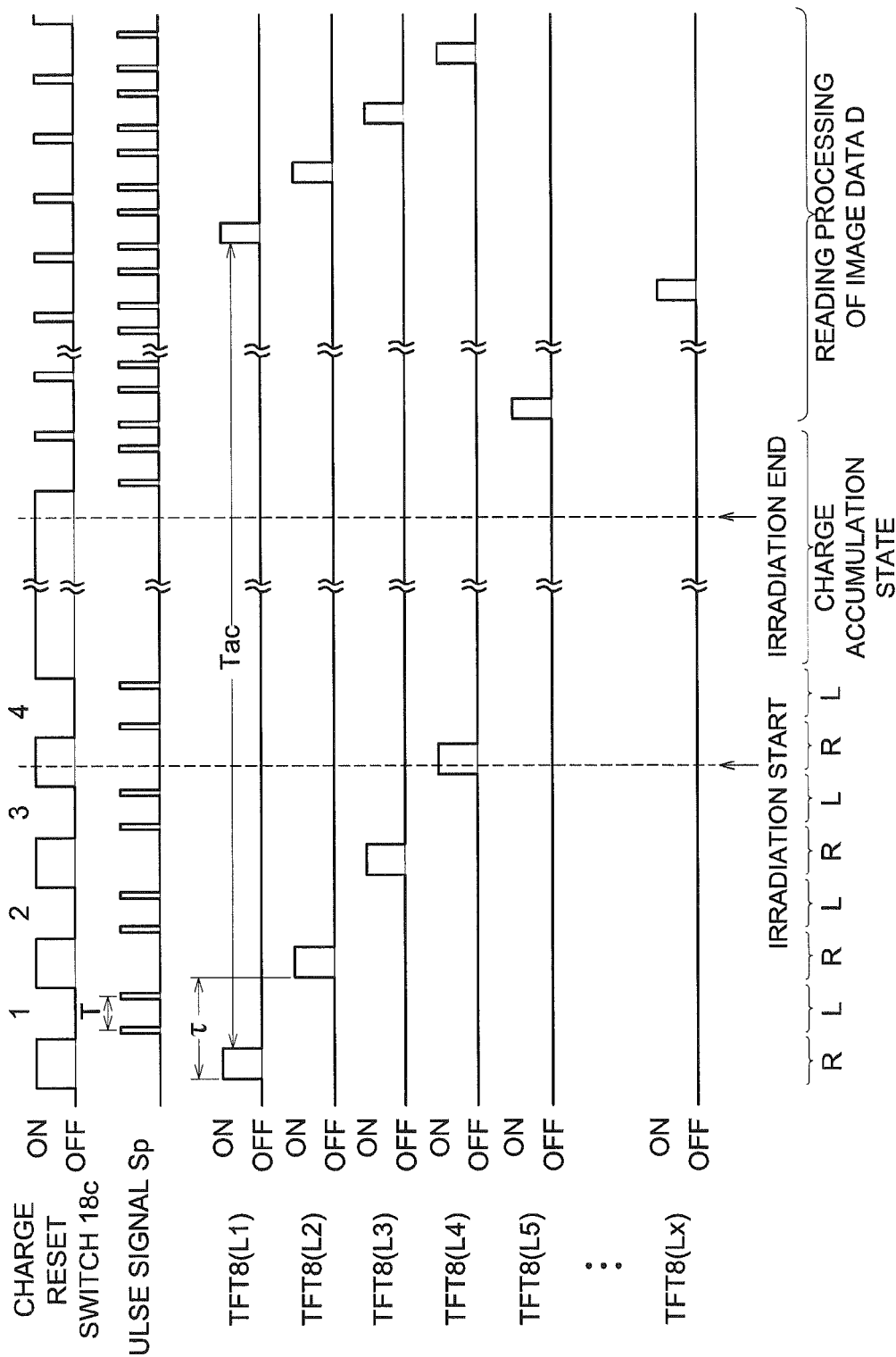
FIG. 16 is a timing chart showing the timing for applying on-voltage to each scanning line in the detection method 1.
Figure 17:
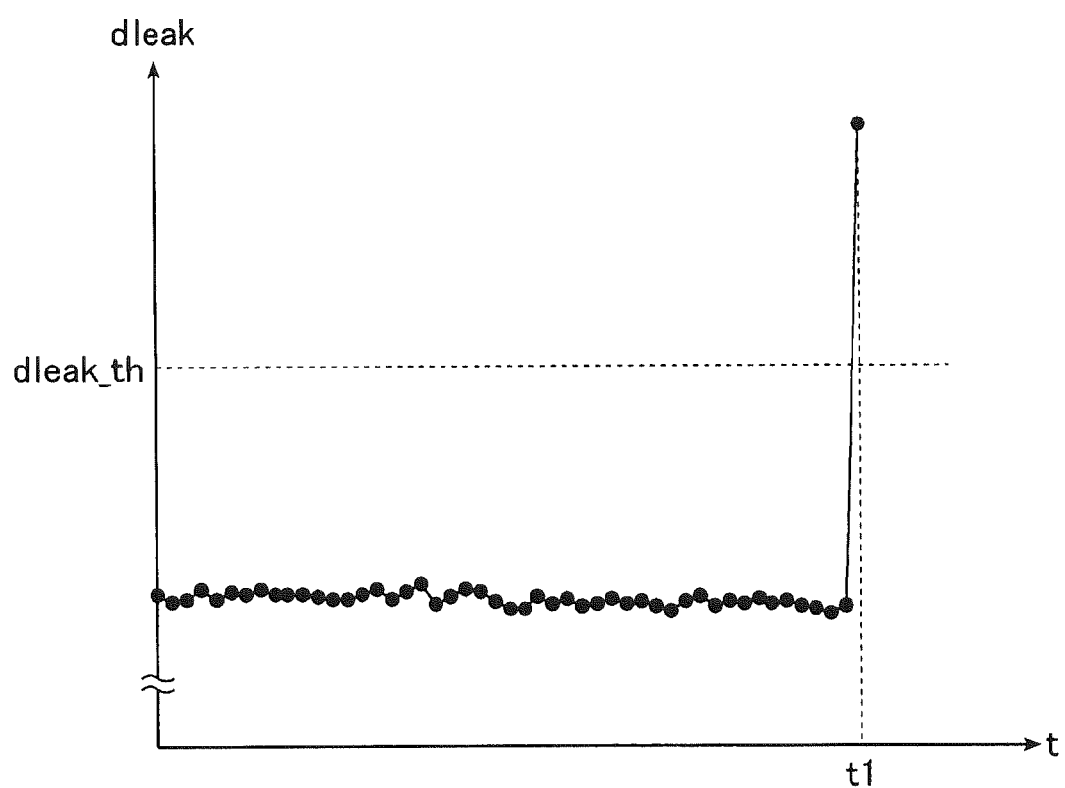
FIG. 17 is a chart in which the leak data having been read out is plotted in chronological order.

If the step of reading the leak data "d leak" and the step of resetting each radiation detection element 7 are repeated on an alternate basis prior to radiation image capturing operation, as shown in FIG. 16, the leak data "d leak" read out at the moment when the irradiation of the radiation image capturing apparatus 1 has started will be much greater than the leak data "d leak" read previously as shown in FIG. 17.

Regarding FIGS. 16 and 17, on-voltage is applied to the line L4 of the scanning line 5 in FIG. 16 and the step of resetting is performed. The leak data "d leak" having been read in the 4th reading operation corresponds to the leak data "d leak" at time t1 of FIG. 17. Further, "R" in FIG. 16 represents the step of resetting each radiation detection element 7, and "L" denotes the step of reading the leak data "d leak". Tac in FIG. 16 will be described later.

It is possible to arrange such a configuration that the control device 22 of the radiation image capturing apparatus 1 monitors the leak data "d leak" having been read out in the step of reading the leak data "d leak" prior to radiation image capturing. Thus, when the leak data "d leak" having been read out has exceeded a prescribed threshold value "d leak_th" (FIG. 17) set in advance, the start of irradiation is detected.

In this case, when the control device 22 has detected the start of irradiation in the manner described above, application of on-voltage to each scanning line 5 is suspended at this moment, as shown in FIG. 16, and off-voltage is applied to all the lines L1 through Lx in the scanning line 5 from the gate driver 15b so that each of the TFTs 8 is turned off. Then the electric charge produced inside each radiation detection element 7 by irradiation is accumulated in each radiation detection element 7 so that the element is kept supplied with electric charges.

A prescribed time after detection of the start of irradiation, the control device 22 starts application of on-voltage to the scanning line 5 (line L5 of the scanning line 5 in FIG. 16) to which on-voltage is to be applied immediately after scanning line 5 (line LA of the scanning line 5 in FIG. 16) to which on-voltage was applied at the time or immediately before the start of irradiation has been detected in the step of reading the leak data "d leak" prior to radiation image capturing. Thus, on-voltage is sequentially applied to each scanning line 5, and image data D as the main image is read.

FIG. 16 shows the case wherein application of on-voltage is started from line Ln+1 immediately after the line Ln of the scanning line 5 to which on-voltage has been applied, at the moment the start of irradiation has been detected, and the image data D as the main image is read. However, for example, it is also possible to arrange such a configuration that application of on-voltage is started from the first line L1 of the scanning line 5, and the image data D is read.

[Detection Method 2]

Instead of the structure wherein the step of reading the leak data "d leak" is performed prior to the radiation image capturing operation as in the aforementioned detection method 1, it is possible to adopt such a structure that on-voltage is sequentially applied to each of the lines L1 through Lx of the scanning line 5 from the gate driver 15b of the scanning drive unit 15, prior to radiation image capturing operation, as shown in FIG. 18, so that the step of reading the image data "d" from each radiation detection element 7 is repeated.

As described above, in the following description, the image data for irradiation start detection to be read for detection of the start of irradiation prior to this radiation image capturing will be called image data "d", for distinction from the image data D as a main image to be read immediately after image capturing. In FIG. 18, "one frame" denotes the duration of reading the image data "d" from radiation detection elements 7 for one surface arranged in a two-dimensional array on the detecting section P (FIG. 4 and FIG. 7).

Figure 19:
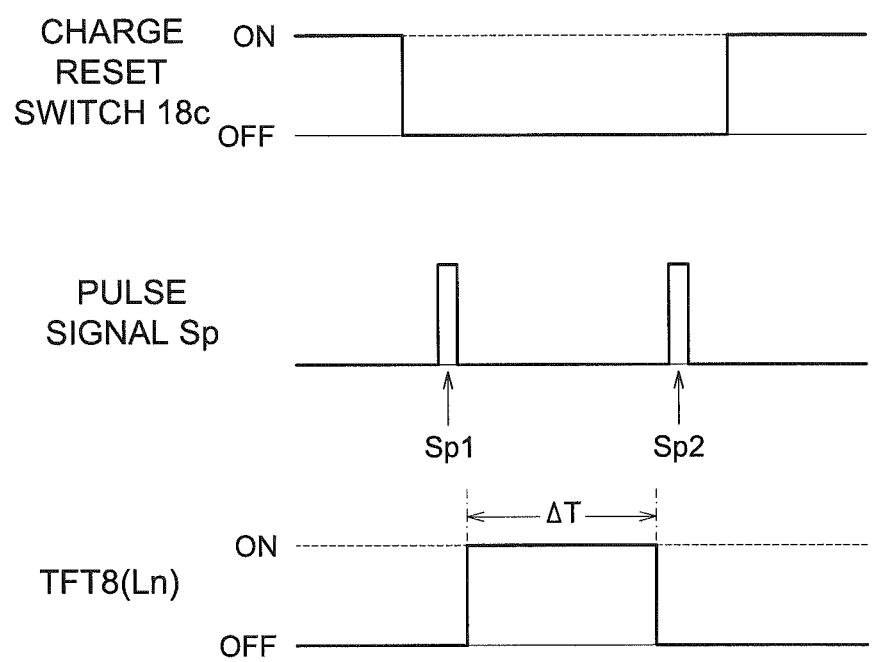
FIG. 19 is a timing chart showing the charge reset switch, pulse signal, on-off timing of the TFT and on-time ΔT in the step of reading the image data prior to radiation image capturing.

The on/off operation of the charge reset switch 18c of the amplification circuit 18 in the reading circuit 17 at the time of reading the image data "d", and the transmission of the pulse signals Sp1 and Sp2 to the correlated dual sampling circuit 19 are performed as shown in FIG. 19 in the same procedure as that in the step of reading the image data D reading of FIG. 10. It should be noted that $\Delta T$ in FIG. 19 will be described later.

Figure 20:
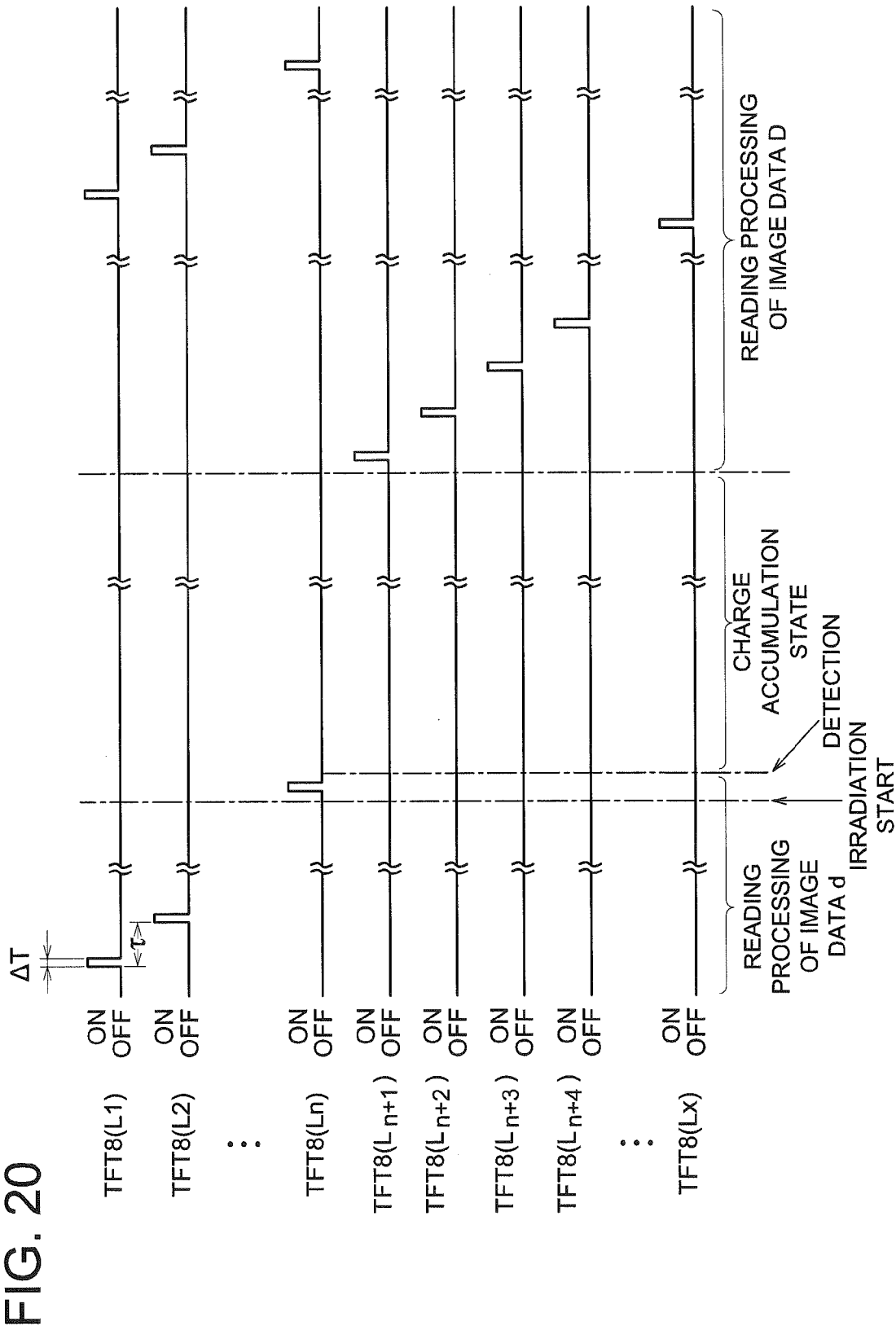
FIG. 20 is a timing chart showing the timing for applying on-voltage to each scanning line in the detection method 2.

As described above, if the structure is designed in such a way that the image data "d" is read prior to radiation image capturing operation, when irradiation of the radiation image capturing apparatus 1 has started as shown in FIG. 20, the value of the image data "d" (the image data "d" read out by application of the on-voltage to the line Ln of the scanning line 5 in FIG. 20) read out at this moment increases far over that value of the image data "d" read previously, similarly to the case of the leak data "d leak" shown in FIG. 17.

Accordingly, it is possible to arrange such a configuration that the image data "d" read out prior to radiation image capturing operation is monitored by the control device 22 of the radiation image capturing apparatus 1, and the start of irradiation is detected when the value of the image data "d" read out has exceeded a prescribed threshold value "dth" set in advance.

In this case, having detected the start of irradiation in the aforementioned procedure, the control device 22 suspends application of on-voltage to each scanning line 5 at this moment as shown in FIG. 20, and applies off-voltage to all the lines L1 through Lx of the scanning line 5 from the gate driver 15b so that each of the TFTs 8 is turned off. Then the electric charge produced inside each radiation detection element 7 by irradiation is accumulated in each radiation detection element 7 so that the element is kept supplied with electric charges.

When a prescribed time has passed after detection of the start of irradiation, the control device 22 starts application of on-voltage to the scanning line 5 (line Ln+1 of the scanning line 5 in FIG. 20) to which on-voltage is to be applied immediately after scanning line 5 (line Ln of the scanning line 5 in FIG. 20) to which on-voltage was applied at the time or immediately before the start of irradiation has been detected in the step of reading the image data "d" prior to radiation image capturing. Thus, on-voltage is sequentially applied to each scanning line 5, and image data D as the main image is read.

In the case of FIG. 20, it is also possible to arrange such a configuration that the image data D as the main image is read after application of on-voltage has been started from the first line L1 of the scanning line 5, for example. The $\Delta T$ and $\tau$ in FIG. 20 will be described later.

[Detecting the Termination of Irradiation]

For example, in the aforementioned detection method 1, electric charges are accumulated by suspending the step of resetting each radiation detection element 7 which is performed by sequential application of on-voltage to each scanning line 5 after detection of the start of irradiation, as shown in FIG. 16.

Figure 21:
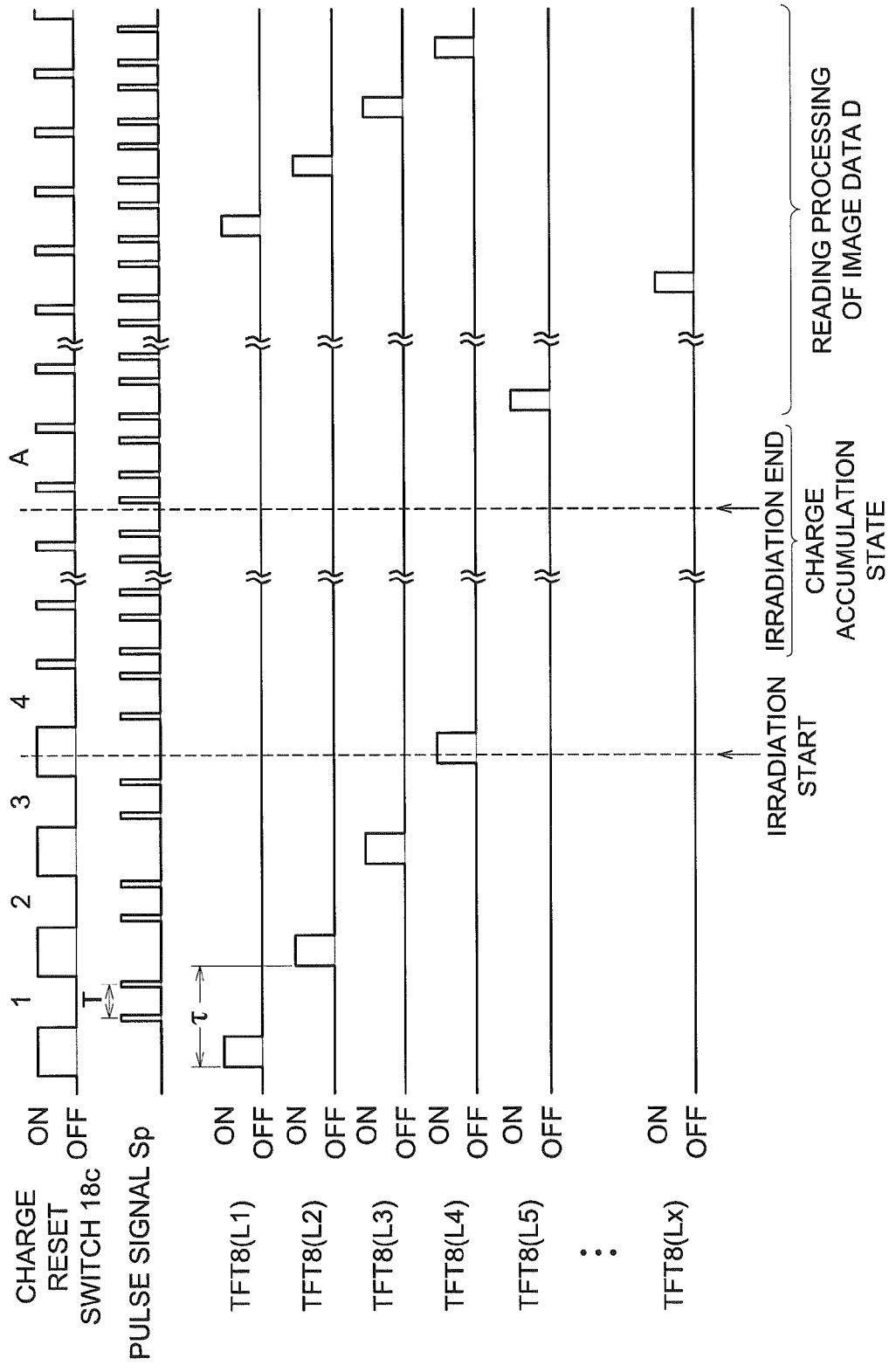
FIG. 21 is a timing chart in which the step of reading the leak data is continued even after detection of the start of irradiation in FIG. 16.

In this case, for example, it is also possible to adopt such a structure as to continue the step of reading the leak data "d leak" wherein off-voltage is applied to each scanning line 5 while electric charges are accumulated, as shown in FIG. 21, thereby detecting the termination of irradiation of the radiation image capturing apparatus 1.

Figure 22:
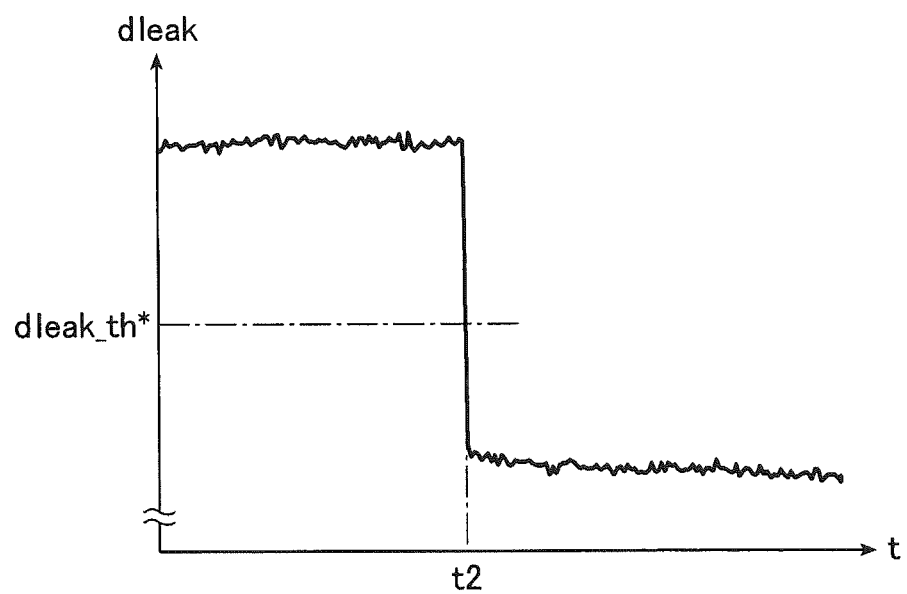
FIG. 22 is a chart showing that there is a reduction in the leak data upon completion of irradiation.

If such an arrangement is adopted as to continue the step of reading the leak data "d leak" subsequent to detection of the start of irradiation, the leak data "d leak" to be read out exhibits a large value in the charge accumulation state as shown in FIG. 22, because irradiation has already started. However, upon termination of irradiation of the radiation image capturing apparatus 1, the leak data "d leak" returns to the original small value.

This allows termination of the irradiation to be detected when the leak data "d leak" has been reduced to the level equal to or less than threshold value "d leak_th*", for example, at time t2.

The threshold value "d leak_th*" in this case can have the same value as value "d leak_th" as the threshold value for detecting the start of irradiation in the aforementioned detection method 1. Alternatively, this value can be set as another value. Further, in FIG. 22, after termination of irradiation has been detected at time t2, the step of reading the leak data "d leak" is continued to read out the leak data "d leak". In actual practice, however, the step of reading the leak data "d leak" is suspended upon detection of the termination of irradiation as follows.

It is also possible to make such arrangements that, as shown in FIG. 22, the value of the leak data "d leak" reaches the level equal to or less than the threshold value "d leak_th*", and sequential application of on-voltage to each scanning line 5 is started when termination of irradiation has been detected ("A" of FIG. 21, corresponding to time t2 of FIG. 22). This is followed by the step of reading the image data D as the main image.

This arrangement allows the step of reading the image data D to be started immediately upon termination of irradiation, as shown in FIG. 21, and permits earlier processing after reading of the image data D.

It is also possible to use the procedure of detecting termination of irradiation of the radiation image capturing apparatus 1 by performing the step of reading the leak data "d leak" when electric charges are accumulated, in the aforementioned detection method 2.

[Improved Method for Detecting the Start of Irradiation]

Incidentally, the aforementioned detection methods 1 and 2 can be improved as follows. The following describes the aforementioned detection method 1 wherein the step of reading the leak data "d leak" is performed prior to radiation image capturing operation, and the start of irradiation is detected based on the leak data "d leak" having been read out. The description also similarly applies to the detection method 2.

When the aforementioned detection method 1 is utilized to detect the start of irradiation of the radiation image capturing apparatus 1, the detecting section P (FIG. 4 and FIG. 7) of the radiation image capturing apparatus 1 is normally connected with a few thousand through tens of thousands of signal lines 6. Each signal line 6 is provided with a reading circuit 17. Thus, the number of pieces of leak data "d leak" read out in a single step of reading the leak data "d leak" amounts to a few thousand through tens of thousands.

If for all pieces of the leak data "d leak", a step is taken to determine if the aforementioned threshold value has been exceeded or not, the processing step will be heavily loaded and the start of irradiation may not be detected on a real-time basis. To solve this problem, the following detection method can be adopted.

[Detection Method A]

For example, the reading IC 16 (FIG. 7) incorporates 128 or 256 reading circuits 17. To be more specific, one reading IC 16 is connected with 128 or 256 signal lines 6. In a single step of reading the leak data "d leak", 128 or 256 pieces of leak data "d leak" are read for each signal line 6 from one reading IC 16.

Assume that 4096 signal lines 6 are provided and one reading IC 16 incorporates 256 reading circuits 17 (i.e., one reading IC 16 is connected with 256 signal lines 6). Then, the total number of the reading ICs 16 is 4096/256=16.

Thus, for example, it is also possible to adopt such a structure so as to calculate the total value, mean value, intermediate value and maximum value (hereinafter referred to as "average value" representing these values) of the leak data "d leak" outputted from one reading IC 16 in one step of reading the leak data "d leak", and to determine if the average value "d leak_ave(z)" of the leak data "d leak" calculated for each reading IC 16 has exceeded a threshold value or not.

The letter "z" in average value "d leak_ave(z)" denotes the number of the reading IC 16. Since sixteen reading ICs 16 are provided, "z" assumes the number from 1 through 16 in the aforementioned example.

If the structure is designed in conformity to this detection method A, the control device 22 of the radiation image capturing apparatus 1 is not required to determine whether or not a threshold value has been exceeded for each of the 4096 pieces of leak data "d leak" read out in a single step of reading the leak data "d leak" in the aforementioned example. The control device 22 is only required to determine whether or not a threshold value has been exceeded for sixteen average values "d leak_ave(z)" of the leak data "d leak" outputted from each reading IC 16. This arrangement reduces the load in determining the start of irradiation of the radiation image capturing apparatus 1.

[Detection Method B]

To reduce the load further in the decision step, it is possible to configure such a structure that the maximum value is selected out of the sixteen average values "d leak_ave(z)" calculated from the leak data "d leak" outputted from one reading IC 16 in a single step of reading the leak data "d leak" by the control device 22. Then a step is taken to determine whether or not the maximum value of the average values "d leak_ave(z)" of the leak data "d leak" has exceeded a threshold value.

In this case, however, the data reading efficiency in each reading circuit 17 within each reading IC 16 may be crucial in some cases. To be more specific, the data reading efficiency of each reading circuit 17 (FIG. 7, etc.) normally differs according to each reading circuit 17. Even if the total value (FIG. 13) of the electric charge "q" leaking to the signal line 6 from each radiation detection element 7 is the same for each signal line 6, some reading circuits 17 read out the value of the leak data "d leak" which is always greater than that of other reading circuits 17, while some reading circuits 17 read out the value of the leak data "d leak" which is always smaller than that of other reading circuits 17.

Figure 23:
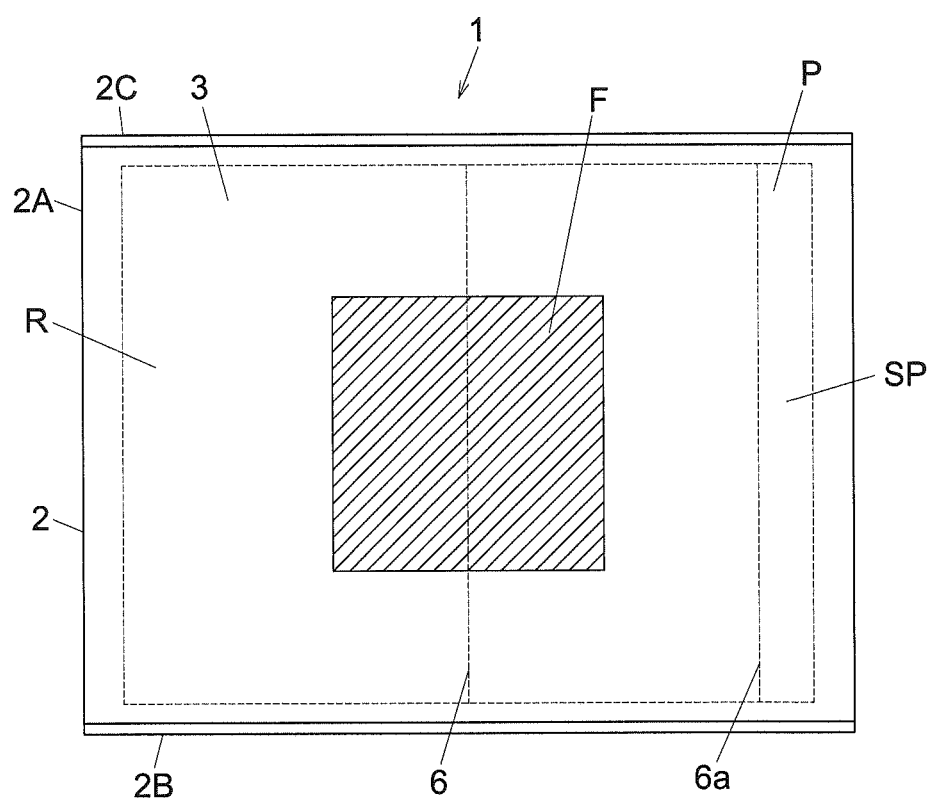
FIG. 23 is a diagram showing that radiation of limited irradiation field has been applied to the radiation image capturing apparatus.

Under this condition, assume, for example, that the radiation image capturing apparatus 1 is irradiated so that the irradiation field F is narrowed at the center of the detecting section P, and the signal line 6a connected to the reading circuit 17 for reading out the value of the leak data "d leak" always greater than that of other reading circuit 17 is located outside the irradiation field F, as shown in FIG. 23.

Figure 24:
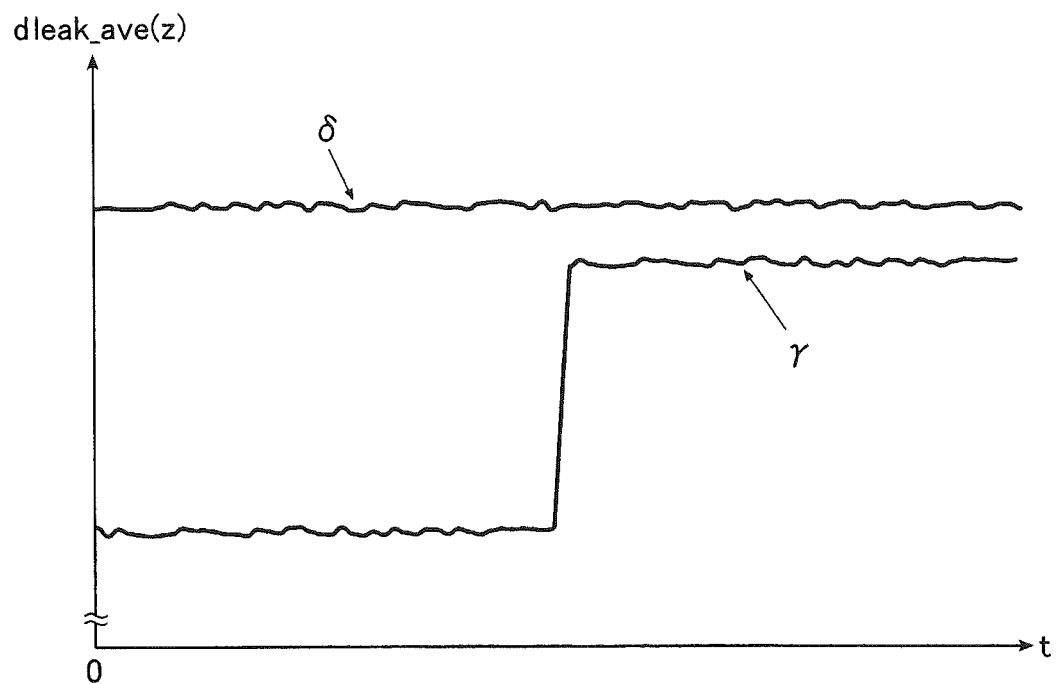
FIG. 24 is a chart showing an example of the temporal transition of the mean value of the leak data having been read by each reading circuit for each read-out IC.

In this case, even if irradiation has caused an increase in the average value "d leak_ave(z)" (γ of the drawing) of the leak data "d leak" outputted from the reading IC 16 including the reading circuit 17 connected to the signal line 6 located within the irradiation field F, as shown in FIG. 24, the average value "d leak_ave(z)" (δ of the drawing) of the leak data "d leak" outputted from the reading IC 16 including the reading circuit 17 connected to the signal line 6a located outside the irradiation field F is not exceeded by that of signal line 6 in some cases.

In such cases, if the maximum value is to be extracted out of sixteen average values "d leak_ave(z)" calculated from the leak data "d leak" outputted from a single reading IC 16 in a single step of reading the leak data "d leak", the average value "d leak_ave(z)" of the leak data "d leak" indicated by δ in the drawing will be extracted. However, since the average value "d leak_ave(z)" of the leak data "d leak" having been extracted is free from fluctuation due to irradiation, a threshold value is not exceeded, and hence irradiation cannot be detected.

To solve such a problem, it is possible to adopt such a structure that the moving average of the average value "d leak_ave(z)" of the leak data "d leak" outputted from each reading IC 16 for each step of reading is calculated for each reading IC 16.

To be more specific, for example, a structure is so configured as to calculate the average (i.e., moving average) of the average value "d leak_ave(z)" of the leak data "d leak" for each reading IC 16 which has been calculated at the time of the previous step of reading out for a prescribed number of times of reading, including the reading immediately before the current step of reading, every time the average value "d leak_ave(z)" of the leak data "d leak" outputted from the reading IC 16 is calculated for each step of reading the leak data "d leak".

The structure can be so designed as to calculate, for each reading IC 16, the difference Δd between average value "d leak_ave(z)" of the leak data "d leak" calculated in the current step of reading, and the calculated moving average.

It is further possible to design the structure in such a way that the control device 22 calculates, for each reading IC 16, the difference Δd between the average value "d leak_ave(z)" calculated from the leak data "d leak" outputted from the reading IC 16 in a single step of reading the leak data "d leak", and respectively corresponding moving averages. The control device 22 then calculates the maximum value out of the calculated difference Δd (sixteen difference Δd for the aforementioned example), and determines if the maximum value of the difference Δd has exceeded a threshold value or not.

This structure ensures that, even if there is a fluctuation in the reading efficiency for each of the reading circuits 17 provided inside the reading IC 16, the fluctuation in reading efficiency can be offset by calculating the difference Δd between the average value "d leak_ave(z)" of the leak data "d leak" read with the equal reading efficiency, and the moving average.

Thus, the difference Δd purely reflects the result of determining whether or not there is any increase in the average value "d leak_ave(z)" of the leak data "d leak" over the value of the previous data for each reading IC 16. If arrangement is so made to allow the start of irradiation to be detected based thereon, it is possible to prevent occurrence of the problem indicated with reference to FIG. 24.

[Detection Method C]

The control device 22 calculates the difference Δd between sixteen average value "d leak_ave(z)" calculated from the leak data "d leak" outputted from one reading IC 16 in a single step of reading the leak data "d leak" and respectively corresponding moving averages. It is also possible to design such a structure as to extract not only the maximum value but also the minimum value out of the calculated difference Δd and to determine whether or not the difference between the maximum value and the minimum value of the difference Δd has exceeded a threshold value.

[Detection Method D]

When the dosage of the radiation applied to the radiation image capturing apparatus 1 from the radiation source 52 is very small, the value calculated according to the aforementioned detection method A through C, that is, the average value "d leak_ave(z)" of the leak data "d leak" for each reading IC 16 (detection method A), the difference Δd between the average value "d leak_ave(z)" of the leak data "d leak" for each reading IC 16 and the moving average (detection method B), or the difference between the maximum value and the minimum value of the difference Δd (detection method C) is also small. Thus, even if radiation is applied, the aforementioned values may not exceed a threshold value in some cases.

To solve this problem, for example, it is possible to calculate the temporal integral value (i.e., accumulated value) of the difference Δd between the average valued leak_ave(z) of the leak data "d leak" and the moving average, for each reading IC 16, and to determine whether or not this integral value has exceeded a threshold value.

In this structure, so long as radiation is not applied to the radiation image capturing apparatus 1, there is a fluctuation in the average value "d leak_ave(z)" of the leak data "d leak" that may be greater or smaller than the moving average. Accordingly, the integral value of the difference Δd thereof will be subject to a change at values close to zero (0). However, with the start of irradiation of the radiation image capturing apparatus 1, the average value "d leak_ave(z)" of the leak data "d leak" increases over the moving average. Thus, the difference Δd thereof assumes a positive value in many cases.

Thus, if the aforementioned structure is adopted, the integral value does not exceed a threshold value so long as radiation is not applied to the radiation image capturing apparatus 1. Once irradiation starts, there will be an increase in the integral value, which will exceed the threshold value. Thus, the aforementioned structure ensures accurate detection of the start of irradiation of the radiation image capturing apparatus 1, even if there is much reduction in the dosage of the radiation applied to the radiation image capturing apparatus 1 from the radiation source 52.

The structure can be designed to adopt any one of the detection methods A through D. It is possible to design a structure in such a way that a plurality or all of the detection methods A through D can be used in combination. Thus, when the start of irradiation has been detected in any one of the detection methods, the control device 22 determines that irradiation has started.

In the detection method 1, in the step of resetting each radiation detection element 7 prior to radiation image capturing, the value of the leak data "d leak" to be read in a single step of reading the leak data "d leak" will be increased by prolonging the cycle τ (FIG. 15 and FIG. 16) from the start of application of on-voltage to one of scanning lines 5 to the start of on-voltage to the next scanning line 5, and by prolonging the transmission interval T between two transmissions of the pulse signals Sp1 and Sp2 sent from the control device 22. This will result in improvement of the sensitivity in detecting the start of irradiation of the radiation image capturing apparatus 1.

In the aforementioned detection method 2, in the step of reading the image data "d" prior to radiation image capturing, when the time ΔT of turning on each of the TFTs 8 (FIG. 19 and FIG. 20) is prolonged, namely, when the time ΔT from application of the on-voltage to the scanning line 5 from the gate driver 15*b* of the scanning drive unit 15 until the switching over to off-voltage from the on-voltage is prolonged, there will be an increase in the value of the image data "d" to be read out in a single step of reading image data "d". This will also result in improvement of the sensitivity in detecting the start of irradiation of the radiation image capturing apparatus 1.

As described above, for the purpose of improving the sensitivity in detecting the start of irradiation of the radiation image capturing apparatus 1, various improvement can be made in the method for detecting the start of irradiation of the radiation image capturing apparatus 1, in addition to the aforementioned detection methods A through D.

[Acquisition of Offset Data]

In the meantime, as shown in FIG. 16 and FIG. 20 when the control device 22 of the radiation image capturing apparatus 1 has detected start of irradiation in the aforementioned procedure, the control device 22 allows the gate driver 15*b* to apply off-voltage to all the lines L1 through Lx of the scanning line 5 so that electric charges are accumulated. After that, the control device 22 allows on-voltage to be applied sequentially to each scanning line 5, whereby the image data D as the main image is read.

Incidentally, so-called dark charge constantly occurs inside the radiation detection element 7 due to thermal excitation caused by the heat (temperature) of the radiation detection element 7 itself. The offset amount resulting from this dark charge is also superimposed on the image data D having been read out in the aforementioned step of reading the image data D.

Thus, in the step of generating the radiation image based on the image data D in the console 58 as an image processing apparatus, a step is taken to calculate the true image data (hereinafter referred to as "true image data D*") based only on the electric charge having been produced within each radiation detection element 7 due to irradiation, after subtracting the offset amount resulting from the dark charge from the image data D. A radiation image is generated based on this true image data D*.

The offset amount resulting from the dark charge superimposed on the image data D is acquired as offset data O normally before and after the radiation image capturing operation by the radiation image capturing apparatus 1. In the present embodiment, the control device 22 repeats a series of processing sequences up to the step of reading the image data D reading (FIG. 16), whereby the offset data O is read.

Figure 25:
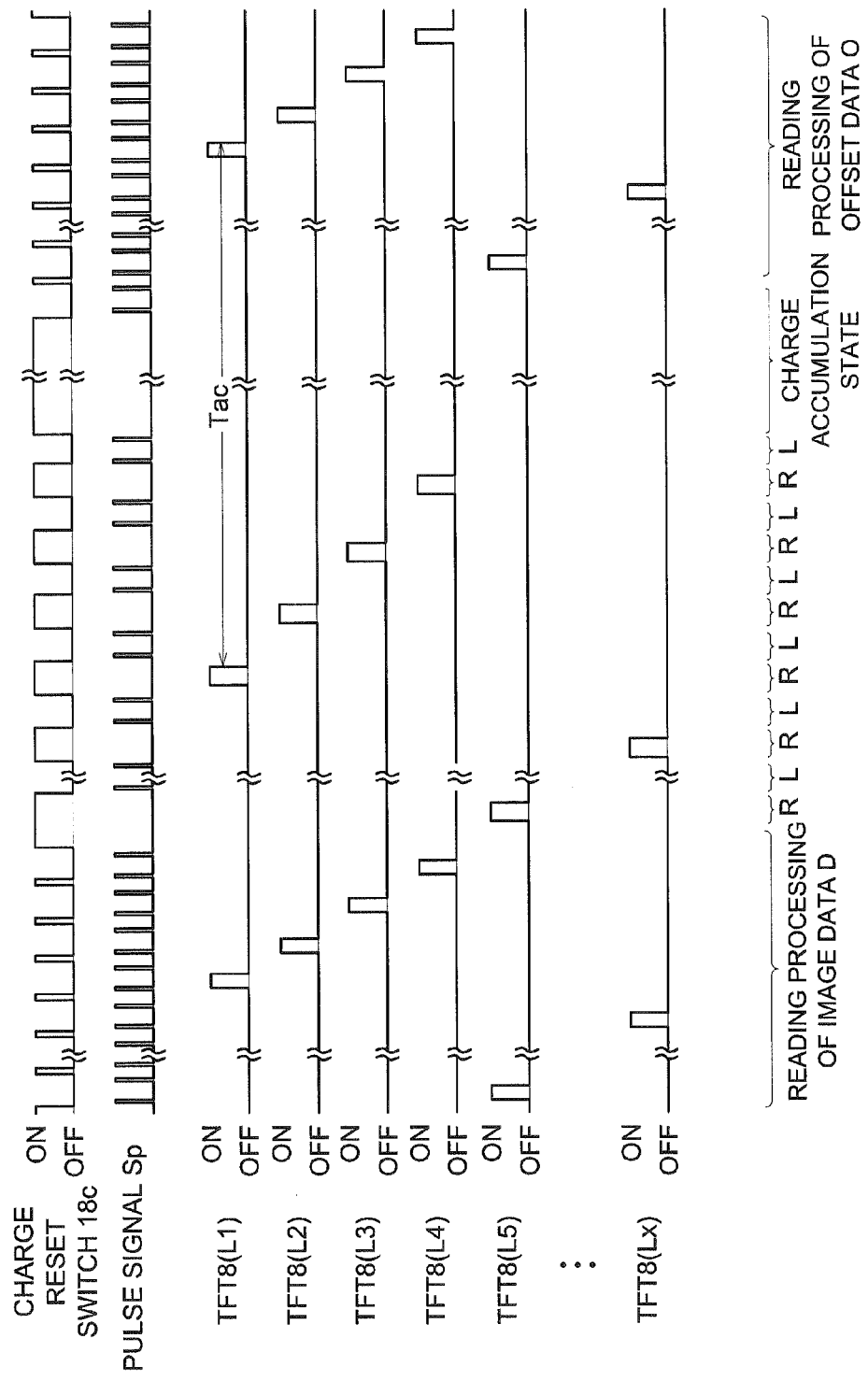
FIG. 25 is a timing chart showing the timing for applying on-voltage to each scanning line when the reading of the offset data is performed by repeating the processing sequence of FIG. 16.

To be more specific, for example, when the detection method 1 is used, as shown in FIG. 25, the control device 22 performs a series of processing sequences including the repetition of the step of reading the leak data "d leak" and the step of resetting each radiation detection element 7 prior to radiation image capturing shown in FIG. 16, the transfer to the state of electric charge accumulation, and the reading of the image data D, after reading the image data D. Then the offset data O is read.

When electric charges are accumulated in the step of reading the offset data O, only dark charges are accumulated in each radiation detection element 7. Accordingly, the radiation image capturing apparatus 1 is not exposed to radiation. Thus, there is no need of repeating the step of reading the leak data "d leak" and the step of resetting each radiation detection element 7 on an alternate basis, prior to transfer to the state of accumulating electric charges of the offset data O after reading the image data D, as shown in FIG. 25. Thus, it is possible to design a structure wherein only the step of resetting each radiation detection element 7 is performed without the step of reading the leak data "d leak" being performed.

In FIG. 25, a single step of resetting each radiation detection element 7 (i.e., the step of resetting by sequential application of on-voltage to the lines Ln+1 through Lx and L1 through Ln of the scanning line 5) is performed after the image data D has been read. It is also possible to design a structure so that the step of resetting each radiation detection element 7 is performed a plurality of times.

The volume of the dark charge accumulated in each radiation detection element 7 increases in proportion to the time when the TFT 8 connected to the relevant radiation detection element 7 is kept turned off, namely, the time Tac in FIG. 16 (the time Tac will hereinafter be referred to as "effective accumulation time Tac"). The accumulated dark charge is read out as offset data O, and the size of the offset data O changes according to the time of the TFT 8 being turned off, i.e., the effective accumulation time Tac in FIG. 25

In this case, if the processing sequence up to the time of the image data D as the main image being read is assumed as the same as the processing sequence up to the time of offset data O being read as described above, the effective accumulation time Tac (FIG. 25) when the TFT 8 is kept turned off in the step of reading the offset data O will be the same as the effective accumulation time Tac (FIG. 16) in the step of reading the image data D as the main image.

Thus, since the value of the offset amount due to the dark charge superimposed on the image data D is the same as the value of the offset data O read out in the step of reading the offset data O, it is possible to subtract the offset data O from the image data D and to calculate the true image data D* solely based on the electric charge having been generated in each radiation detection element 7 by irradiation.

Having read out the image data D as a main image in the aforementioned procedure, the control device 22 of the radiation image capturing apparatus 1 sends the image data D to the console 58. Having read the offset data O in the aforementioned procedure, the control device 22 of the radiation image capturing apparatus 1 sends the offset data O to the console 58.

[Recovery of Line Defects in Image Processing Apparatus]

The following describes the step of correcting the line defect to be performed using the console 58 as the image processing apparatus, prior to the generation of the radiation image based on the image data D. The operation of the radiation image capturing system 50 of the present invention will also be described at the same time.

In the present embodiment, the console 58 applies prescribed image processing such as gain correction, defective image correction or gradation processing to the corrected image data (i.e., true image data to be described later) subsequent to correction of the line defect. Then the radiation image is generated. This prescribed image processing procedure is a conventionally known art, and will not be described.

Further, in the present embodiment, as described above, the console 58 serves as an image processing apparatus. An image processing apparatus can be installed separately from the console 58.

The following briefly describes the line defect that may occur to the image data D. The following describes the case wherein the detection method 2 (FIG. 20) is adopted, i.e., wherein the image data "d" is read prior to radiation image capturing operation.

In the detection method 2, start of irradiation is detected based on an increase in the image data "d" having been read out, as described above. An increase in the image data "d" having been read out implies that part of the useful electric charge generated in each radiation detection element 7 by irradiation, namely, part of the electric charge to be read as the image data D which is a main image is lost as image data "d" from each radiation detection element 7 prior to radiation image capturing operation.

To be more specific, in terms of the example of FIG. 20, start of irradiation is detected when on-voltage has been applied to the line Ln of the scanning line 5. This implies that part of the useful electric charge generated inside each radiation detection element 7 by irradiation is lost from each radiation detection element 7 connected to the line Ln of the scanning line 5.

Thus, the defect of part of the useful electric charge is included in the image data D read out from each radiation detection element 7 connected to the line Ln of the scanning line 5 in the subsequent step of reading out the image data D as the main image. To be more specific, the value of the relevant image data D is slightly smaller than the original value. This produces a line defect, which is a line of the image data D where a defect occurs to the portion corresponding to the line Ln of the scanning line in the image data D (in the radiation image generated based thereon), as shown in FIG. 26.

The aforementioned line defect also appears when the detection method 1 is adopted. To be more specific, when start of irradiation has been detected, for example, at the time shown in FIG. 16, part of the useful electric charge generated inside each radiation detection element 7 by irradiation may have been lost from each radiation detection element 7 connected to the scanning line 5 by the step of resetting, in the line L4 of the scanning line 5 where the step of resetting each radiation detection element 7 is performed immediately before the 4th step of reading the leak data "d leak".

Thus, in the scanning line 5 where the process of resetting has been performed through application of on-voltage immediately before the step of reading the leak data "d leak" by which start of irradiation has been detected, a defect may have been produced to part of the useful electric charge for the image data D having been read out from each radiation detection element 7 connected to this scanning line 5.

Figure 26:
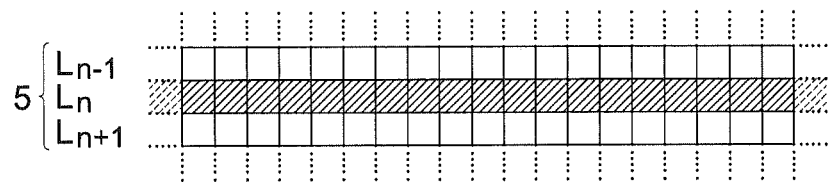
FIG. 26 is a diagram showing the line defect having occurred to image data and radiation image.

Accordingly, even when the detection method 1 is adopted, the line defect of FIG. 26 may occur to the image data D read out from each radiation detection element 7 connected to the scanning line 5 where on-voltage has been applied in the process of resetting immediately before the step of reading the leak data "d leak" by which start of irradiation has been detected.

Figure 27:
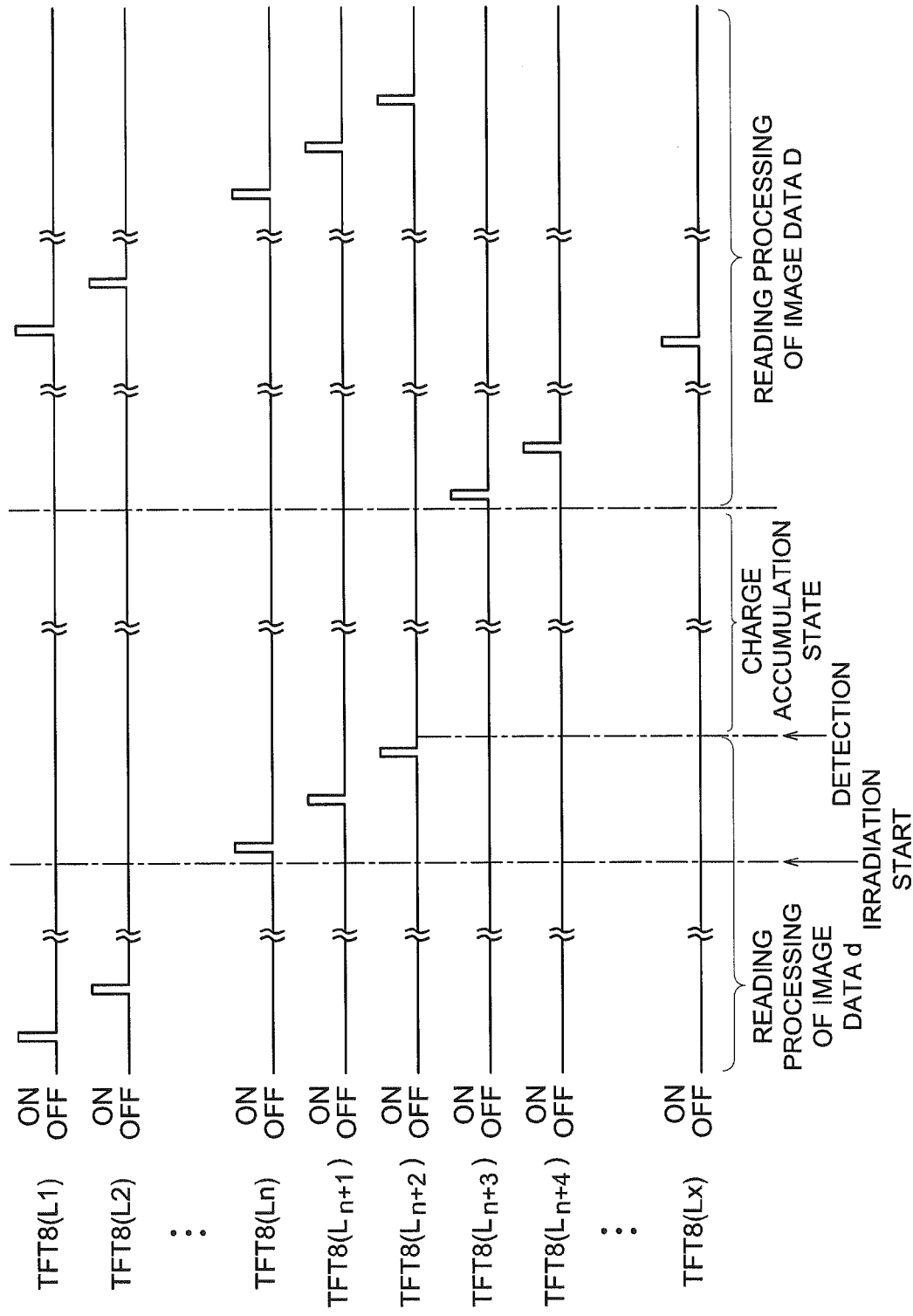
FIG. 27 is a timing chart showing an example of the timing for sequentially applying on-voltage to each scanning line when the step of image reading has been performed a plurality of times due to a delay in detecting the start of irradiation.

In the meantime, when the intensity of the radiation applied from the radiation source 52 fails to increase quickly enough, or when the sensitivity in the detection of the radiation image capturing apparatus 1 is too low, for example, if the detection method 2 is adopted, much time may be required in some cases before the start of irradiation of the radiation image capturing apparatus 1 is detected after the actual start of irradiation from the radiation source 52, as shown in FIG. 27.

If there is such a delay in the detection of the start of irradiation, image data "d" may be read several times during this time.

Figure 28:
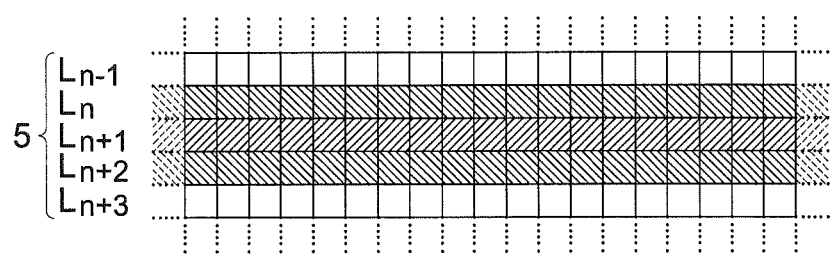
FIG. 28 is a diagram showing continuous occurrence of line defect.

For example, as shown in FIG. 27, if irradiation from the radiation source 52 has started when the image data "d" has been read by application of on-voltage to the line Ln of the scanning line 5 in the step of reading the image data "d" prior to radiation image capturing operation, and the start of irradiation has been detected in the step of reading the image data "d" performed by application of on-voltage to the line Ln+2 of the scanning line 5, a detect occurs to the image data D read out of each radiation detection element 7 connected to the line Ln through Ln+2 of the scanning line 5, as shown in FIG. 28.

Then a line defect occurs to the portion corresponding to the line Ln through Ln+2 of the scanning line 5. To be more specific, when the sensitivity in the detection of the radiation image capturing apparatus is low as described above, line defects will occur continuously as shown in FIG. 28.

As shown in FIG. 26 and FIG. 28, the line defect occurring to the image data D must be corrected by the console 58 as an image processing apparatus.

In this case, however, the radiation image capturing apparatus 1 itself is incapable of identifying when irradiation of the radiation image capturing apparatus 1 started from the radiation source 52.

To be more specific with reference to the example of FIG. 27, the radiation image capturing apparatus 1 is incapable of identifying that irradiation by the radiation source 52 has started, at the moment when image data "d" is read through application of on-voltage to the line Ln of the scanning line 5 by the step of reading the image data "d" prior to radiation image capturing operation.

The radiation image capturing apparatus 1 itself merely detects the start of irradiation based on the image data "d" read out in the step of reading the image data "d" through application of one-voltage to the line Ln+2 of the scanning line 5. This also applies to the case when the detection method 1 is adopted.

In the present embodiment, the console 58 as an image processing apparatus takes the following step to analyze the profile of the image data D (true image data D* in the present embodiment, the same applies hereafter), and identifies the range of the image data D containing a defect having been caused by the step of resetting each radiation detection element 7 (detection method 1) and the step of reading the image data "d" (detection method 2) having been performed subsequent to irradiation having started from the radiation source 52. The console 58 repairs the image data D in the identified range even when a defect has occurred.

The following describes the procedure of correcting the line defect of the image data D in the console 58 as an image processing apparatus.

As described above, since the image data D includes the offset caused by the dark charge, fluctuations often occur to the value of image data D. If an attempt is made to identify the aforementioned range based on the image data D containing such fluctuations, accurate identification of the range may not be achieved.

To solve this problem, prior to identifying the range of the image data D to be corrected, the console 58 of the present embodiment calculates the true image data D* corresponding only to the electric charge generated inside each radiation detection element 7 due to irradiation without including the dark charge, for each radiation detection element 7 according to the following equation (1), based on the image data D and offset value subsequent to the operation of capturing the radiation image sent from the radiation image capturing apparatus 1:

$$D^* = D - O \qquad (1)$$

In the present embodiment, processing of correction to be described below is applied to the true image data D* having been calculated. However, for example, if there is not much fluctuation in the image data D itself, it is also possible to adopt such a structure that the processing of correction is applied to the image data D itself without the offset data O being subtracted.

The console 58 then arranges the calculated true image data D* along the extension of the signal line 6 (FIG. 4 and FIG. 7) of the radiation image capturing apparatus 1 corresponding to true image data D*, and analyzes the profile of the true image data D* formed by plotting. Thus, the range of the true image data D* including a defect is identified.

In the following description, each radiation detection element 7 will be expressed by using (m, n) from the line number "m" of the signal line 6 connected with the relevant radiation detection element 7 and the line number "n" of the scanning line 5. The true image data D* calculated from the image data D read out from the each radiation detection element (m, n) is expressed as D* (m, n).

The true image data D* (M, n) calculated based on the image data D read out of each radiation detection element (M, n) connected to a signal line 6 (wherein the line of this signal line 6 is assumed as "M") is extracted from the true image data D* (m, n) having been calculated in the aforementioned procedure.

A profile of the true image data D* (M, n) can be obtained by plotting the extracted true image data D* (M, n) according to the order of the line number "n" of the scanning line 5. This is a true image data D* (M, n) profile along the extension of the signal line 6, regarding the signal line 6 corresponding to the line number M of the radiation image capturing apparatus 1.

The console 58 analyzes the true image data D* profile formed in the aforementioned procedure, and identifies the range of the true image data D* (i.e., the range of line defect) including a defect.

However, the true image data D* calculated in the aforementioned procedure may include fluctuations. Then if the extracted true image data D* (M, n) is plotted according to the order of the line number "n" of the scanning line 5, fluctuations will also occur to the profile. If an attempt is made to identify the range based on the profile, an appropriate range may not be identified.

To solve this problem, in the present embodiment, for the true image data D* (m, n) calculated in the aforementioned procedure, the mean value D*ave(n) which is a mean value of the true image data D* (m, n) arranged along the extension of the scanning line 5 of the radiation image capturing apparatus 1, i.e., the mean value D*ave(n) of the true image data D* (m, n) of the line number "n" of the same scanning line 5 is calculated for each scanning line 5.

Figure 29:
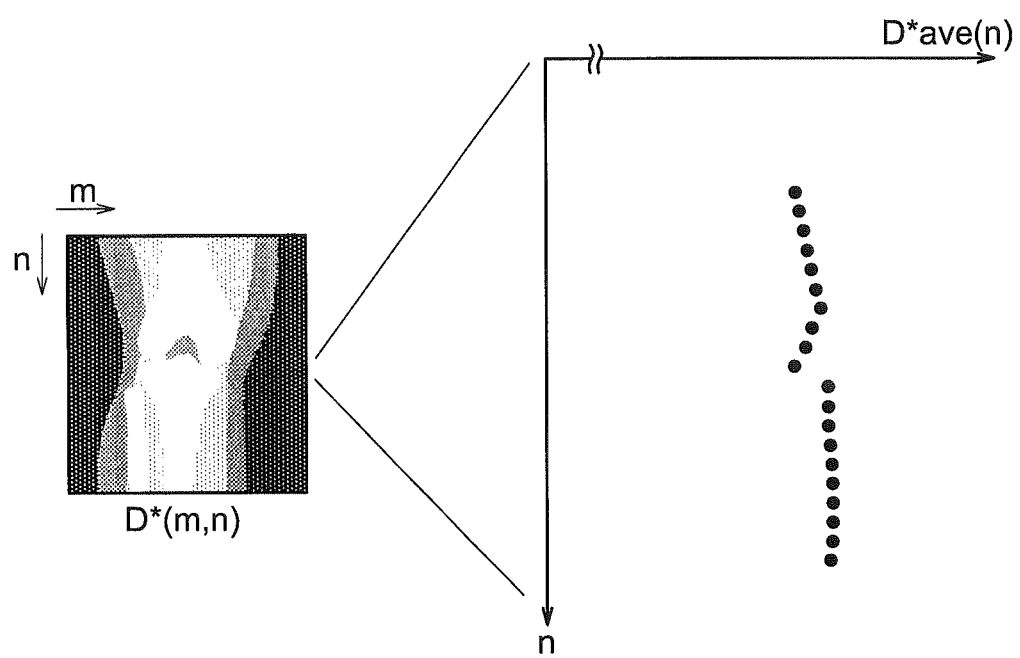
FIG. 29 is a diagram showing an example of each true image data, and a chart showing an example of the mean value profile for each scanning line.

The aforementioned procedure is taken to analyze the mean value D*ave(n) profile formed by arranging and plotting the mean value D*ave(n) along the extension of the signal line 6 of the radiation image capturing apparatus 1 as shown in FIG. 29, whereby the range of the true image data D* containing a defect is identified.

Similarly, when analyzing the profile of the image data D itself without analyzing the true image data. D*, the mean value D ave(n) of the image data D (m, n) of the line number "n" of the same scanning line 5 is preferably calculated for each scanning line 5, whereby a profile is formed.

As described above, when the mean value D*ave(n) for each scanning line 5 of the true image data D* (m, n) (or image data D (m, n), this applies hereafter) has been calculated, the fluctuations contained in the true image data D* (m, n) are offset. Thus, as shown in FIG. 29, a profile free from fluctuations is obtained, with the result that the range of the true image data D* containing a defect can be identified correctly.

It should be noted that, in the chart on the right of the FIG. 29, the only profile of the mean value D*ave(n) in the vicinity of the range of the true image data D* containing a defect is shown in an enlarged view. When the profile of the mean value D*ave(n) is analyzed and the range of the true image data D* containing a defect is to be identified, the following points are preferably noted.

The true image data D* Corresponding to the radiation detection element 7 of the portion of the radiation image capturing apparatus 1 having been reached by radiation directly without using an intermediary of a subject has a value close to the upper limit value that can be assumed by the true image data D*. By contrast, the value of the true image data D* of the portion with an image of the radiographed subject thereon is normally smaller.

The present embodiment is so configured that the electric charge in the amount greater than the maximum amount of charge that can be read out by the reading circuit 17 (FIG. 7 and FIG. 8) can be stored in the radiation detection element 7.

As described above, even if part of the electric charge has flown out of the radiation detection element 7 in the step of resetting prior to radiation image capturing operation (for detection method 1) or in the step of reading the image data "d" (for detection method 2), a great amount of charge is generated thereafter inside the radiation detection element 7 of the portion reached by radiation directly without using an intermediary of a subject. Thus, the electric charge in the amount greater than the maximum amount of charge that can be read out by the reading circuit 17 is stored in the radiation detection element 7.

Thus, in the radiation detection element 7 of the portion directly reached by radiation, even if part of the electric charge has flown out of the radiation detection element 7 in the step of resetting or others prior to radiation image capturing operation, the image data D to be read out may have a value equal to or close to the upper limit value that can be outputted by the reading circuit 17.

To be more specific, in the radiation detection element 7 of the portion directly reached by radiation, even if part of the electric charge has flown out of the radiation detection element 7 in the step of resetting or others prior to radiation image capturing operation, the image data D having a greater value free from a defect may be read out, insofar as the image data D to be read out is concerned.

Thus, the true image data. D* calculated from such image data D has a value close to the upper limit value that can be assumed by the true image data D*. Moreover, this true image data D* may have a large value free from defects.

If the true image data D* (m, n) having a large value free from defects is included in the object for calculating the mean value D*ave(n) for each scanning line 5 of the true image data D* (m, n) described above, the influence of the true image data D* (m, n) having a large value free from defects will be large.

Figure 30:
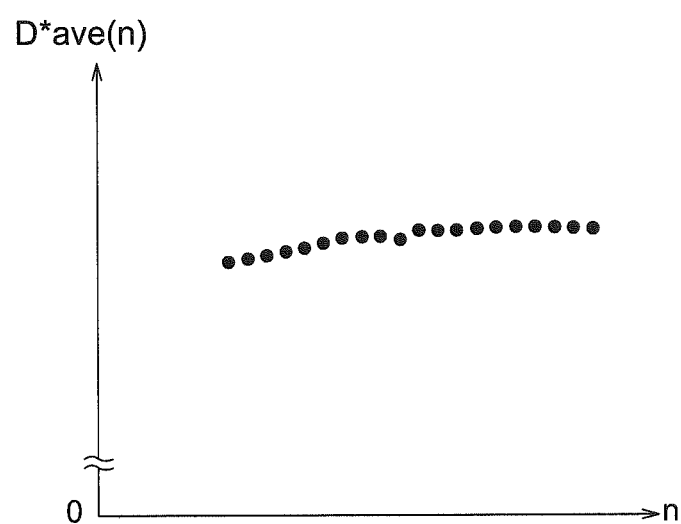
FIG. 30 is a chart showing an example of the profile of the mean value for each scanning line wherein the range of the image data containing defects is not clearly visible under the influence of the true image data of greater value free from any defect.

Thus, in the mean value D*ave(n) profile for each scanning line 5, the range of the true image data D* containing a defect will be difficult to identity, for example, as shown in FIG. 30. In some cases, the range of the true image data D* containing a defect cannot be identified precisely by analyzing the profile.

To solve this problem, the present embodiment identifies the true image data D* corresponding to the radiation detection element 7 of the portion reached by radiation without passing through an intermediary of a subject, so that the true image data D* corresponding to this radiation detection element 7 is excluded from objects of calculation of the aforementioned mean value D*ave(n). The following method, for example, is used to identify the true image data D* corresponding to the radiation detection element 7 of the portion reached by radiation without passing through an intermediary of a subject.

As described above, the true image data D* corresponding to the radiation detection element 7 of the portion reached by radiation without passing through an intermediary of a subject has a value equal to or close to the upper limit value that can be assumed by the true image data D. This fact can be utilized to design the structure, for example, in such a way that a value equal to or close to the upper limit value that can be assumed by the true image data D* is determined as a threshold value in advance, and all the true image data D* in excess of the threshold value is excluded from calculation object of the mean value D*ave(n).

For example, when the value in the range from 0 through 65535 ($=2^{16}-1$) can be assumed by the true image data D*, if the threshold value is set at 64000 for example, all of the true image data D* having a value equal to or greater than 64000 is excluded from the calculation object of the mean value D*ave(n).

Another possible structure, for example, utilizes the result of processing of identifying the region where there is an image of a radiographed subject conducted for generation of a radiation image by the console 58 as an image processing apparatus (hereinafter referred to as "subject region identification processing").

Figure 31A:
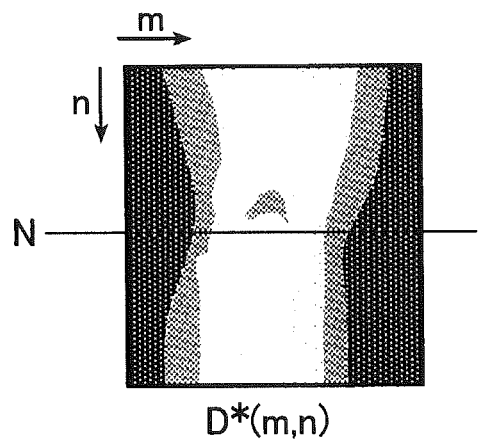
FIG. 31A is a diagram showing a diagram representing examples of the true image data extracted by subject region identification processing.

In subject region identification processing, the true image data D* (m, N) corresponding to each radiation detection element (m, N) connected to the scanning line 5 of the line number N, for example, is extracted from true image data D* (m, n), as shown in FIG. 31A, for example. The extracted true image data D* (m, N) is plotted according to the order of the line number "m" of the signal line 6.

Figure 31B:
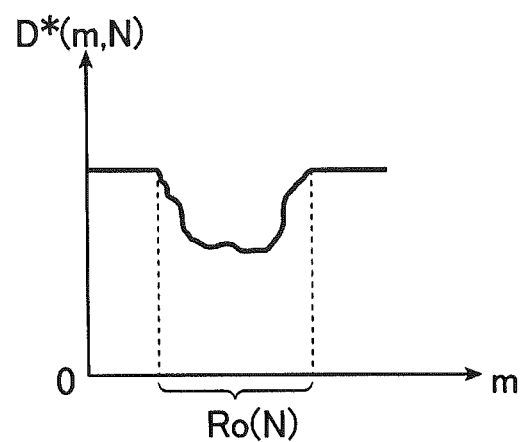
FIG. 31B is a chart showing an example of distribution of the true image data extracted.

Then the true image data D* corresponding to the radiation detection element 7 of the portion of the radiation image capturing apparatus 1 reached by radiation without passing through an intermediary of a subject has a value equal to or close to the upper limit value that can be assumed by the true image data D*, as shown in FIG. 31B. The true image data D* of the portion where a subject is radiographed will have a smaller value.

Figure 31C:
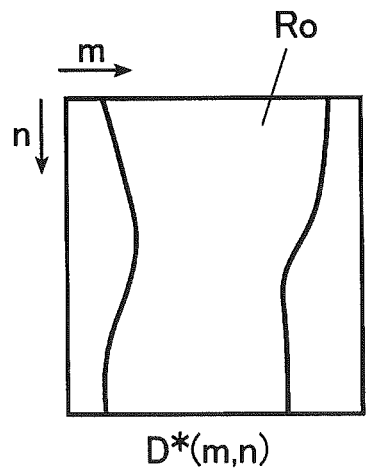
FIG. 31C is a diagram showing an example of the region in which the image of the determined subject is captured.

Thus, this profile is analyzed so that the region Ro (N) with a subject radiographed therein is determined for each true image data D* (m, N) corresponding to each radiation detection element (m, N) connected to the scanning line 5 of the line number N, as shown in FIG. 31B. If this processing is applied for each scanning line 5, it is possible to determine and identify the region Ro with a subject radiographed therein, in all the true image data D*, as shown in FIG. 31C.

As described above, the subject region identification processing ensures identification of the region Ro with a subject radiographed therein, in all the true image data D*.

Thus, the result of this subject region identification processing can be used to arrange such a configuration that the true image data D* (m, n) pertaining to the region other than the region Ro with the subject radiographed therein is excluded from the calculation object of the aforementioned mean value D*ave(n).

Having calculated the mean value D*ave(n) of the true image data D* (m, n) for each scanning line 5 in the aforementioned procedure (FIG. 29), the console 58 as an image processing apparatus analyzes the mean value D*ave(n) profile to identify the range of the true image data D* containing a defect (i.e., the range of the line defect).

In this profile, the mean value D*ave(n) of the true image data D* containing a defect is isolated from the overall trend of transition of the mean value D*ave(n) of the true image data D* free from detect. Thus, the present embodiment uses the following procedure to identify the range of the true image data D* containing a defect.

In the radiation image capturing apparatus 1, the line number "n" of the scanning line 5 to which on-voltage has been applied from the gate driver 15b (hereinafter, this scanning line 5 is referred to as detection line) can be identified in the step of reading the image data "d" by which start of irradiation has been detected (for detection method 2), or in the step of resetting each radiation detection element 7 immediately before the step of reading the leak data "d leak" by which start of irradiation has been detected (for detection method 1).

In the following description, the line number of this scanning line 5, that is, detection line will be referred to as "Na". For example, in the example of FIG. 27, scanning line 5 of the line number Na (i.e., detection line) corresponds to the line Ln+2 of the scanning line 5 to which on-voltage is applied in the step of reading the image data "d" by which the start of irradiation is detected (i.e., in this case, the line number Na is n+2). Further, the radiation image capturing apparatus 1 is so structured that, when the image data D and others are to be sent to the console 58, the line number Na of this scanning line 5 (i.e., detection line) is also sent together.

Figure 32:
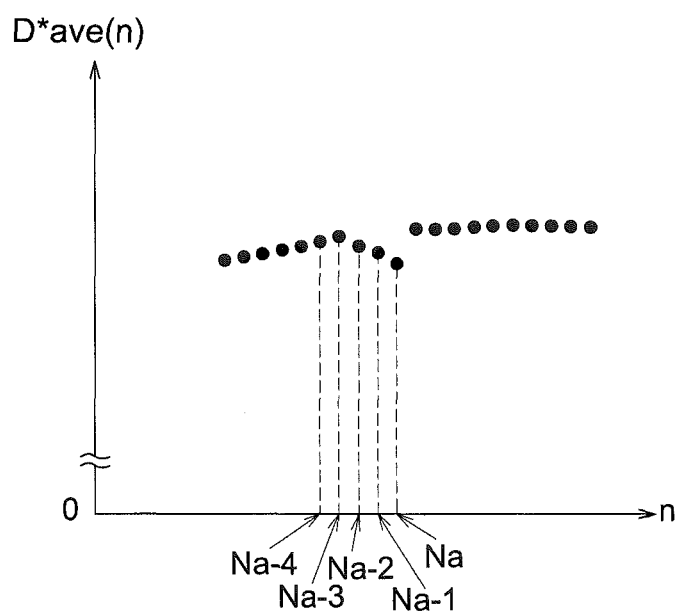
FIG. 32 is a chart showing the technique of identifying the range of the true image data containing a defect.

In the profile of the mean value D*ave(n) of the true image data D*, the console 58 as an image processing apparatus checks the mean value D*ave(n) corresponding to each line number of line numbers Na−1, Na−2, to which on-voltage was applied previously, in the order starting from the scanning line 5 of line number Na (i.e., detection line) supplied with on-voltage at the time of the start of irradiation being detected, as shown in FIG. 32.

The absolute value of the difference ΔD*ave between the D*ave(Na) and D*ave(Na−1) is calculated, and a decision is made to see whether or not the absolute value of the difference ΔD*ave is below the threshold value preset at a value close to zero (0). In the example of FIG. 32, the absolute value of the difference ΔD*ave between the D*ave(Na) and D*ave(Na−1) is equal to or greater than the threshold value. Accordingly, this is followed by the step of calculating the absolute value of the difference ΔD*ave between the D*ave(Na−1) and D*ave(Na−2), and a decision is made to see whether or not the absolute value of the difference ΔD*ave is below the threshold value.

If this procedure is repeated, both the absolute value of the difference ΔD*ave between the D* ave(Na−1) and D*ave(Na−2) and the absolute value of the difference ΔD*ave between the D*ave(Na−2) and D*ave(Na−3) are increased to the level equal to or greater than the threshold value in the example of FIG. 32. The absolute value of the difference ΔD*ave between the D*ave(Na−3) and D* ave(Na−4) is reduced to a level below the threshold value for the first time.

In this case, a decision is made to determine that radiation has been applied to the radiation image capturing apparatus 1 from the radiation source 52 (FIG. 11, FIG. 12) during the time between the step of resetting each radiation detection element 7 (for detection method 1) or the step of reading the image data "d" reading (for detection method 2) conducted when on-voltage is applied to the scanning line 5 of the line number Na−3, and the step of resetting each radiation detection element 7 or the step of reading the image data "d" conducted when on-voltage is applied to the scanning line 5 of the line number Na−2.

In this case, the console 58 identifies the scanning line 5 of the line number Na−2 as a first scanning line 5 where a defect has started to occur to the image data D.

In this case, the range of the true image data D* containing a defect (i.e., the range of the line defect) is identified as the true image data D* corresponding to each radiation detection element 7 connected to three scanning lines 5 having line numbers Na−2, Na−1 and Na. To be more specific, of the true image data D* (m, n), the true image data D* (m, Na−2), D* (m, Na−1) and D* (m, Na) are identified as forming the range of the true image data D* containing a defect.

Figure 33:
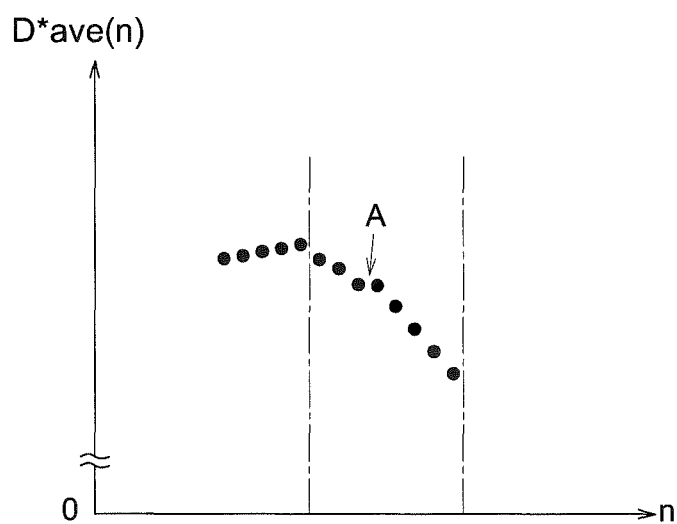
FIG. 33 is a chart showing that the absolute value of the difference of the mean values can be below the threshold value in the range of the true image data containing a defect.

In the range of the true image data D* containing a defect (the range marked by two one-dot chain lines in the drawing), the absolute value of the difference ΔD*ave of the mean value D*ave(n) can be reduced to a level below the threshold value, as shown by the arrow mark A of FIG. 33.

Thus, as described above, arrangements are made in such a way that the aforementioned difference ΔD*ave is calculated in decreasing order of the line number "n" of the scanning line 5, and calculation of the difference ΔD*ave and comparison between the absolute value of the difference ΔD* ave and the threshold value are continued even when the absolute value of the difference ΔD*ave between the mean values D*ave(n) has been reduced to a level below the threshold value.

When confirmation has been made of the continuous appearance of the difference ΔD*ave whose absolute value is reduced below the threshold value, deviation from the range of the true image data D* containing a defect is identified to terminate the step of finding out the range of the true image data D* containing a defect.

In addition to the aforementioned procedures, it is also possible to arrange such a configuration that the range of the true image data D* containing a defect is identified by stricter image processing, for example.

The console 58 as an image processing apparatus identifies the range of the true image data D* containing a defect (the range of three scanning lines 5 of the line number Na−2 through Na in the above example in the aforementioned procedure). Then the true image data D* in the identified range is corrected. The following method, for example, can be used to correct the true image data D* containing a defect.

Figure 34:
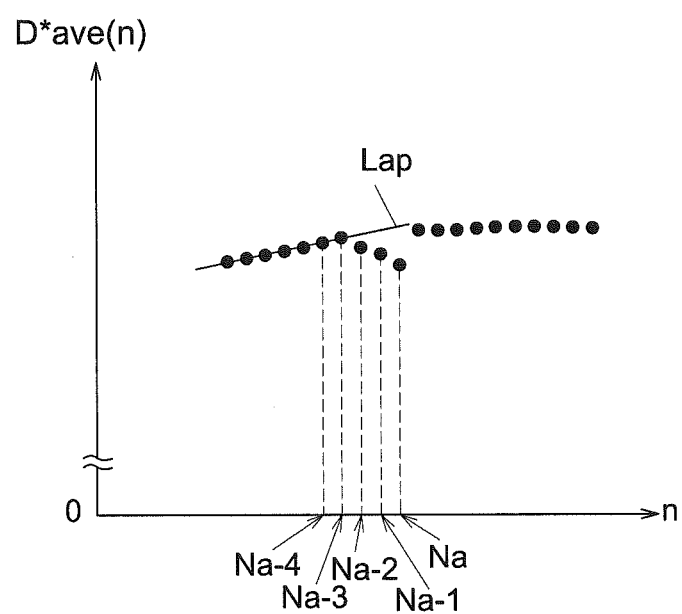
FIG. 34 is a chart showing an example of the straight line obtained by approximation of each mean value except for the mean value identified as the range of the true image data including a defect.

To take an example from FIG. 32, the mean value D*ave (Na−3), the mean value D*ave(Na−4) on the left of the drawing of the mean value D*ave(Na−2) through D*ave(Na) identified as the range of the true image data D* containing a defect or each mean value D*ave(n) in the range including the each mean value D*ave(n) on the further left of the drawing is subjected to linear approximation by a straight line Lap, for example, as shown in FIG. 34. To be more specific, linear approximation is performed to meet the following expression:

$$D^*ap = a \times n + b \qquad (2)$$

When a defect is not included, the mean value D*ave (Na−2), D*ave(Na−1) and D*ave(Na) are assumed to be inherently a×(Na−2)+b, a×(Na−1)+b and a×Na+b (which can be obtained by substituting Na−2, Na−1 and Na into the Expression (2)).

Thus, {a×(Na−2)+b}/D*ave(Na−2) is multiplied by each true image data D* (m, Na−2) corresponding to each radiation detection element (m, Na−2) connected to the scanning line 5 of the line number Na−2. To be more specific, the following calculation is made to correct each true image data corresponding to each radiation detection element (m, Na−2) connected to the scanning line 5 of the line number Na−2:

$$D^*(m,Na-2)\times\{a\times(Na-2)+b\}/D^*ave(Na-2) \quad (3)$$

This also applies to each true image data D* (m, Na−1), D* (m, Na) corresponding to each radiation detection element (m, Na−1), (m, Na) connected to each scanning line 5 of the line number Na−1, Na. Thus, the following calculation is made to correct the true image data corresponding to each radiation detection element (m, Na−1), (m, Na) connected to each scanning line 5 of the line number Na−1, Na:

$$D^*(m,Na-1)\times\{a\times(Na-1)+b\}/D^*ave(Na-1) \quad (4)$$

$$D^*(m,Na)\times\{a\times(Na)+b\}/D^*ave(Na) \quad (5)$$

In this manner, the method of linear approximation or the like is used to correct the true image data D* in the identified range as the range of the true image data D* containing a defect.

In another correction method, for example, the console 58 as an image processing apparatus is designed to incorporate in advance the information on the relationship between the number of the scanning lines 5 from the first scanning line 5 (i.e., scanning line 5 of the line number Na−2 in the above example) where a defect has started to occur, to the scanning line 5 to be corrected, out of each scanning line 5 (i.e., scanning line 5 of the line number Na−2 to Na in the above example) of the radiation image capturing apparatus 1 corresponding to the range of the true image data D* containing a defect, and the coefficient to be multiplied by the true image data D* corresponding to each radiation detection element 7 connected to the scanning line 5 to be corrected.

To be more specific, for example, in the first scanning line 5 (i.e., scanning line 5 of the line number Na−2 in the above example) where a defect has started to occur, 1.1 is assumed as the coefficient to be multiplied by the true image data D* corresponding to each radiation detection element 7 connected to this scanning line 5. In the second scanning line 5 (i.e., scanning line 5 of the line number Na−1 in the above example) from the first scanning line 5 where a defect has started to occur, 1.2 is assumed as the coefficient to be multiplied by the true image data D* corresponding to each radiation detection element 7 connected to this scanning line 5.

In the third scanning line 5 (i.e., scanning line 5 of the line number Na (i.e., detection line) in the above example) from the first scanning line 5 where a defect has started to occur, 1.3 is assumed as the coefficient to be multiplied by the true image data D* corresponding to each radiation detection element 7 connected to this scanning line 5. The information of such relationship is stored in the console 58 in advance.

This relationship is determined in advance by conducting an experiment Up to which number of the scanning line 5 the information of this relationship is prepared from the first scanning line 5 where a defect has started to occur is determined as appropriate in response to the sensitivity in detecting the start of irradiation in the radiation image capturing apparatus 1.

The console 58 analyzes a profile of true image data D* or mean value D*ave(n) in the aforementioned procedure, and identifies the first scanning line 5 where a defect has started to occur, and the range of the true image data D* containing a defect. Referring to the aforementioned information, the console 58 then multiplies each true image data D* in the identified range by the aforementioned coefficient assigned to the scanning line 5 connected with the radiation detection element 7 corresponding to the relevant true image data D*.

The aforementioned procedure appropriately corrects the true image data D* in the range identified as the range of the true image data D* containing a defect, using the information on the relationship between the scanning line 5 and the coefficient.

In addition to the aforementioned procedure, for example, it is also possible to arrange such a configuration as to correct the true image data D* containing a defect by application of stricter image processing or the like.

For example, in the calculation of the mean value D*ave(n) for each scanning line 5 of the true image data D* (m, n) (or the image data D (m, n) itself, wherein this is applicable to the following description) shown in each of the FIG. 29 and following figures, the true image data D* corresponding to the radiation detecting element 7 of the portion having been reached by radiation directly without passing through a subject was identified (refer to FIG. 31A through 31C), as described above. The true image data D* corresponding to these radiation detecting elements 7 was excluded from the calculation of the mean value D*ave(n).

Despite that, the mean value D*ave(n) for each scanning line 5 is subjected to a serious influence of the true image data D* having a large value. To put it another way, the body of a patient as a subject is normally thicker near the center thereof and is less thick toward the periphery. Thus, the amount of radiation transmission is greater on the periphery of the subject rather than near the center thereof, with the result that the value of the true image data D* corresponding to that portion is greater than that of the true image data D* at the center of the body.

Thus, as described above, if the mean value D*ave(n) for each scanning line 5 of the true image data D* (m, n) is simply calculated, the mean value D*ave(n) obtained will be greatly affected by the influence of the true image data D* (m, n) on the periphery of the subject. Then, if there is a relatively greater fluctuation in the true image data D* (m, n) having a large value on the periphery of the subject, the fluctuation of the true image data D* (m, n) will be reflected on the profile of the mean value D*ave(n) for each scanning line 5. Thus, a reduction in the mean value D*ave(n) on the portion may not clearly appear at a line defect as shown in FIG. 29 and FIG. 32 in some cases, for example.

In an example of strict image processing described below, the console 58 as an image processing apparatus is preferably configured to identify the range of the true image data D* (or image data D) containing a defect, by using the true image data D*nor that is normalized through the calculation of dividing the true image data D* by the reference value, instead of using the value of the true image data D* itself.

In this case, it is possible to use as the reference value a desired line within the region Ro (refer to FIG. 31C, for example) which is identified by the aforementioned subject region identification processing and which contains the subject, i.e., true image data D* (m, n) of a line of the true image data D* (m, n) containing a desired "n" within the region Ro (this line is hereinafter referred to as a "reference line").

To be more specific, for example, the reference line can be the line at the position where the length in the region Ro in the extended direction (i.e., in the lateral direction in FIG. 31C) of the scanning line 5 is the longest (e.g., the top end (i.e., the portion where n=1) in FIG. 31C), and each piece of true image data D* (m, 1) on that reference line can be a reference value.

Further, the reference line can also be the line corresponding to the scanning line 5 close to the detection line (such as line Na of the scanning line 5 in FIG. 32), for example. And a reference value can be each piece of true image data D* (m, n) calculated based on the image data D read out of each radiation detecting element 7 connected to the scanning line 5.

In this case, of the scanning lines 5 close to the detection line Na, such a scanning line 5 as the scanning line 5 whose line number in FIG. 32 is Na−3 through Na−1 is exactly the scanning line 5 as a target of strict image processing to be conducted from now on. Accordingly, such a scanning line should not be selected as a reference line. Thus, in the above case, the scanning line 5 whose line number "n" is greater than the detection line Na (e.g., scanning line 5 having any line number "n" greater than Na in FIG. 32) is preferably used as a reference line. And each piece of true image data D* (m, n) calculated based on each piece of image data D (m, n) read out of each radiation detecting element 7 connected thereto is preferably used as a reference value.

The process of normalization is performed by dividing the true image data D* (m, n) of the same column on another line (i.e., having the same "m") by each reference value set in the aforementioned procedure, i.e., each piece of true image data D* (m, n) calculated according to the image data D (m, n) read out of each radiation detecting element 7 connected to the scanning line 5 of the reference line.

To be more specific, when certain true image data D* (m, n) is to be normalized, the true image data D* (m, n) is divided by the true image data D* (m, n) having the same "m" (i.e., line number "m" of the signal line 6) as the relevant true image data D* (m, n), out of the reference values. When the true image data D* (M, n) (M≠m) of another column is to be normalized, the true image data D* (M, n) is divided by the true image data D* (M, n) having the same M as the relevant true image data D* (M, n), out of reference values.

As described above, for the true image data D* (m, n) within the region Po, each of normalized true image data D*nor (m, n) is calculated from each reference value and each piece of true image data D* (m, n). In the above procedure, since each piece of true image data D* (m, n) on the reference line is normalized through division by its own value, each piece of the true image data D*nor (m, n) normalized on the reference line will be 1.

In the similar manner, for each piece of the normalized true image data D*nor (m, n), the mean value D*nor_ave(n) for each scanning line 5 of the radiation image capturing apparatus 1 is calculated. The resulting values are arranged along the extension of the signal line 6 of the radiation image capturing apparatus 1 and are plotted, so that the profile of the mean value D*nor_ave(n) is formed. This profile is analyzed to identify the scope of the true image data D* containing a defect.

As described above, for each piece of the normalized true image data D*nor (m, n), the mean value D*nor_ave(n) for each scanning line 5 is calculated. This ensures that the relative weight of the fluctuation for each piece of true image data D*nor (m, n) is made uniform. This provides a reliable means for preventing the cases where, for example, there is a relative increase in the fluctuation of the true image data D* (m, n) on the periphery rather than near the center of the subject thereby causing reduction of the mean value D*ave(n) not to appear clearly on the portion containing a line defect (refer to e.g., FIG. 29 and FIG. 32), as described above.

Figure 35A:
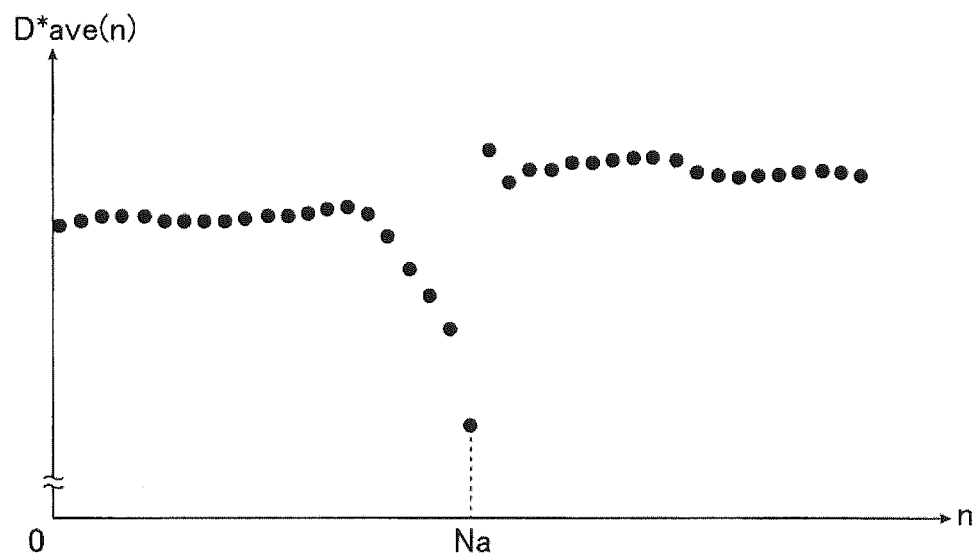
FIG. 35A is a chart showing an example of a profile of the mean value of each piece of the true image data before being normalized and FIG. 35B is a chart showing an example of a profile of the mean value of each piece of the true image data after being normalized.
Figure 35B:
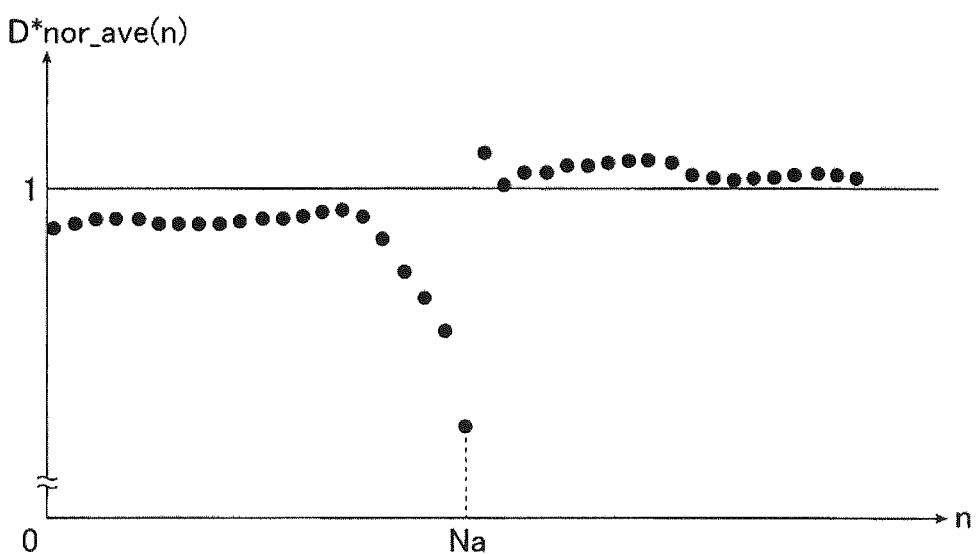

When the profile of the mean value D*ave(n) of each piece of the true image data D* (m, n) before being normalized is that illustrated in FIG. 35A, for example, the profile of the mean value D*nor_ave(n) of each piece of the true image data D*nor (m, n) after being normalized will be that illustrated in FIG. 35B, for example.

The following provides an example of the technique of identifying the scope of the true image data D* containing a defect and repairing the same by analyzing the profile (refer to FIG. 35B) of the mean value D*nor_ave(n) of each piece of the normalized true image data D*nor (m, n) calculated in the aforementioned manner.

Figure 36:
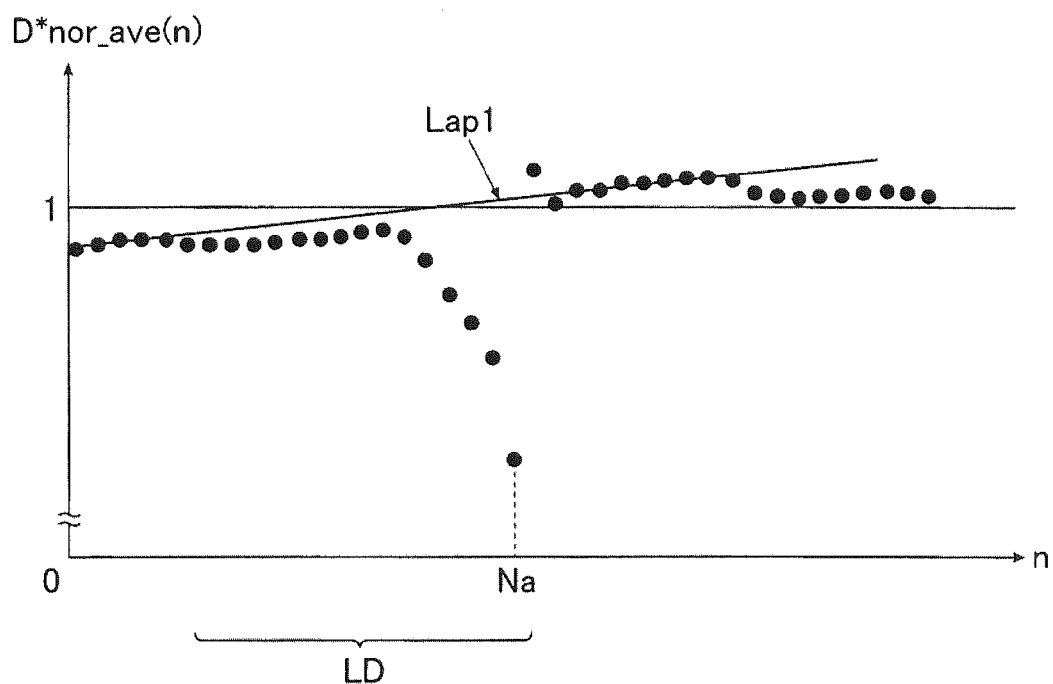
FIG. 36 is a chart showing a straight line or the like that approximates each mean value in each scanning line before and after the detection line, except for the scanning line that may contain a line defect in FIG. 35B.

In the first place, a step is taken to calculate the first approximate straight line Lap1 that approximates each mean value D*nor_ave(n) in each of a prescribed number of scanning lines 5 before and after the detection line Na, except for the portion LD of the scanning line 5 that may contain a line defect, i.e., the portion LD including the detection line Na and a prescribed number of scanning lines 5 whose line number is smaller than Na (i.e., a prescribed number of scanning lines 5 to which on-voltage was applied ahead of the detection line Na), in the profile of the mean values D*nor_ave(n) of normalized true image data D*nor (m, n), as shown in FIG. 36.

For each line number "n" including the line number Na of the detection line LNa, a step is taken to plot the value which is obtained by dividing the actual mean value D*nor_ave(n) by the value corresponding to the relevant mean value D*nor_ave(n) on the first approximate straight line Lap1. This will give a chart of FIG. 37 for example. The value obtained by the division indicates the actual reduction rate DS(n) of the mean value D*nor_ave(n) relative to the first approximate straight line Lap1.

Figure 37:
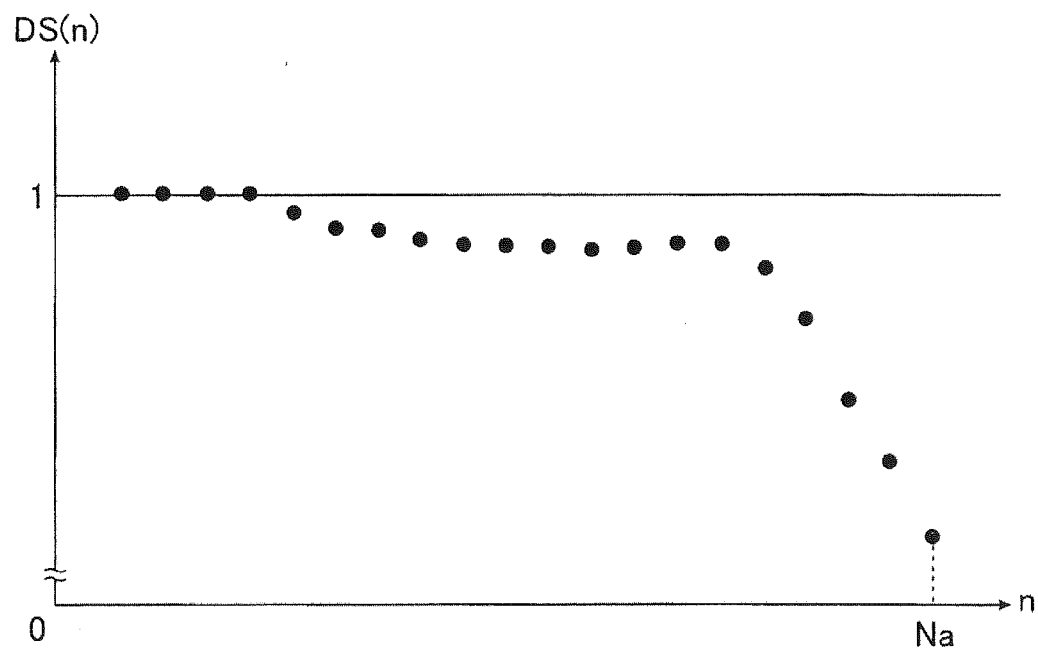
FIG. 37 is a chart showing a reduction rate of the actual mean value for each scanning line 5 relative to a straight line in FIG. 36.

FIG. 37 and figures thereafter show only the portion of the detection line Na and each of scanning lines 5 whose line number is smaller than Na. The following describes for the case wherein this reduction rate DS(n) is used for processing. However, it is possible to arrange the configuration in such a way that processing is performed by using the mean value D*nor_ave(n) of each piece of normalized true image data D*nor (m, n) as it is, without approximation by the first approximate straight line Lap1.

The reduction rate DS(n) is slightly smaller than 1 on the portion of the scanning line 5 whose line number is smaller than the detection line Na by about 5 to 15. This is assumed to be the portion where some subject such as a bone or organ has been captured. To be more specific, this portion is not the portion where a line defect to be described below appears.

In the aforementioned procedure, the reduction rate DS(n) is calculated for each scanning line 5. With respect to the calculated reduction rate DS(n), this is followed by the step of applying approximation by the second approximate straight line Lap 2 to the reduction rate DS (Na) of the detection line Na, and each of the reduction rates DS(n) of a prescribed number of scanning lines 5 to which on-voltage has been applied before the detection line Na (i.e., each of a prescribed number of the scanning lines 5 whose line number is smaller than the detection line Na) in the process of detecting the start of irradiation in the radiation image capturing apparatus 1 (refer to the aforementioned detection methods 1 and 2). In the following description, the second approximate straight line Lap 2 is simply called the approximate straight line Lap 2.

Figure 38:
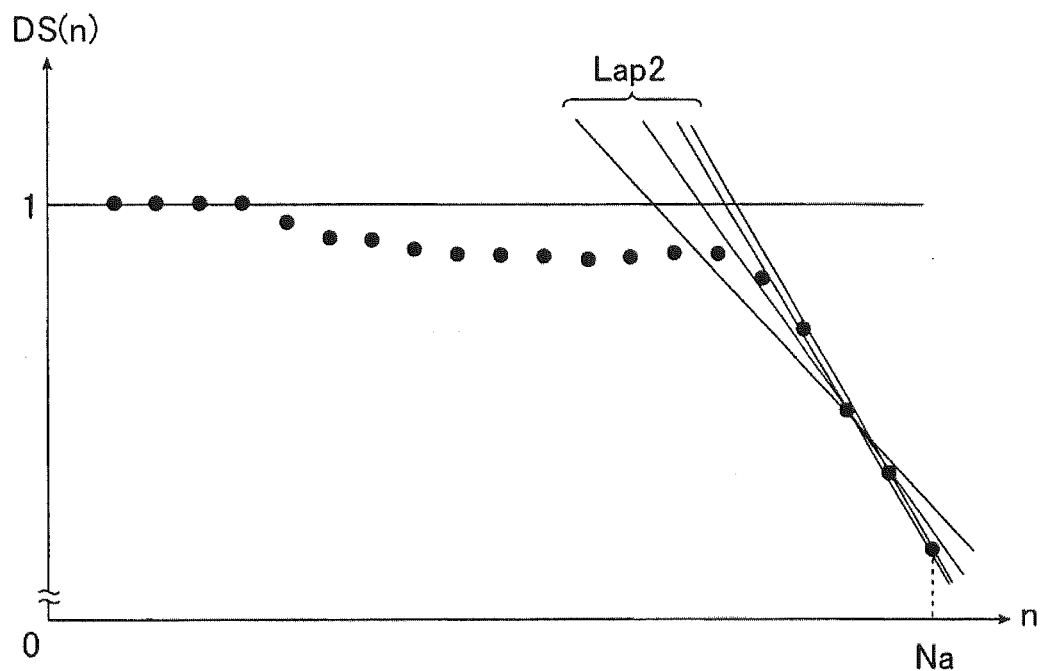
FIG. 38 is a chart showing each of approximate straight lines when changing a prescribed number of scanning lines including the detection line.

As shown in FIG. 38, the prescribed number of the aforementioned scanning lines 5 is changed, and approximation by the approximate straight line Lap 2 is applied.

To put it more specifically, assume that the prescribed number is four. This means that assumption has been made that the scope of the true image data D* containing a defect (i.e., the scope of the line defect) corresponds to the true image data D* calculated based on the image data D read out of each of the radiation detecting elements 7 connected to four scanning lines 5 having the line numbers Na−3 through Na.

Each of reduction rates DS(Na−3) through DS(Na) of the four scanning lines 5 having the line numbers Na−3 through Na selected in this manner is subjected to approximation by the approximate straight line Lap 2, for example, according to the method of least square. To be more accurate, in this case, the four points of (Na−3, DS(Na−3)), (Na−2, DS(Na−2)), (Na−1, DS(Na−1)) and (Na, DS(Na)) on the chart of FIG. 38 and others are subjected to approximation by the approximate straight line Lap 2.

Further assume that values on the approximate straight line Lap 2 corresponding to scanning lines 5 having the line numbers Na−3 through Na are, for example, Lap 2(Na−3) through Lap 2(Na), respectively. Each of the reciprocals 1/Lap 2(Na−3) through 1/Lap 2(Na) of each of the values Lap 2(Na−3) through Lap 2(Na) is considered to be a repair coefficient for repairing each piece of the true image data D* calculated based on the image data D read out of each radiation detecting element 7 connected to each of the scanning lines 5 having the line numbers n of Na−3 through Na assumed to be the scope to be repaired as described above.

Thus, reduction rates DS(Na−3) through DS(Na) of the scanning lines 5 having the line numbers "n" of Na−3 through Na are multiplied by repair coefficients 1/Lap 2(Na−3) through 1/Lap 2(Na), respectively. Then reduction rates DS(Na−3)/Lap 2(Na−3) through DS(Na)/Lap 2(Na) having been repaired each should have been repaired to a value close to 1.

For the four scanning lines 5 having the line numbers Na−3 through Na assumed to be the scope of the true image data D* containing a defect (i.e., the scope of line defect), the square error (i.e., square of the difference) between each of the repaired reduction rates DS(Na−3)/Lap 2(Na−3) through DS(Na)/Lap 2(Na), and 1 is calculated. In the meantime, for other scanning lines 5, the square error between each of the original reduction rates DS(n) and 1 is calculated.

This is followed by the step of calculating the total value of these square errors. The total value of these square errors calculated in this manner serves as a value of approximation for the approximate straight line Lap 2 when a prescribed number is assumed as four. Thus, the total value of the square error having been calculated is assigned to the approximate straight line Lap 2 when a prescribed number is four.

In the aforementioned manner, the prescribed number of the scanning lines 5 assumed as the scope of the true image data D* containing a defect (i.e., scope of line defect) is changed to 2, 3, 4 and so forth. Then liner approximation by the approximate straight line Lap 2 is applied, as shown in FIG. 38.

Every time the approximate straight line Lap 2 is calculated, for the scanning line 5 within the aforementioned scope, the square error between each repaired reduction rate and 1 is calculated in the same manner as above. For other scanning lines 5, the square error between each of the original reduction rates DS(n) and 1 is calculated. Then, the total value of the square errors is calculated and is assigned to the approximate straight line Lap 2.

Figure 39:
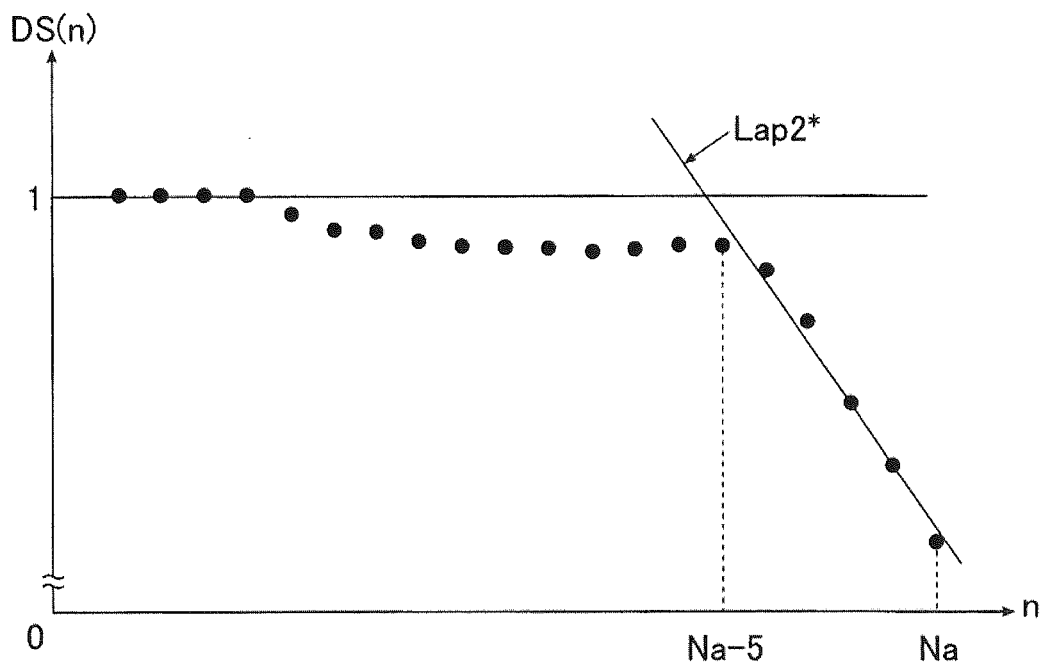
FIG. 39 is a chart showing an example of approximate straight lines selected from approximate straight lines in FIG. 38.

As shown in FIG. 39, the approximate straight line Lap 2* where the total value of the square errors is the minimum is selected from the approximate straight lines Lap 2. If the selected approximate straight line Lap 2* is the approximate straight line obtained by approximation of the scanning lines 5 having the line numbers Na−5 through Na, for example, then the scope of the true image data D* containing a defect (i.e., the scope of line defect) can be identified as the true image data D* having been calculated based on the image data D read out of each radiation detecting element 7 connected to each of the scanning lines 5 having the line numbers Na−5 through Na.

In this case, as described above, each of the reciprocals 1/Lap 2*(Na−5) through 1/Lap 2*(Na) of each of the values Lap 2*(Na−5) through Lap 2*(Na) on the selected approximate straight line Lap 2*, corresponding to the scanning lines 5 having the line numbers Na−5 through Na, becomes each repair coefficient for the true image data D* based on the image data D read out of each of the radiation detecting elements 7 connected to each of the scanning lines 5 having the line numbers Na−5 through Na.

Thus, the true image data D* for each of the radiation detecting elements 7 connected to each of the scanning lines 5 having line numbers Na−5 through Na is multiplied by the corresponding repair coefficient from 1/Lap 2*(Na−5) to 1/Lap 2*(Na), thereby repairing each piece of the true image data D* within the scope to be repaired.

To put it more specifically, the true image data D* (m, Na−5) for each radiation detecting element 7 (m, Na−5) whose line number n is Na−5 is multiplied by the repair coefficient 1/Lap 2*(Na−5). Similarly, the true image data D* (m, Na−4) to D* (m, Na) whose line number "n" is Na−4 to Na is multiplied by the repair coefficient 1/Lap 2*(Na−4) to 1/Lap 2*(Na) respectively. This will repair each piece of the true image data D* within the scope to be repaired.

Figure 40:
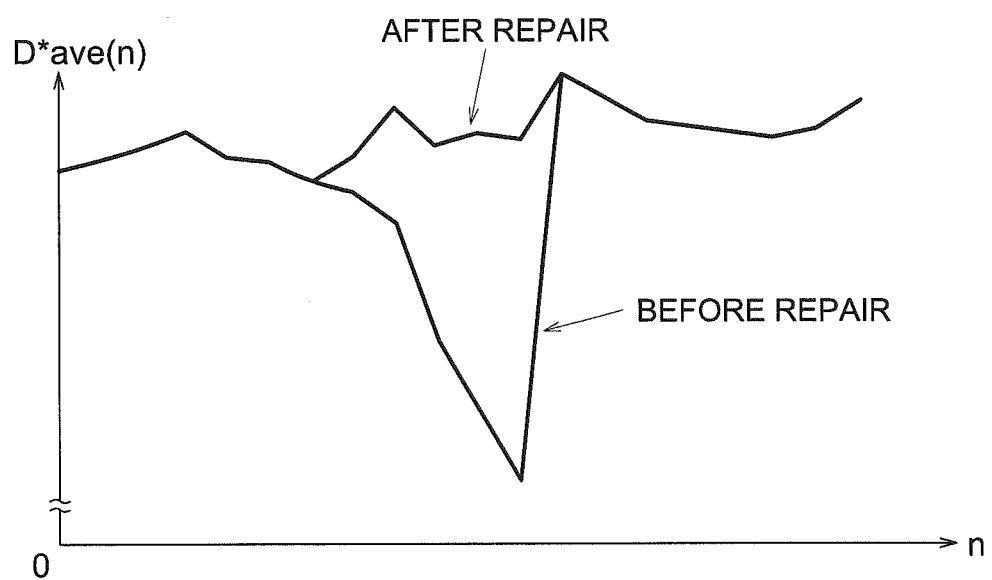
FIG. 40 is a chart showing mean values of true image data for each scanning line before and after the repair.

By adopting the aforementioned configuration to repair each piece of the true image data D* within the scope to be repaired, appropriate repair of each piece of the true image data D* can be achieved by more strict image processing applied to each piece of the true image data D* within the scope to be repaired, for example, as shown in FIG. 40, although this is the case where the body position different from that of FIG. 35A has been captured and the mean value D*ave(n) for each scanning line 5 of the true image data D* is indicated.

In the above description of an example of the technique for repairing the true image data D* illustrated in FIG. 38 and FIG. 39, reduction rate DS(n) and others for each scanning line 5 are subjected to approximation by the approximate straight line Lap 2. This is based on the assumption that, when radiation is applied to the radiation image capturing apparatus 1 from the radiation source 52 (refer to FIG. 11 and FIG. 12), the dosage rate of radiation (i.e., dosage per unit time) "u" rises immediately after start of irradiation as shown in FIG. 41A.

To be more specific, since the dosage rate of radiation "u" from the start of irradiation is constant, the electric charge generated inside the radiation detecting elements 7 of the radiation image capturing apparatus 1 increases in proportion to time "t". The electric charge increasing in proportion to time "t" is discharged from radiation detecting elements 7 in the reset processing (for detection method 1) of the radiation detecting elements 7 or in the image data d read-out processing (for detection method 2) subsequent to start of irradiation. This causes a line defect to occur.

This leads to the assumption that, as shown in FIG. 39 and others, a decrease of the true image data D* in the portion containing a line detect (a decrease of corresponding reduction rate DS(n) for FIG. 39) is subjected to approximation by approximate straight line Lap 2.

Figure 41A:
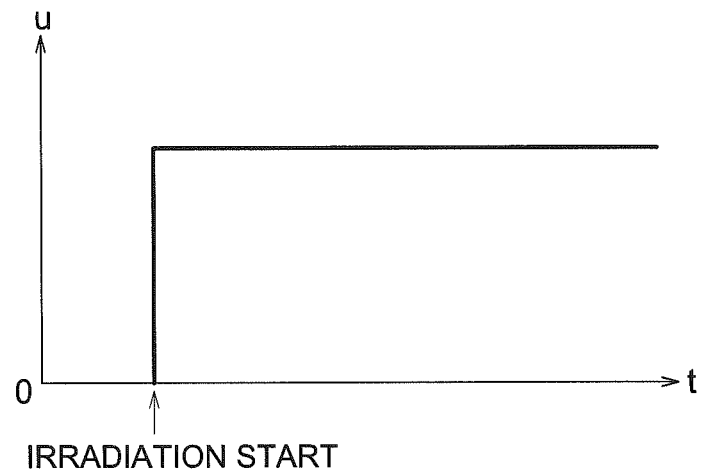
FIG. 41A is a chart showing a temporal transition of the dosage rate of radiation from the radiation source when the dosage rate of radiation instantly rises immediately after the start of irradiation and FIG. 41B is a chart showing a temporal transition of the dosage rate of radiation from the radiation source when the dosage rate of radiation has reached a constant level after increasing in proportion to time.

However, there is a great variety of radiation rising property from the start of irradiation in the radiation source 52, so the dosage rate of radiation "u" does not always instantly rise immediately after the start of irradiation as shown in FIG. 41A.

When using the radiation source 52 where the dosage rate of radiation "u" does not instantly rise immediately after start of irradiation, it is preferred to repair each piece of true image data D* by setting an appropriate function based on the radiation rising property from start of irradiation in the radiation source 52 and then applying approximation using the preset function to the decrease of the true image data D* in the portion containing a line defect (or a change in reduction rate DS(n) corresponding thereto) instead of applying approximation by approximate straight line Lap 2 as in the above case.

As described above, the electric charge generated inside the radiation detecting elements 7 of the radiation image capturing apparatus 1 increases according to the chronological cumulative value of the dosage rate of radiation "u" applied to the radiation image capturing apparatus 1.

Figure 41B:
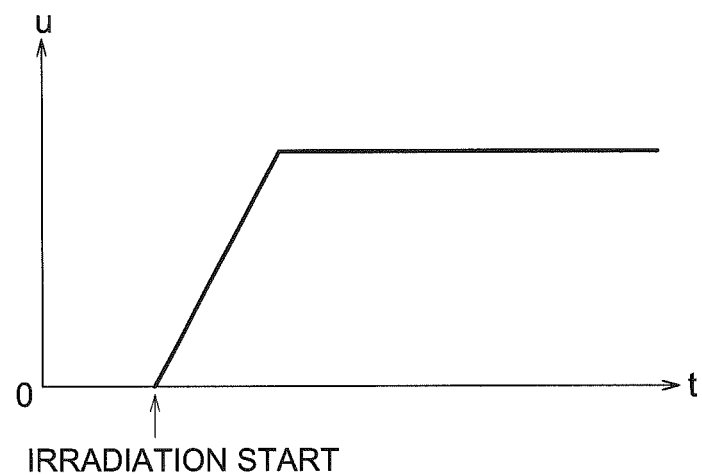

Accordingly, when setting the aforementioned function, when the dosage rate of radiation "u" applied from the radiation source 52 changes, for example, as shown in FIG. 41B, approximation can be applied using the quadratic function for the scanning line 5 where reset processing (in the ease of detection method 1) of each radiation detecting element 7 or image data "d" read-out processing (in the case of detection method 2) may have been performed while the dosage rate of radiation "u" is increasing; and approximation can be applied using the linear function (i.e., straight line) for the scanning line 5 where reset processing or the like of each radiation detecting element 7 may have been performed after the dosage rate of radiation "u" has reached a constant level.

When the temporal variation of the dosage rate of radiation "u" applied from the radiation source 52 assumes another format, the temporal integral value of the dosage rate of radiation "u" also changes accordingly. As described above, it is preferred to repair each piece of true image data D* by setting an appropriate function based on the radiation rising property from the start of irradiation in the radiation source 52 and then applying approximation by the preset function.

When such a structure is adopted and a plurality of radiation sources 52 are installed in a facility, it is preferred to set the aforementioned function (including the case of approximate straight line) for each radiation source 52 by, for example, detecting the radiation rising property from start of irradiation for each radiation source 52. The console 58 as an image processing apparatus identifies from which radiation source 52 the radiation has been applied to obtain the image data D. It then applies the function corresponding to that radiation source 52 to perform the aforementioned repair processing.

As described above, according to the radiation image capturing system 50 of the present invention, the step of reading the leak data "d leak" or image data "d" is performed by the radiation image capturing apparatus 1 prior to radiation image capturing operation. The start of irradiation is detected based on the leak data "d leak" or image data "d" having been read out.

In the radiation image capturing system as described with reference to the embodiment of the present invention, the step of reading the leak data or image data is performed by the radiation image capturing apparatus, prior to radiation image capturing operation, and start of irradiation is detected based on the value of the leak data or image data having been read out. This ensures start of irradiation to be accurately detected by the radiation image capturing apparatus itself.

Thus, start of irradiation can be accurately detected by the radiation image capturing apparatus 1 itself based on the value of the leak data "d leak" or image data "d" having been read out, for example, without having to provide the radiation image capturing apparatus 1 with a current detection unit for detecting the current flowing through the bias line 9 as in the invention disclosed in the Specification of the aforementioned U.S. Pat. No. 7,211,803 or Unexamined Japanese Patent Application Publication No. 2009-219538. This provides a reliable means for preventing such a problem that the noise having occurred in the current detection unit is transmitted to each radiation detection element 7 through the bias line 9 and is superimposed on the image data D as noise.

According to the radiation image capturing system 50 of the present embodiment, the console 58 as an image processing apparatus analyzes the profile of the image data D or true image data D* arranged along the extension of the signal line 6 of the radiation image capturing apparatus 1, or the profile of the mean value D*ave(n) of such as the true image data D* (m, n) arranged along the extension of the scanning line 5, and appropriately identifies the range of the image data D or true image data D* where a defect has occurred, namely, the range of the line defect.

The aforementioned procedure is used to correct the image data D or true image data D* in the appropriately identified range. Thus, a radiation image can be produced, after a step is taken to appropriately correct the line defect occurring in the image data D obtained by the radiation image capturing using the radiation image capturing apparatus 1.

This effectively prevents a line defect from entering the radiation image in a linear (or belt-shaped) form and making it difficult to view the radiation image. Thus, radiation image free from a line defect can be generated correctly. For example, when the radiation image is used for diagnosis in medical treatment, and even if a lesion image is included in the line defect, since complete correction of the line defect is ensured, the legion can be accurately identified by a doctor who examines the radiation image produced according to the corrected image data.

It goes without saying that the present invention can be modified as required, without being restricted to the aforementioned embodiments.

What is claimed is:

1. A radiation image capturing system comprising:
a radiation image capturing apparatus comprising:
a detecting section including:
a plurality of scanning lines and a plurality of signal lines provided to cross each other; and
a plurality of radiation detection elements arranged in a two-dimensional array in small regions partitioned by the plurality of scanning lines and the plurality of signal lines;
a scanning drive unit which sequentially applies on-voltage to each of the scanning lines by switching the scanning lines to which the on-voltage is applied;
switch units each connected to each of the scanning lines so as to discharge electric charge accumulated in the radiation detection elements to the signal lines when the on-voltage is applied;
a reading circuit for converting the electric charge discharged from the radiation detection elements, into image data to read the image data;
a control device for controlling at least the scanning drive unit and the reading circuit to perform processing of reading the image data from the radiation detection elements; and
a communication unit for exchanging signals with an external device; and an image processing apparatus for generating a radiation image based on the image data sent from the radiation image capturing apparatus,
wherein the control device is configured to detect a start of irradiation when data read by the reading circuit exceeds a threshold value, and
wherein the image processing apparatus is configured to analyze a profile of the image data in a direction of extension of each of the signal lines, to identify a scope of the image data containing a defect caused by an escape of the electric charge which occurs by the detection of the start of irradiation, and to repair the image data in the identified scope.

2. The radiation image capturing system of claim 1,
wherein, prior to radiation image capturing operation, the control device is configured to alternately repeat processing of reading out leak data and processing of resetting each of the radiation detection elements, and configured to detect the start of irradiation when the read leak data exceeds the threshold value, and
wherein the control device performs the processing of reading out leak data by allowing the reading circuit to perform cyclic reading operations, after allowing the scanning drive unit to apply off-voltage to all the scanning lines so that each of the switch units is turned off, and by converting the electric charge having leaked from the radiation detection elements through the switch units into the leak data.

3. The radiation image capturing system of claim 1,
wherein, prior to radiation image capturing operation, the control device is configured to allow the scanning drive unit to sequentially apply the on-voltage to each of the scanning lines, and allow the reading circuit to repeat processing of reading out image data for detecting a start of irradiation, and configured to detect the start of irradiation when the read image data for detecting the start of irradiation exceeds the threshold value.

4. The radiation image capturing system of claim 1,
wherein the image processing apparatus is configured to:
calculate, for each of the scanning lines, a mean value of the image data arranged in a direction of extension of the each of the scanning lines, and calculate a profile of the mean value in the direction of extension of each of the signal lines;
select a detection line which is one of the scanning lines to which the on-voltage has been applied when or immediately before the control device detects the start of irradiation;
calculate a first approximate straight line approximating the profile of the mean value of a first prescribed number of the scanning lines before and after the selected detection line except for the detection line and a second prescribed number of the scanning lines to which the on-voltage has been applied before the detection line;
divide, for each of the scanning lines including the detection line, the first prescribed number of the scanning lines and the second prescribed number of the scanning lines, the mean value by a value on the first approximate straight line corresponding to each of the scanning lines so as to calculate a reduction rate for each of the scanning lines and calculate a profile of the reduction rate for each of the scanning lines;
select the detection line and a third prescribed number of the scanning lines to which on-voltage has been applied before the detection line;
approximate a profile of the reduction rate for the third prescribed number of the scanning lines by a second approximate straight line, and then for the third prescribed number of the scanning lines, multiply the reduction rate of each of the corresponding scanning lines by a reciprocal of a value on the second approximate straight line corresponding to the each of the scanning lines as a repair coefficient, and calculate a square error between 1 and a repaired reduction rate made by multiplying the reduction rate by the repair coefficient, and for the scanning lines other than the third prescribed number of the scanning lines, calculate a square error between 1 and the reduction rate of each of the scanning lines, and further calculate a total value by adding the calculated square errors;
repeat a procedure from the selection of the third prescribed number of the scanning lines to the calculation of the total value, after changing the third prescribed number of the scanning lines to be selected;
identify the third prescribed number of the scanning lines corresponding to the second approximate straight line where the total value of the calculated square errors is minimum, as the scope of the image data containing a defect; and
multiply the image data read out from each of the radiation detection elements connected to the scanning lines within the identified scope, by the repair coefficient calculated for the each of the corresponding scanning lines based on the selected second approximate straight line respectively so as to repair the image data in the identified scope.

5. The radiation image capturing system of claim 4,
wherein the image processing apparatus, instead of approximating by the second approximate straight line, approximates by an approximate function set based on a radiation rising property from the start of irradiation of a radiation source which applies radiation to the radiation image capturing apparatus so as to repair the image data respectively.

6. The radiation image capturing system of claim 1,
wherein the image processing apparatus has, in advance, information on a relationship between a number of a scanning line whose image data is to be repaired, counted from a first scanning line in which the defect starts to occur and a coefficient to be multiplied by the image data read from the radiation detection elements connected to the scanning line whose image data is to be repaired, the scanning line being among the scanning lines which corresponds to the scope of the image data containing the defect, and
wherein the image processing apparatus analyzes a profile of the image data in the direction of extension of each of the signal lines and identifies the scope of the image data containing the defect and identifies the first scanning line where the defect starts to occur, and further
wherein the image processing apparatus, by referring to the information, repairs the image data respectively by multiplying each of the image data in the identified scope by the coefficient assigned to the each of the scanning lines connected to the radiation detection elements from which the image data has been read.

7. The radiation image capturing system of claim 1,
wherein the image processing apparatus is configured to calculate for each of the scanning lines, a mean value of the image data at positions lined in a direction of extension of each of the scanning lines, and to analyze a profile of the mean value in the direction of extension of each of the signal lines so as to identify the scope of the image data containing the defect, and to repair the image data in the identified scope.

8. The radiation image capturing system of claim 7, wherein the image processing apparatus is configured, when calculating the mean value for each of the scanning lines, to exclude the image data corresponding to a part of the radiation detection elements where radiation has directly arrived at the radiation image capturing apparatus without passing through a subject from objects of the calculation of the mean value.

9. The radiation image capturing system of claim 1, wherein the image data is data normalized by calculation of dividing image data read out from the radiation image capturing apparatus by a reference value respectively.

10. The radiation image capturing system of claim 1, wherein the radiation image capturing apparatus is configured to perform offset data reading processing in which an offset part caused by dark electric charge included in the image data is read out as offset data for each of the radiation detection elements, and
wherein the image processing apparatus calculates true image data by subtracting the offset data from the image data for each of the radiation detection elements, instead of analyzing a profile of the image data, and analyzes a profile of the true image data in the direction of extension of each of the signal lines so as to identify a scope of the true image data containing the defect and repair the true image data in the identified scope.

11. The radiation image capturing system of claim 10, wherein the image processing apparatus, instead of a profile of the true image data, calculates for each of the scanning lines, a mean value of the true image data at positions lined in a direction of extension of each of the scanning lines, and analyzes a profile of the mean value in the direction of extension of each of the signal lines so as to identify the scope of the image data containing the defect, and repairs the true image data in the identified scope.

12. The radiation image capturing system of claim 11, wherein the image processing apparatus, when calculating the mean value for each of the scanning lines, excludes the true image data corresponding to a part of the radiation detection elements where radiation has directly arrived at the radiation image capturing apparatus without passing through a subject from objects of the calculation of the mean value.

13. The radiation image capturing system of claim 10, wherein the image data is data normalized by calculation of dividing the true image data calculated based on image data read out from the radiation image capturing apparatus by a reference value respectively.

* * * * *